US010373269B2

(12) United States Patent
Matsumoto

(10) Patent No.: US 10,373,269 B2
(45) Date of Patent: Aug. 6, 2019

(54) INFORMATION MANAGEMENT SYSTEM

(71) Applicant: Hatanoganshoudoushoten Co., Ltd., Itabashi-ku, Tokyo (JP)

(72) Inventor: Tadashi Matsumoto, Tokyo (JP)

(73) Assignee: Hatanoganshoudoushoten Co., Ltd., Itabashi-ku, Tokyo (JP)

( * ) Notice: Subject to any disclaimer, the term of this patent is extended or adjusted under 35 U.S.C. 154(b) by 0 days.

(21) Appl. No.: 15/379,494

(22) Filed: Dec. 15, 2016

(65) Prior Publication Data

US 2017/0116682 A1 Apr. 27, 2017

Related U.S. Application Data

(63) Continuation of application No. PCT/JP2015/067698, filed on Jun. 19, 2015.

(30) Foreign Application Priority Data

Aug. 8, 2014 (JP) ................................. 2014-162888

(51) Int. Cl.
*G06Q 40/00* (2012.01)
*G06Q 30/04* (2012.01)
(Continued)

(52) U.S. Cl.
CPC ........... *G06Q 40/123* (2013.12); *G06Q 20/10* (2013.01); *G06Q 20/108* (2013.01);
(Continued)

(58) Field of Classification Search
CPC .... G06Q 20/207; G06Q 30/04; G06Q 40/123; G06Q 40/10; G06Q 40/00
(Continued)

(56) References Cited

U.S. PATENT DOCUMENTS

2010/0306071 A1 12/2010 Kay

FOREIGN PATENT DOCUMENTS

JP H11-015904 A 1/1999
JP 2001-155097 A 6/2001
(Continued)

OTHER PUBLICATIONS

Edwards, Chris Washington. Downsizing the Federal Government. Cato Institute, Jan. 11, 2005.*
(Continued)

*Primary Examiner* — Nathan C Uber
*Assistant Examiner* — Fawaad Haider
(74) *Attorney, Agent, or Firm* — Yokoi & Co., U.S.A.; Toshiyuki Yokoi

(57) ABSTRACT

An account information management apparatus includes an input receiving unit for receiving a net price, a tax-inclusive price, and an amount to be actually transferred to a transaction party, out of a tax-inclusive transaction amount, a computing unit for calculating the tax amount included in the transaction amount using the information received by the input receiving unit, and generating actual amount account information in which a transaction of the amount to be actually transferred to a transaction party is recorded and tax account information in which a transaction record of only the tax amount is recorded separately from the transaction record of the amount to be actually transferred to the transaction party, and an account information storage unit for storing therein the actual amount account information and the tax account information in association with each other for each transaction.

8 Claims, 48 Drawing Sheets

(51) Int. Cl.
*G06Q 20/18* (2012.01)
*G06Q 20/10* (2012.01)
*G06Q 20/20* (2012.01)

(52) U.S. Cl.
CPC ......... *G06Q 20/1085* (2013.01); *G06Q 20/18* (2013.01); *G06Q 20/207* (2013.01); *G06Q 30/04* (2013.01); *G06Q 40/00* (2013.01); *G06Q 40/10* (2013.01)

(58) Field of Classification Search
USPC ........................................................... 705/31
See application file for complete search history.

(56) References Cited

FOREIGN PATENT DOCUMENTS

| | | | |
|---|---|---|---|
| JP | 2002-373226 | A | 12/2002 |
| JP | 2003-323536 | A | 11/2003 |
| JP | 2003-346068 | A | 12/2003 |

OTHER PUBLICATIONS

International Search Report for PCT/JP2015/067698 dated Sep. 15, 2015.
PCT written opinion dated Sep. 15, 2015.
Japanese decision to grant a patent dated Aug. 5, 2016.
Japanese notice of the reason for refusal dated Jun. 1, 2016.

* cited by examiner

100 Account information

| Actual amount account | | | Consumption tax account | | |
|---|---|---|---|---|---|
| Deposit | Withdrawal | Balance | Received tax | Paid tax | Tax balance |
| Account information A section ~ 100a ||||||
| Direct tax section ~ 100b ||||||
| Account information B section ~ 100c ||||||
| Account information C section ~ 100d ||||||

100 Account information

| Actual amount account | | | Consumption tax account | | |
|---|---|---|---|---|---|
| Deposit | Withdrawal | Balance | Received tax | Paid tax | Tax balance |
| 10500 | From shop A | 10500 | 500 | | 500 |
| 21000 | From office B | 31500 | 1000 | | 1500 |
| To store C | 21000 | 10500 | | 1000 | 500 |
| | | | | | |
| 31500 | 21000 | 10500 | 1500 | 1000 | 500 |
| After tax payment | Balance | 10000 | | | |
| Direct tax section | | | | | |
| Account information B section | | | | | |
| Account information C section | | | | | |

Account information A section 100a

| Actual amount account | | | Consumption tax account | | |
|---|---|---|---|---|---|
| Deposit | Withdrawal | Balance | Received tax | Paid tax | Tax balance |
| Account information A section | | | | | |
| a | b | c | j | k | ... |
| d | e | f | g | h | i |
| Account information B section | | | | | |
| Account information C section | | | | | |

100 Account information

100a — Account information A section
100b — Direct tax section
100c — Account information B section
100d — Account information C section 100 Account information

| Actual amount account | | | Consumption tax account | | |
|---|---|---|---|---|---|
| Deposit | Withdrawal | Balance | Received tax | Paid tax | Tax balance |
| 0 | 100 | −100 | 0 | 0 | 0 |
| 0 | 0 | 0 | 0 | 10 | −10(i) |
| 0 | 10 | −10 | 0(m) | 0(n) | 0 |
| | | | −10(p) | −10(q) | 0 |

100a  
100b  
100c  
100d

Account information C section

200 Account information

| Actual amount account | | | Consumption tax account | | |
|---|---|---|---|---|---|
| Deposit | Withdrawal | Balance | Received tax | Paid tax | Tax balance |
| 100 | 0 | 100 | 0 | 0 | 0 |
| 0 | 0 | 0 | 10 | 0 | 10(j) |
| 10 | 0 | 10(v) | −10(r) | −10(s) | 0 |
| | | | 0(t) | 0(u) | 0 |

200a Account information A section
200b Direct tax section
200c Account information B section
200d Account information C section

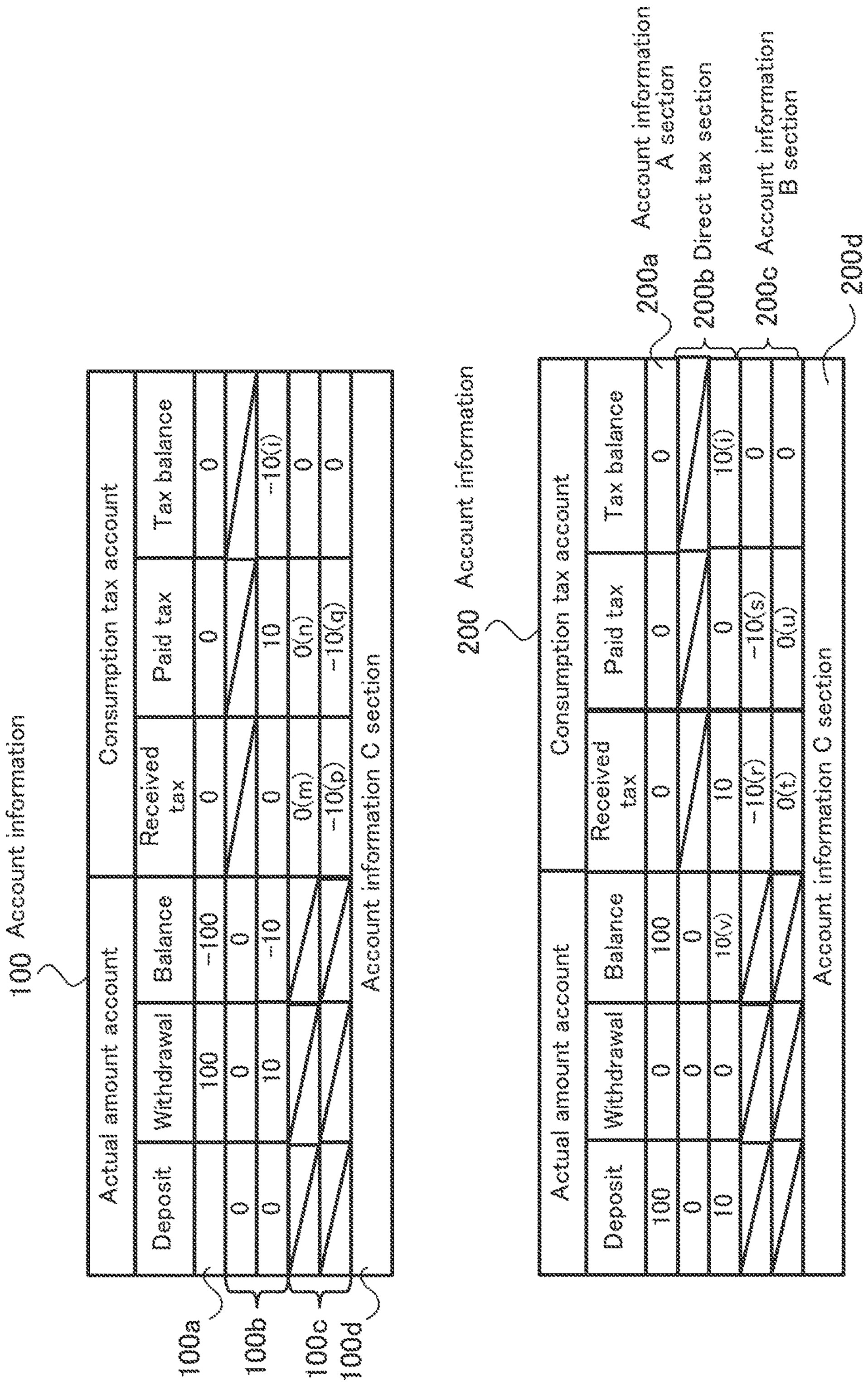

FIG. 7

| | VALUE | IDENTIFIER |
|---|---|---|
| NET PRICE | 100 YEN | A |
| TAX-INCLUSIVE PRICE | 110 YEN | B |
| TRANSFER AMOUNT | 106 YEN | C |

| | | |
|---|---|---|
| MONEY TAX PAYMENT AMOUNT | 6 | x |
| POINT DIRECT TAX PAYMENT AMOUNT | −4 | y |
| TOTAL CONSUMPTION TAX AMOUNT | 10 | z |

100 Account information (Consumer side) — 200 Account information (Business entity side)

| Position sign | pa | pb | pc | pd | pe | pf | | pg | ph | pi | pj | pk | pm |
|---|---|---|---|---|---|---|---|---|---|---|---|---|---|
| 1 | Actual amount account | | | Consumption tax account | | | | Actual amount account | | | Consumption tax account | | |
| 2 | De-posit | With-drawal | Ba-lance | Re-ceived | Paid | Tax balance | | De-posit | With-drawal | Ba-lance | Re-ceived | Paid | Tax balance |
| 3 | 200 | 0 | 200 | 0 | 0 | 0 | A section completion fields | 0 | 0 | 0 | 0 | 0 | 0 |
| 4 | 0 | 106 | 94 | 0 | 6 | −6 | A section input fields | 106 | 0 | 106 | 6 | 0 | 6 |
| 5 | 0 | 0 | 0 | | | | Direct tax completion fields | 0 | 0 | 0 | | | |
| 6 | 0 | 4 | −4 | 0 | 4 | −4 | Direct tax input fields | 4 | 0 | 4 | 4 | 0 | 4 |
| 7 | | | | 0 | 0 | 0 | B section received tax | | | | −4 | −4 | 0 |
| 8 | | | | −4 | −4 | 0 | B section paid tax | | | | 0 | 0 | 0 |
| 9 | | | | 0 | 0 | 0 | C section completion fields | | | | 0 | 0 | 0 |
| 10 | | | 0 | 0 | 0 | 0 | C section input fields | | | | 0 | 0 | 0 |
| 11 | 244 | 106 | 94 | 0 | 6 | −6 | A section total | 106 | 0 | 106 | 6 | 0 | 6 |
| 12 | | | | 0 | 4 | −4 | Direct tax total | | | | 4 | 0 | 4 |
| 13 | | | | 0 | −4 | 4 | B section differential value | | | | −4 | 0 | −4 |
| 14 | | | | 0 | 0 | 0 | C section correction value | | | | 0 | 0 | 0 |
| 15 | | | 4 | Transfer tax payment for direct tax | | 4 | Transfer amount to T·B | | | 6 | Transfer tax payment for indirect tax | | 6 |
| 16 | | | 90 | | | 0 | Amount after transfer to T·B | | | 100 | | | 0 |

| | Tax book 12a | | | | Tax book 12b | | |
|---|---|---|---|---|---|---|---|
| Position sign | pn | pp | pq | | pr | ps | pt |
| 1 | T・B actual amount | Information receipt | Calculation transfer instruction | | T・B actual amount | Information receipt | Calculation transfer instruction |
| 2 | 0 | −6 | | A section total | 0 | 6 | |
| 3 | | 4 | | B section differential value | | −4 | |
| 4 | | 0 | | C section correction value | | 0 | |
| 5 | | | 0 | Actual amount tax due | | | 6 |
| 6 | | | 0 | Point clearing value | | | 4 |
| 7 | | | 4 | Point purchase amount | | | 0 |
| 8 | 4 | | 4 | Received amount from tax record book | 6 | | 6 |
| 9 | 4 | | | Tax due | 6 | | |
| 10 | 0 | | | Amount after tax payment | 0 | | |

FIG. 12

ACCOUNT INFORMATION
100

| Actual amount account | | | Consumption tax account | | | |
|---|---|---|---|---|---|---|
| Deposit | With-drawal | Balance | Received | Paid | Balance | |
| 200 | 0 | 200 | 0 | 0 | 0 | A section receipt |
| 0 | 110 | 90 | 0 | 10 | −10 | A section payment |
| 0 | 0 | 0 | 0 | 0 | 0 | Direct tax receipt |
| 0 | 0 | 0 | 0 | 0 | 0 | Direct tax payment |
| | | 0 | 0 | 0 | 0 | B section receipt |
| | | 0 | 0 | 0 | 0 | B section payment |
| | | 0 | 10 | | | C section receipt |
| | | 0 | | | 0 | C section payment |
| 200 | 110 | 90 | 0 | 10 | −10 | A section total |
| 0 | 0 | 0 | 0 | 0 | 0 | Direct tax total |
| | | | 0 | | 0 | B section differential value |
| | | | | | 0 | C section correction value |
| | | | | | 0 | Transfer amount to T·B |
| | | 90 | | | | Amount after transfer to T·B |

FIG. 15

T1 Table

| | | | |
|---|---|---|---|
| | | 1000 | Income for previous year |
| | | 200 | Consumption amount for previous year |
| | | 0.8 | Saving rate |
| | | 0.2 | Progressive consumption tax rate |
| (6)+(4) | | −10 | Total direct-indirect consumption tax amount |
| (6)+(4) | | 10 | Already-paid consumption tax actual amount |
| | | 1 | Progressive-Standard ratio |
| | | 10 | Additional progressive consumption tax amount |
| 10 | | 10 | Received amount from tax record book |
| 6+4+10 | | 20 | Final tax amount |

FIG. 16A

T2 Table

| Saving rate | 0.1 | 0.2 | 0.3 | 0.4 | 0.5 | 0.6 | 0.7 | 0.8 | 0.9 | 1 |
|---|---|---|---|---|---|---|---|---|---|---|
| Tax rate | 0.100 | 0.100 | 0.100 | 0.100 | 0.125 | 0.150 | 0.175 | 0.200 | 0.225 | 0.250 |

FIG. 16B

| Actual amount account | | |
|---|---|---|
| Deposit | Withdrawal | Balance |
| 200 | 0 | 200 |
| 0 | 106 | 94 |
| 0 | 4 | 90 |

⇨

| Actual amount account | | |
|---|---|---|
| Deposit | Withdrawal | Balance |
| 200 | 0 | 200 |
| 0 | 106 | 94 |
| 0 | 4 | 90 |
| 0 | 10 | 80 |

FIG. 16C

INPUT INFORMATION MANAGEMENT TABLE

T3

| | |
|---|---|
| 0.1 | BASE TAX RATE |
| 1000 | NET PRICE |
| 1100 | TAX-INCLUSIVE PRICE |
| 1040 | RECEIVED AMOUNT AT REGISTER |
| ... | POINT BALANCE |
| 60 | RECEIVED POINTS |

OUTPUT INFORMATION MANAGEMENT TABLE

T4

| | |
|---|---|
| 0.1 | BASE TAX RATE |
| 11 | CORRECTION INDEX |
| 40 | RECEIVED TAX AMOUNT IN CASH |
| -54.5 | CORRECTION TAX AMOUNT |
| 60 | SHIFT POINTS |

| Position sign | pa | pb | pc | pd | pe | pf | Account information 202 | pg | ph | pi | pj | pk | pm |
|---|---|---|---|---|---|---|---|---|---|---|---|---|---|
| 1 | Actual amount account | | | Consumption tax account | | | | Actual amount account | | | Consumption tax account | | |
| 2 | Deposit | With-drawal | Balance | Received | Paid | Balance | 102 Account information | Deposit | With-drawal | Balance | Received | Paid | Balance |
| 3 | 200 | 0 | 200 | 0 | 0 | 0 | A section completion field | 0 | 0 | 0 | 0 | 0 | 0 |
| 4 | 0 | 100 | 100 | 0 | 9.091 | −9.091 | A section input field | 100 | 0 | 100 | 0 | 0 | 0 |
| 5 | 10 | 0 | 10 | | | | Direct payment completion field | 0 | 0 | 0 | | | |
| 6 | 0 | 10 | 0 | 0 | 10 | −10 | Direct payment input field | 10P | 0 | 10P | 10 | 0 | 10 |
| 7 | | | | 0 | 0 | 0 | B section received tax | | | | −10 | −10 | 0 |
| 8 | | | | −10 | −10 | 0 | B section paid tax | | | | 0 | 0 | 0 |
| 9 | | | | 0 | 0 | 0 | C section completion field | | | | 0 | 0 | 0 |
| 10 | | | | −9.091 | 0 | −9.091 | C section input field | | | | 0 | 0 | 0 |
| 11 | 200 | 100 | 100 | 0 | 9.091 | −9.091 | A section total | 100 | 0 | 100 | 0 | 0 | 0 |
| 12 | | | | 0 | 10 | −10 | Direct tax total | | | | 10 | 0 | 10 |
| 13 | | | | 0 | −10 | 10 | B section differential value | 10P | 10P clearing | 0P | −10 | 0 | −10 |
| 14 | | | | −9.091 | 0 | −9.091 | C section correction value | | | | 0 | 0 | 0 |
| 15 | Balance minus 10 yen | | −10 | Transfer payment for direct tax amount | | 10 | Amount transferred to T·B | | | | Point clearing tax payment | | 10P |
| 16 | | | 90 | | | 0 | Amount after transfer to T·B | | | 100 | | 0 | |

| T·B actual amount | Information receipt | Calculation transfer instruction | | T·B actual amount | Information receipt | Calculation transfer instruction |
|---|---|---|---|---|---|---|
| 0 | −9.091 | | A section total | 0 | 0 | |
| | 10 | | B section differential value | | −10 | |
| | −9.091 | | C section correction value | | 0 | |
| | A minus C | 0 | Actual amount tax due | | 0 | |
| | | 0 | Point clearing amount | | | −10 |
| | | 10 | Point purchase amount | | | 0 |
| 10 | | | Received amount from tax record book | 0 | | |
| 10 | | | Total tax due | 0 | | |
| 0 | | | Amount after tax payment | 0 | | |

200 Account information

| Actual amount account | | | Consumption tax account | | | |
|---|---|---|---|---|---|---|
| Deposit | With-drawal | Balance | Re-ceived | Paid | Balance | |
| 0 | 0 | 4 | 0 | 0 | 0 | A section completion field |
| 0 | 4 | 0 | 0 | 0.364 | −0.364 | A section input fields |
| 0 | 0 | 2 | | | | Direct tax completion fields |
| 0 | 2 | 0 | 0 | 2 | −2 | Direct tax input fields |
| | | | 0 | 0 | 0 | B section received tax |
| | | | −2 | −2 | 0 | B section paid tax |
| | | | 0 | 0.364 | −0.364 | C section completion fields |
| | | | 0 | 0 | | C section input fields |

FIG. 23A

200 Account information

| Actual amount account | | | Consumption tax account | | | |
|---|---|---|---|---|---|---|
| Deposit | With-drawal | Balance | Re-ceived | Paid | Balance | |
| 0 | 0 | 0 | 0 | 0 | 0 | A section completion field |
| 102 | 0 | 102 | 2 | 0 | 2 | A section input fields |
| 0 | 0 | 0 | | | | Direct tax completion fields |
| 2 | 0 | 2 | 2 | 0 | 2 | Direct tax input fields |
| | | | −2 | −2 | 0 | B section received tax |
| | | | 0 | 0 | 0 | B section paid tax |
| | | | 0 | 0 | −0.364 | C section completion fields |
| | | | 0 | 0 | | C section input fields |

FIG. 23B

200 Account information

| Actual amount account | | | Consumption tax account | | | |
|---|---|---|---|---|---|---|
| Deposit | With-drawal | Balance | Re-ceived | Paid | Balance | |
| 102 | 0 | 102 | 0 | 0 | 0 | A section completion field |
| 4 | 0 | 106 | 4 | 0 | 6 | A section input fields |
| 2 | 0 | 2 | | | | Direct tax completion fields |
| 2 | 0 | 4 | 2 | 0 | 2 | Direct tax input fields |
| | | | −2 | −2 | 0 | B section received tax |
| | | | 0 | 0 | 0 | B section paid tax |
| | | | 0 | 0 | −0.364 | C section completion fields |
| | | | 0 | 0 | | C section input fields |

FIG. 23C

| | |
|---|---|
| TRANSFER AMOUNT | 100 |
| TAX-INCLUSIVE PRICE | 110 |
| NET PRICE | 100 |
| MONEY TAX PAYMENT AMOUNT | 0 |
| POINT TAX PAYMENT AMOUNT | 10 |

| Actual amount account (100) | | | Consumption tax account (100) | | | Account information | Actual amount account (200) | | | Consumption tax account (200) | | |
|---|---|---|---|---|---|---|---|---|---|---|---|---|
| Deposit | With-drawal | Balance | Re-ceived | Paid | Balance | 100 Account information / Account information 200 | Deposit | With-drawal | Balance | Re-ceived | Paid | Balance |
| 200 | 0 | 200 | 0 | 0 | 0 | A section receipt | 100 | 0 | 100 | 0 | 0 | 0 |
| 0 | 100 | 100 | 0 | 0 | 0 | A section payment | 0 | 0 | 100 | 0 | 0 | 0 |
| 0 | 0 | 0 | 0 | 0 | 0 | Direct tax payment receipt | 0 | 0 | 0 | 0 | 0 | 0 |
| 0 | 10 | −10 | 0 | 10 | −10 | Direct tax payment | 0 | 0 | 0 | 0 | 0 | 0 |
| | | 0 | 0 | 0 | 0 | B section receipt | 10 | | 10 | 0 | 0 | 0 |
| | | 0 | −10 | −10 | 0 | B section payment | | | 10 | 0 | 0 | 0 |
| | | 0 | 10 | | | C section receipt | | | 0 | | | 0 |
| | | 0 | | | 0 | C section payment | | | 0 | | | 0 |
| 200 | 100 | 100 | 0 | 0 | 0 | A section total | 100 | 0 | 100 | 0 | 0 | 0 |
| −10 | 0 | −10 | 0 | 10 | −10 | Direct tax total | 0 | 0 | 0 | 0 | 0 | 0 |
| | | | 10 | 0 | 0 | B section differential value | | | | 0 | | 0 |
| | | | | | 0 | C section correction value | | | | | | 0 |
| | | | | | 10 | Transfer amount to T·B | | | | | | 0 |
| | | 90 | | | | Amount after transfer to T·B | | | 100 | | | |

| Consumer's tax record book | | | | Business entity's tax record book | | |
|---|---|---|---|---|---|---|
| T·B actual amount | Information receipt | Calculation transfer instruction | | T·B actual amount | Information receipt | Calculation transfer instruction |
| 0 | 0 | | A section total | 0 | 0 | |
| | −10 | | B section differential value | | 0 | |
| | 10 | | C section correction value | | 0 | |
| | 0 | 0 | Actual amount tax due | | 0 | |
| | | 0 | Point clearing value | | | 0 |
| | | 10 | Point purchase amount | | | 0 |
| 10 | | | Received amount from tax record book | 0 | | 0 |
| 10 | | | Total tax due | 0 | | |
| 0 | | | Amount after tax payment | 0 | | |

1000 Account information

| Actual amount account | | | Consumption tax account | | | |
|---|---|---|---|---|---|---|
| Deposit | With-drawal | Balance | Received | Paid | Tax balance | |
| 10 | 0 | 10 | 0 | 0 | 0 | A section completion fields |
| 0 | 10 | 0 | 0 | 0 | 0 | A section input fields |
| 0 | 0 | 0 | | | | Direct tax completion fields |
| 10 | 10 | 0 | 10 | 10 | 0 | Direct tax input fields |
| | | | −10 | −10 | 0 | B section received tax |
| Portion for recording points of pre-paid card | | | −10 | −10 | 0 | B section paid tax |
| 0 | 0 | 0 | 0 | 0 | 0 | C section completion fields |
| 10 | 0 | 10 | 0 | 0 | 0 | C section input fields |
| 10 | 10 | 0 | 0 | 0 | 0 | A section total |
| 0 | 0 | 0 | 0 | 0 | 0 | Direct tax total |
| | | | −10 | −10 | 0 | B section differential value |
| | | | | | 0 | C section correction amount |
| Already transferred to tax book | | 10 | | | 0 | Transfer amount to T·B |
| | | 0 | | | 0 | Amount after transfer to T·B |

FIG. 28B

1100 Account information

| Actual amount account | | | Consumption tax account | | | |
|---|---|---|---|---|---|---|
| Deposit | With-drawal | Balance | Received | Paid | Tax balance | |
| 106 | 0 | 106 | 9.636363 | 0 | 9.636363 | A section completion fields |
| 0 | 106 | 0 | 0 | 6 | 0 | A section input fields |
| 0 | 0 | 0 | | | | Direct tax completion fields |
| 4 | 4 | 0 | 4 | 4 | 0 | Direct tax input fields |
| | | | −4 | −4 | 0 | B section received tax |
| Portion for recording points of pre-paid card | | | −4 | −4 | 0 | B section paid tax |
| 10 | 0 | 10 | 0 | 0 | 0 | C section completion fields |
| 0 | 4 | 6 | 0 | 0 | 0 | C section input fields |
| 106 | 106 | 0 | 9.636363 | 6 | 3.636363 | A section total |
| | | | 4 | 4 | 0 | Total direct payment |
| | | | −4 | −4 | 0 | B section differential value |
| | | | | | 0 | C section correction amount |
| | | | | | 0 | Transfer amount to T·B |
| | | | | | 0 | Amount after transfer to T·B |

Account information
100

| Actual amount account | | | Consumption tax account | | | |
|---|---|---|---|---|---|---|
| Deposit | With-drawal | Balance | Received | Paid | Tax balance | |
| 2200 | 0 | 2200 | 0 | 0 | 0 | A section completion fields |
| 0 | 1100 | 1100 | 0 | 90.91 | -90.91 | A section input fields |
| 0 | 0 | 0 | | | | Direct tax completion fields |
| 100 | 100 | 0 | 100 | 100 | 0 | Direct tax input fields |
| Pre-paid point purchase field | | 100 | -100 | -100 | 0 | B section received tax |
| | | | -100 | -100 | 0 | B section paid tax |
| | | | 0 | 0 | 0 | C section completion fields |
| | | | 0 | 0 | 0 | C section input fields |

FIG. 29

TAX CARD

300

301

| POINT FIELD | | |
|---|---|---|
| 0 | 0 | 0 |
| 100 | 0 | 100 |

FIG. 30

| | |
|---|---|
| NET PRICE (ta) | 1000 |
| TAX-INCLUSIVE PRICE(tb) | 1100 |
| FOR INDIRECT TAX | 0 |
| FOR DIRECT TAX(py) | 100 |
| RECEIVED CASH(tc) | 1000 |
| RECEIVED TAX AMOUNT IN CASH(tf) | 0 |
| CORRECTION AMOUNT (td) | -90.91 |
| SHIFT POINTS(te) | 0 |

FIG. 31

| | | EXAMPLE 1 | EXAMPLE 2 | EXAMPLE 3 |
|---|---|---|---|---|
| (px)POINT BALANCE | 100 | 100 | 80 | 100 |
| (py)RECEIVED DIRECT TAX POINTS | 100 | 80 | 100 | 150 |
| SHIFT POINTS (te) | 0 | 0 | −20 | −50 |

FIG. 32

| | | | | |
|---|---|---|---|---|
| TAX-INCLUSIVE PRICE (tb) | 1100 | RECEIVED POINTS (Y) | 100 | 80 |
| NET PRICE (ta) | 1000 | SHIFT POINTS (te) | 0 | −20 |
| RECEIVED TAX AMOUNT IN CASH (tf) | 0 | (X)=(Y)+((−1)×(te)) | 100 | 100 |
| SHIFT POINTS (X) | 100 | | | |

FIG. 33

| CUSTOMER'S TAX CARD TAX AMOUNT INFORMATION | | | EXEMPLARY INVOICE | |
|---|---|---|---|---|
| POINT FIELD | | BALANCE | COUNTRY | A |
| 0 | 0 | 100(px) | STATE | A |
| 0 | 100(py) | 0 | FINANCIAL INSTITUTION | B |
| TAX AMOUNT INFORMATION FIELD | | | BRANCH | B |
| 1000(ta) | 1100(tb) | 1000(tc) | DISTRICT TAXATION BUREAU | C |
| −90.91(td) | 0(te) | 0(tf) | CORPORATE/ INDIVIDUAL | C |
| INVOICE INFORMATION | | | CORPORATE NAME | D |
| OWN INFORMATION | TIME・TAX AMOUNT | OTHER PARTY INFORMATION | PERSONAL INFORMATION | E |
| A−B | 123¥456 | A−D | PERSONAL INFORMATION | E |

FIG. 34

| | | |
|---|---|---|
| SHOP'S TAX CARD TAX AMOUNT INFORMATION | | |
| POINT FIELD | | BALANCE |
| 0 | 0 | 0 |
| 100(Y) | 0 | 100 |
| TAX AMOUNT INFORMATION FIELD | | |
| 1000(ta) | 1100(tb) | 1000(tc) |
| −90.91(td) | 0(te) | 0(tf) |
| INVOICE INFORMATION | | |
| OWN INFORMATION | TIME·TAX AMOUNT | OTHER PARTY INFORMATION |
| A−D | 123¥456 | A−B |

FIG. 35

100e Account information

| Actual amount account | | | Consumption tax account | | | |
|---|---|---|---|---|---|---|
| Deposit | With-drawal | Balance | Received | Paid | Tax balance | |
| 1100 | 0 | 1100 | 0 | 0 | 0 | A section completion fields |
| 0 | 0 | 1100 | 0 | 0 | −90.91 | A section input fields |
| 0 | 0 | 0 | | | | Direct tax completion fields |
| 0 | 0 | 0 | 0 | 0 | 0 | Direct tax input fields |
| Pre-paid point purchase field | | 100 | 0 | 0 | 0 | B section received tax |
| | | | 0 | 0 | 0 | B section paid tax |
| | | | −90.91 | 0 | 0 | C section completion fields |
| | | | 0 | −90.91 | 0 | C section input fields |

FIG. 36

100f Account information

| Actual amount account | | | Consumption tax account | | | |
|---|---|---|---|---|---|---|
| Deposit | With-drawal | Balance | Received | Paid | Tax balance | |
| 0 | 0 | 0 | 0 | 0 | 0 | A section completion fields |
| 1000 | 0 | 1000 | 0 | 0 | 0 | A section input fields |
| 0 | 0 | 0 | | | | Direct tax completion fields |
| 100 | 0 | 100 | 100 | 0 | 100 | Direct tax input fields |
| Pre-paid point purchase field | | 0 | -100 | -100 | 0 | B section received tax |
| | | | 0 | 0 | 0 | B section paid tax |
| | | | 0 | 0 | 0 | C section completion fields |
| | | | 0 | 0 | 0 | C section input fields |

FIG. 37

100e Account information

| Actual amount account | | | Consumption tax account | | | |
|---|---|---|---|---|---|---|
| Deposit | With-drawal | Balance | Received | Paid | Tax balance | |
| 1100 | 0 | 1100 | 0 | 0 | 0 | A section completion fields |
| 0 | 20 | 1080 | 0 | 0 | −90.91 | A section input fields |
| 0 | 0 | 0 | | | | Direct tax completion fields |
| 0 | 20 | −20 | 0 | 20 | −20 | Direct tax input fields |
| Pre-paid point purchase field | | 100 | 0 | 0 | 0 | B section received tax |
| | | | −20 | −20 | 0 | B section paid tax |
| For point purchase | | Minus 20 | −90.91 | 0 | 0 | C section completion fields |
| In-account deposit | Balance | 1080 | | −90.91 | 0 | C section input fields |

FIG. 38

12a Tax book

| T·B actual amount | Information receipt | Calculation transfer instruction | |
|---|---|---|---|
| (I)100 | (A)−90.91 | | A section total |
| | (D)100−100=0 | | Direct tax total |
| | (B)0 | | B section differential value |
| | (C)−90.91 | 0 | C section correction value (E) |
| | | 0 | Actual amount tax due (F) |
| | | 0 | Point clearing amount (G) |
| | | 0 | Point purchase amount (H) |
| | | 100 | Pre-paid point purchase amount (I) |
| 0 | | 0 | Received amount from tax record book (J) |
| 100 | | 100 | Total tax due |
| 0 | | | Amount after tax payment |

FIG. 39

12b Tax book

| T・B actual amount | Information receipt | Calculation transfer instruction | |
|---|---|---|---|
| (I)100 | (A)0 | | A section total |
| | (D)100 | | Direct tax total |
| | (B)-100 | | B section differential value |
| | (C)0 | 0 | C section correction value (E) |
| | | 0 | Actual amount tax due (F) |
| | | 100 | Point clearing amount (G) |
| | | 0 | Point purchase amount (H) |
| | | 0 | Pre-paid point purchase amount (I) |
| 0 | | 0 | Received amount from tax record book (J) |
| 100 | | 100 | Total tax due |
| 0 | | | Amount after tax payment |

FIG. 40

| Actual amount account | | | Consumption tax account | | | |
|---|---|---|---|---|---|---|
| Deposit | With-drawal | Balance | Received | Paid | Tax balance | |
| 1100 | 0 | 1100 | 0 | 0 | 0 | A section completion fields |
| 0 | 100 | 1000 | 0 | 0 | 0 | A section input fields |
| 0 | 0 | 0 | | | | Direct tax completion fields |
| 100 | 0 | 100 | 100 | 0 | 100 | Direct tax input fields |
| | | | −100 | −100 | 0 | B section received tax |
| Portion for card under server management method | | | 0 | 0 | 0 | B section paid tax |
| 0 | 0 | 0 | 0 | 0 | 0 | C section completion fields |
| 100 | 0 | 100 | 0 | 0 | 0 | C section input fields |

FIG. 41

| Actual amount account | | | Actual amount account | | | |
|---|---|---|---|---|---|---|
| Deposit | With-drawal | Balance | Received | Paid | Tax balance | |
| 1100 | 0 | 1100 | 0 | 0 | 0 | A section completion fields |
| 0 | 1000 | 0 | 0 | 90.91 | −90.91 | A section input fields |
| 0 | 0 | 100 | | | | Direct tax completion fields |
| 0 | 100 | 0 | 0 | 100 | −100 | Direct tax input fields |
| | | | −100 | −100 | 0 | B section received tax |
| Portion for card under server management method | | | −100 | −100 | 0 | B section paid tax |
| 0 | 0 | 100 | 0 | 0 | −90.91 | C section completion fields |
| 0 | 100 | 0 | −90.91 | −90.91 | 0 | C section input fields |

FIG. 42

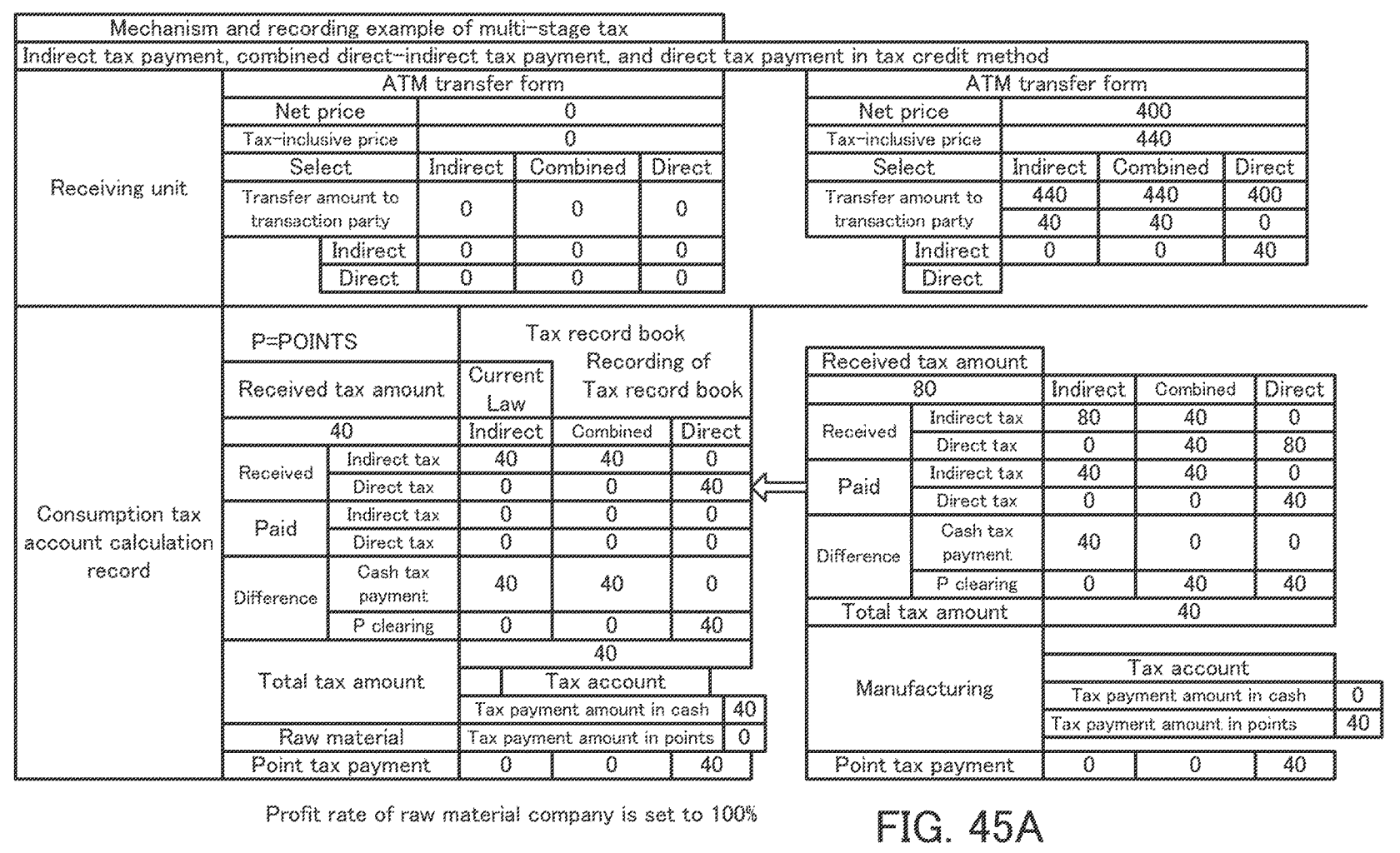

Mechanism and recording example of multi-stage tax

Indirect tax payment, combined direct-indirect tax payment, and direct tax payment in tax credit method

Receiving unit

| ATM transfer form | | | |
|---|---|---|---|
| Net price | 0 | | |
| Tax-inclusive price | 0 | | |
| Select | Indirect | Combined | Direct |
| Transfer amount to transaction party | 0 | 0 | 0 |
| Indirect | 0 | 0 | 0 |
| Direct | 0 | 0 | 0 |

| ATM transfer form | | | |
|---|---|---|---|
| Net price | 400 | | |
| Tax-inclusive price | 440 | | |
| Select | Indirect | Combined | Direct |
| Transfer amount to transaction party | 440 | 440 | 400 |
| | 40 | 40 | 0 |
| Indirect | 0 | 0 | 40 |
| Direct | | | |

Consumption tax account calculation record

P=POINTS

| Received tax amount | | Tax record book: Current Law | Recording of Tax record book | |
|---|---|---|---|---|
| 40 | | Indirect | Combined | Direct |
| Received | Indirect tax | 40 | 40 | 0 |
| | Direct tax | 0 | 0 | 40 |
| Paid | Indirect tax | 0 | 0 | 0 |
| | Direct tax | 0 | 0 | 0 |
| Difference | Cash tax payment | 40 | 40 | 0 |
| | P clearing | 0 | 0 | 40 |
| Total tax amount | | 40 | | |
| | | Tax account | | |
| | | Tax payment amount in cash | 40 | |
| Raw material | | Tax payment amount in points | 0 | |
| Point tax payment | | 0 | 0 | 40 |

Profit rate of raw material company is set to 100%

| Received tax amount | | | | |
|---|---|---|---|---|
| 80 | | Indirect | Combined | Direct |
| Received | Indirect tax | 80 | 40 | 0 |
| | Direct tax | 0 | 40 | 80 |
| Paid | Indirect tax | 40 | 40 | 0 |
| | Direct tax | 0 | 0 | 40 |
| Difference | Cash tax payment | 40 | 0 | 0 |
| | P clearing | 0 | 40 | 40 |
| Total tax amount | | 40 | | |
| Manufacturing | | Tax account | | |
| | | Tax payment amount in cash | 0 | |
| | | Tax payment amount in points | 40 | |
| Point tax payment | | 0 | 0 | 40 |

FIG. 45A

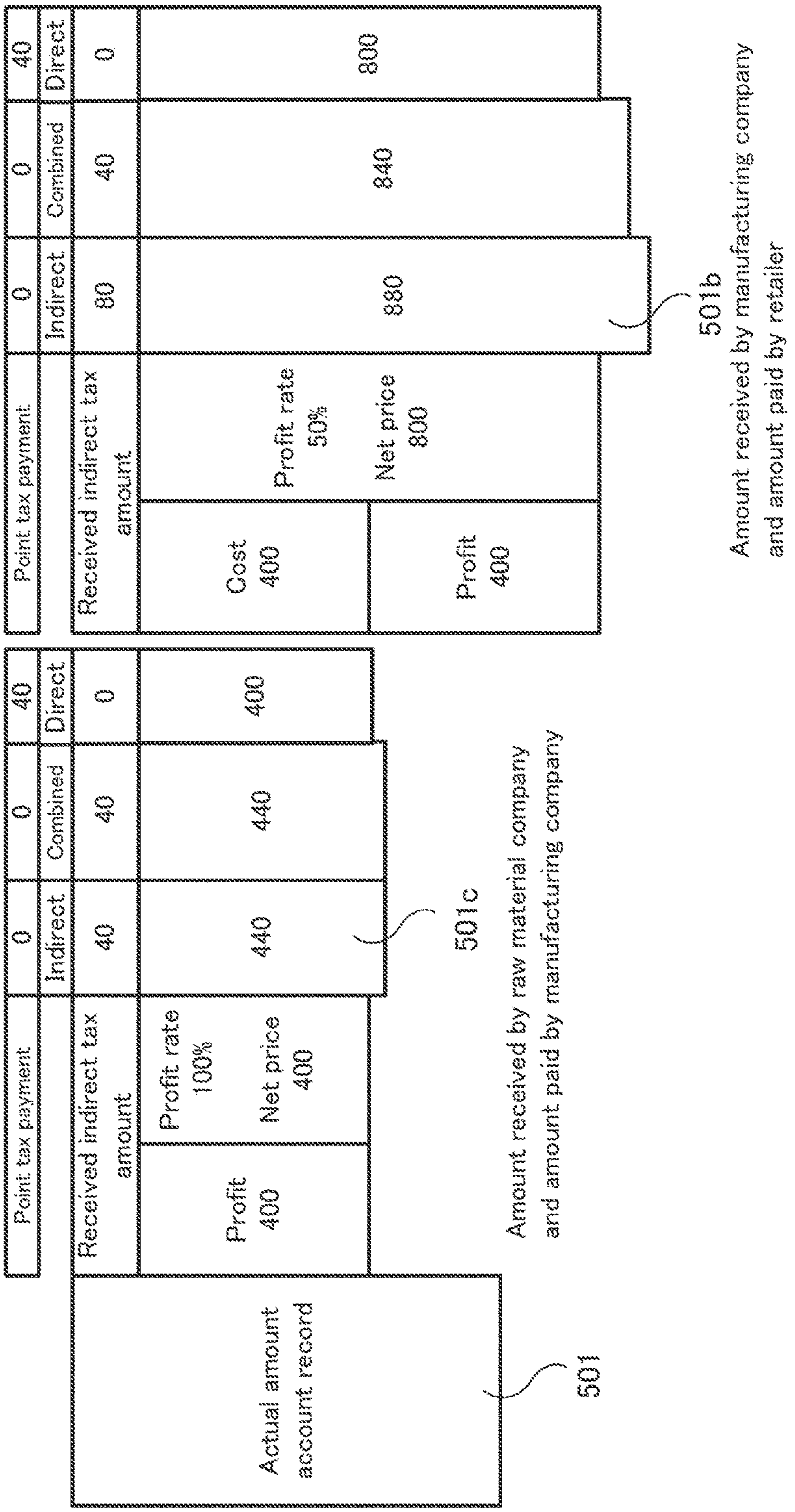

FIG. 45B

501 Actual amount account record

501c — Amount received by raw material company and amount paid by manufacturing company

| Point tax payment | | | |
|---|---|---|---|
| Received indirect tax amount | Indirect | Combined | Direct |
|  | 0 | 0 | 40 |
|  | 40 | 40 | 0 |
| Profit rate 100%<br>Net price 400<br>Profit 400 | 440 | 440 | 400 |

501b — Amount received by manufacturing company and amount paid by retailer

| Point tax payment | | | |
|---|---|---|---|
| Received indirect tax amount | Indirect | Combined | Direct |
|  | 0 | 0 | 40 |
|  | 80 | 40 | 0 |
| Profit rate 50%<br>Net price 800<br>Cost 400<br>Profit 400 | 880 | 840 | 800 |

INFORMATION MANAGEMENT SYSTEM

CROSS-REFERENCE TO RELATED APPLICATIONS

This application is a continuation application of International Application PCT/JP2015/067698, filed on Jun. 19, 2015 which designated the U.S. and which claims priority to Japanese Patent Application No. 2014-162888, filed on Aug. 8, 2014. The entire contents of these applications are incorporated herein by reference.

FIELD OF THE INVENTION

The embodiments discussed herein relate to an information management apparatus and an information processing method.

BACKGROUND OF THE INVENTION

At present, payment settled via a financial institution includes a net price and a consumption tax. A consumption tax payer (taxable business entity) calculates the consumption tax due using account books at a later time. Then, they pay the calculated tax due from their financial institution account or the like used for collecting the sales amount, to the National Treasury revenue agency's account.

Please see, for example, Japanese Laid-open Patent Publication No. 2002-373226.

An ultimate consumer who is a tax bearer pays a taxable business entity the amount of compensation for transfer of taxable assets, etc. and the tax amount under the current Consumption Tax Law Article 28(1). If the business entity, which has received the amount of compensation, declares a gross profit less than the actual profit (illegally or under the simplified tax system), the tax amount which the consumer paid together with the amount of compensation partly remains in taxable business entity's hand, which is a problem.

SUMMARY OF THE INVENTION

According to one aspect, there is provided an information management apparatus for a user to pay tax from an account held at a financial institution. The information management apparatus includes: a receiving unit that receives a net price, a tax-inclusive price, and an amount to be actually transferred to a transaction party, out of a tax-inclusive transaction amount; a computing unit that calculates a tax amount included in the tax-inclusive transaction amount, using information received by the receiving unit, and generates actual amount account information in which a transaction record of the amount to be actually transferred to the transaction party is recorded and tax account information in which a transaction record of only the tax amount is recorded separately from the transaction record of the amount to be actually transferred to the transaction party; and a storage unit that stores therein the actual amount account information and the tax account information in association with each other for each transaction, wherein the computing unit calculates an amount to be paid by the user as a direct tax payment, not to be paid to the transaction party, out of the tax amount, based on the amount to be actually transferred to the transaction party.

These and other objects, features and advantages of the present invention will become more apparent upon reading of the following detailed description along with the accompanied drawings.

BRIEF DESCRIPTION OF DRAWINGS

FIG. 4 illustrates an example of account information that an account information management apparatus manages.

FIG. 7 is a view for explaining an account information B section.

FIG. 10 is a view for explaining a process performed by a computing unit.

FIG. 11 is a view for explaining the process performed by the computing unit.

FIG. 12 is a view for explaining a tax book.

FIG. 15 illustrates account information at the time of completing a transaction of FIG. 14.

FIGS. 16A, 16B, and 16C are views for explaining an application example.

FIG. 17 is a view for explaining functions of a register according to a second embodiment.

FIG. 19 is a view for explaining an account information C section.

FIGS. 23A, 23B, and 23C are views for explaining business entity's account information for the time of making an additional deposit.

FIG. 25 is a view for explaining recording in a tax record book for a consumer-to-consumer transaction.

FIGS. 28A and 28B are views for explaining account information in the case of paying a consumption tax using a pre-paid card.

FIG. 29 is a view for explaining a record state in a pre-payment method.

FIG. 30 is a view for explaining a record state in the pre-payment method.

FIG. 31 is a view for explaining a record state in the pre-payment method.

FIG. 32 is a view for explaining a record state in the pre-payment method.

FIG. 33 is a view for explaining a value that is recorded in a shop-side shift points field at a register.

FIG. 34 is a view for explaining points and invoice.

FIG. 35 is a view for explaining points and invoice.

FIG. 36 is a view illustrating customer's account information.

FIG. 37 is a view illustrating shop's account information.

FIG. 38 is a view for explaining a record state in a later payment method.

FIG. 39 is a view for explaining a customer's tax book.

FIG. 40 is a view for explaining a shop's tax book.

FIG. 41 is a view for explaining a record state in an external server management method.

FIG. 42 is a view for explaining a record state in the external server management method.

FIGS. 45A, 45B, 45C, and 45D are views for explaining a multi-stage tax table.

DETAILED DESCRIPTION OF THE INVENTION

Figure 1:
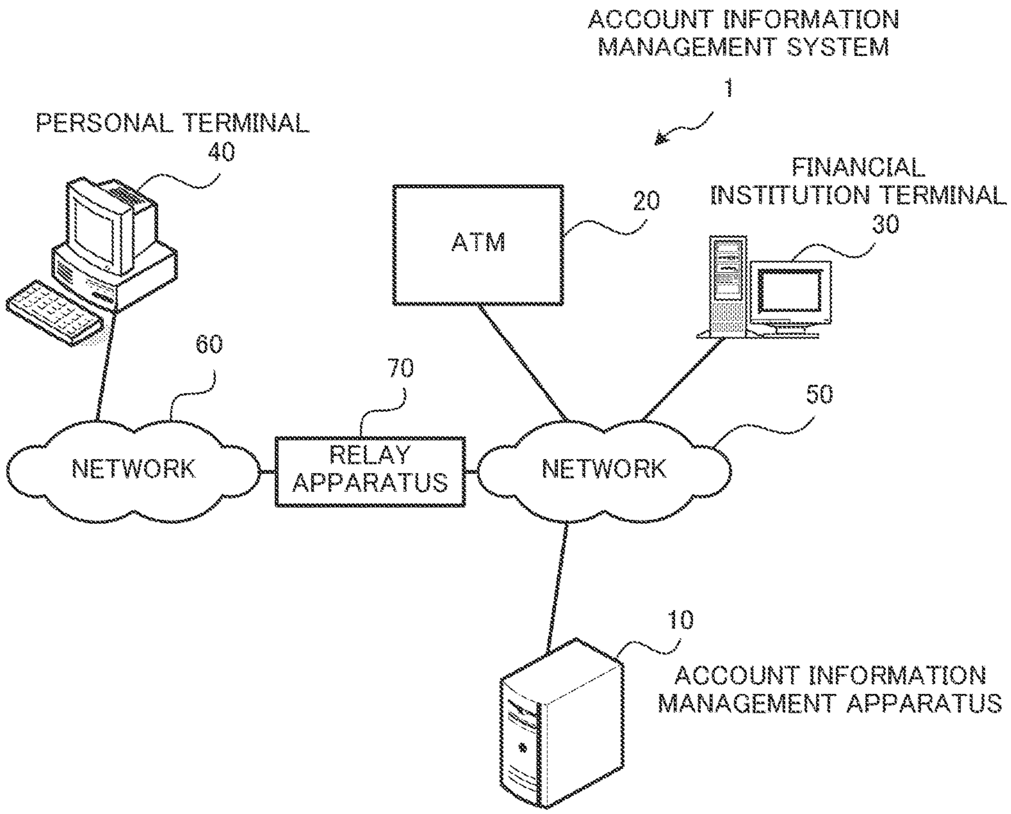
FIG. 1 illustrates an account information management system according to a first embodiment.

Hereinafter, account information management systems of embodiments will be described in detail with reference to the accompanying drawings.

First Embodiment

An account information management system 1 of a first embodiment enables ultimate consumers to directly pay consumption taxes to the National Treasury. With the account information management system 1, business entities which are consumption tax payers and ultimate consumers are able to automatically transfer and deposit the consumption tax dues to their tax deposit accounts and then pay the consumption tax dues.

In this account information management system 1, an ATM (Automated Teller Machine) 20 and a financial institution terminal 30 are each connected to an account information management apparatus 10 over a network 50 with dedicated lines. In addition, a relay apparatus 70 relay communication between the network 50 and a network 60, such as the Internet. A personal terminal 40 is connected to the account information management apparatus 10 over the network 60.

Although FIG. 1 illustrates one ATM 20, one financial institution terminal 30 and one personal terminal 40, two or more ATMs 20, two or more financial institution terminals 30, and two or more personal terminals 40 may be provided.

The ATM 20 is a machine for consumers to deposit cash into their accounts, and withdraw and transfer cash from the accounts, for example.

The financial institution terminal 30 is installed at the teller's counters of banks, and communicates account information with the account information management apparatus 10 in response to bank clerk's operations.

The personal terminal 40 communicates account information with the account information management apparatus 10 using, for example, an Internet banking system.

In this account information management system 1, for example, when depositing cash into an account for purchase of taxable assets, a consumer or the like operates the ATM 20 to display a transfer screen.

Figure 2:
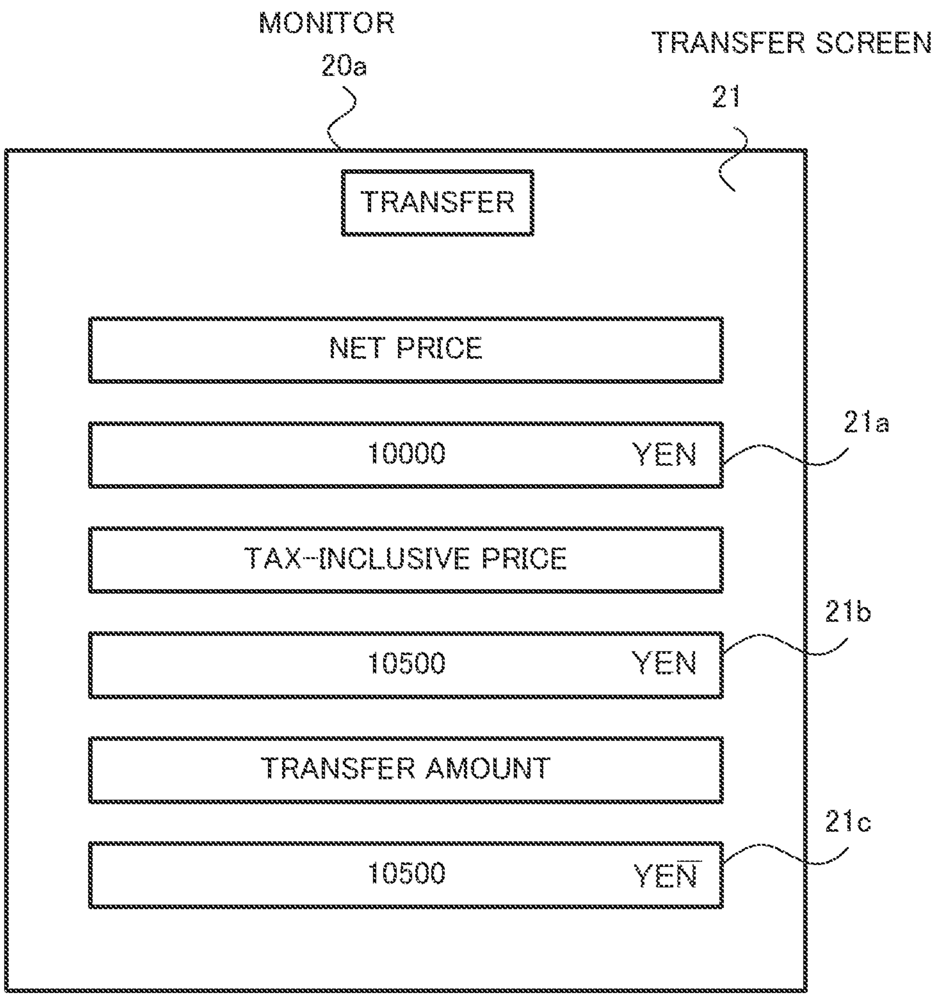
FIG. 2 is a view for explaining a transfer screen of an ATM.

FIG. 2 is a view for explaining a transfer screen of an ATM.

A transfer screen 21 displayed on a monitor 20*a* provided in the ATM 20 includes a net price field 21*a* for entering a net price, a tax-inclusive price field 21*b* for entering a tax-inclusive price including the consumption tax amount, and a transfer amount field 21*c* for entering an actual transfer amount. If the value in the tax-inclusive price field 21*b* is equal to that in the transfer amount field 21*c*, the consumption tax is paid indirectly. If the value in the transfer amount field 21*c* is between the value in the net price field 21*a* and the value in the tax-inclusive price field 21*b*, the consumption tax is paid, both directly and indirectly. If the value in the transfer amount field 21*c* is equal to the value in the net price field 21*a*, the consumption tax is paid directly. This direct consumption tax is that the consumption tax is not paid via a business entity, like a golf course tax or a bath tax, but is directly paid to the National Treasury revenue agency's account. As tax payment methods, an automatic transfer that is made after purchase, a previous purchase of pre-paid consumption tax points before consumption, and others are considered.

FIG. 2 illustrates the case where a consumption tax rate is set to 5%. More specifically, referring to the example of FIG. 2, "10000" is entered in the net price field 21*a*, and "10500" is entered in both the tax-inclusive price field 21*b* and the transfer amount field 21*c*.

The account information management apparatus 10 manages information on accounts owned by consumers and business entities.

Figure 3:
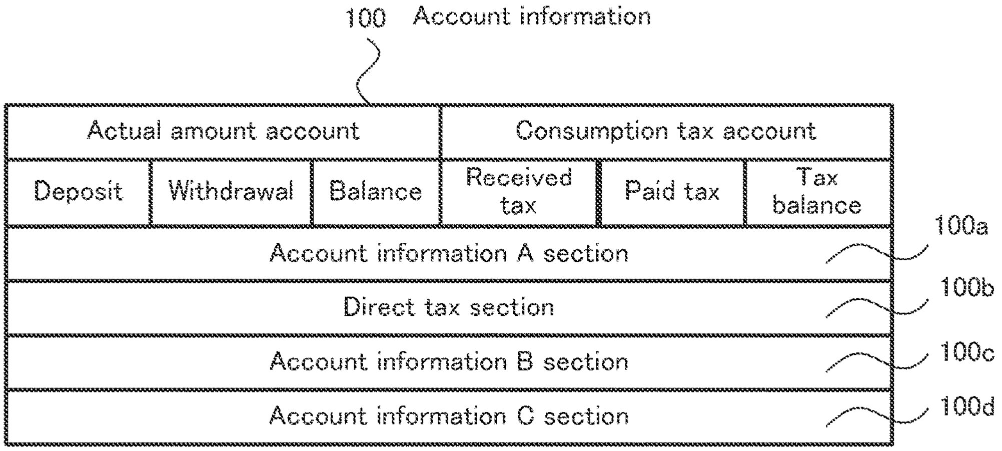
FIG. 3 is a view for explaining account information.

FIG. 3 is a view for explaining account information.

Account information 100 that the information processing apparatus 10 manages includes fields for an actual amount account and a consumption tax account.

In the fields of the actual amount account, information such as deposits, withdrawals, and balances is recorded. In the fields of the consumption tax account, information such as received taxes, paid taxes, and tax balances is recorded. A received tax indicates a consumption tax amount out of a deposit amount. A paid tax indicates a consumption tax amount out of a withdrawn amount. A tax balance indicates a tax balance of received tax amounts and paid tax amounts.

The account information 100 includes a portion for an account information A section (indirect tax section) 100*a*, a portion for a direct tax section 100*b*, a portion for an account information B section 100*c*, and a portion for an account information C section 100*d*. Information recorded in each section will be described below in order.

First, information recorded in the account information A section 100*a* of the account information 100 will be described.

FIG. 4 illustrates an example of account information that the account information management apparatus manages.

In FIG. 4, a consumption tax rate is set to 5%. The account information A section 100*a* managed by the account information management apparatus 10 includes fields for the actual amount account and fields for the consumption tax account.

The fields of the actual amount account have the same format as an existing passbook. Values entered in these fields indicate the amounts resulted from tax-inclusive transactions including appropriate tax amounts.

For example, when a payment of 10500 yen is received from a shop A, as illustrated in FIG. 4, "10500" is recorded in a deposit field of the actual amount account, and "10500" is recorded in a balance field. Note that it is assumed that the initial balance is 0 yen.

When a payment of 21000 yen is received from an office B after that, "21000" is recorded in the deposit field, and "31500" is recorded in the balance field.

When an amount of 21000 yen is paid to a store C after that, "21000" is recorded in a withdrawal field, and "10500" is recorded in the balance field.

The fields of the consumption tax account are for recording receipt and payment of indirect consumption taxes.

For example, when the payment of 10500 yen is received from the shop A, as illustrated in FIG. 4, "500" that is equivalent to the consumption tax 5% (500 yen) out of that received amount is recorded in a received tax field. Then, "500" is recorded in a tax balance field.

When the payment of 21000 yen is received from the office B, "1000" that is equivalent to the consumption tax 5% (1000 yen) is recorded in the received tax field. Then, "1500" that is equivalent to the total received tax amount, 1500 yen, is recorded in the tax balance field.

When 21000 yen is paid to the store C, "1000" is recorded in a paid tax field. Then, "500" that is the balance of the received and paid tax amounts, 500 yen, is recorded in the tax balance field.

Information recorded in the account information A section (indirect tax section) up to this point is entries in the consumption tax account that is applicable to the Consumption Tax Law currently in force.

The direct tax section 100*b* will now be described.

The account information management system 1 of the embodiment enables an ultimate consumer to use his own account information management system to calculate the consumption tax due and directly transfer the tax due to the National Treasury revenue agency's account in a financial institution. In FIG. 2, the same value is entered in the tax-inclusive price field 21*b* and transfer amount field 21*c* of the transfer screen 21. This is an input operation for the case of paying the consumption tax amount to a business entity as an indirect consumption tax payment. In the case of a direct tax payment, "10500" is entered in the tax-inclusive price field 21*b*, and "10000" is entered in the transfer amount field 21*c* as a payment for a payee. The amount calculated by subtracting the amount entered in the tax-inclusive price field 21*b* from the amount entered in the transfer amount field 21*c* is the amount that is not sufficient and needs to be paid directly as a tax. Such insufficient and unpaid consumption tax amounts are processed and recorded using the direct tax section 100*b* and the account information B section 100*c*.

Figure 5:
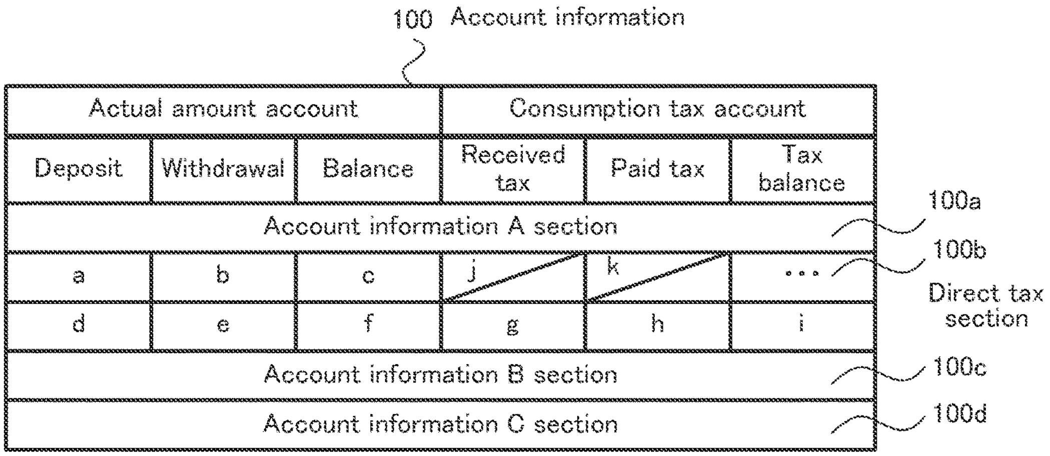
FIG. 5 is a view for explaining a direct tax section.

FIG. 5 is a view for explaining a direct tax section.

For explanation of the table, the direct tax section 100*b* includes two rows. The upper row has receipt fields (hereinafter, also referred to as direct tax completion fields), and indicates a numerical result of completed transactions. The lower row has payment fields (hereinafter, also referred to as direct tax input fields), and indicates numerical values newly recorded.

In addition, FIG. 5 illustrates the alphabet in fields for easy explanation of each field. Numerical values are actually set in the fields.

In a deposit field a, withdrawal field b, and balance field c of the direct tax section 100*b* of the actual amount account, a receipt, payment, and balance of consumption tax points currently held in a tax record book are recorded.

In the field c, a numerical result (the scheduled tax due to be directly transferred from the actual amount account and pre-paid consumption tax points prior to consumption) of completed transactions is recorded. In fields d, e, and f, numerical values newly recorded for the current transaction are recorded.

In addition, in fields g, h, and i of the consumption tax account, consumption tax points received and paid in the current transaction are recorded. Only the points shifted for purchase and payment, which are recorded in the fields d and e, are recorded. Fields j and k are not basically used. In the fields g, h, and i, numerical values for the current transaction are newly recorded.

As amounts that are recorded in the fields a, b, c, d, e, and f of the direct tax section 100*b* of the actual amount account, the increased or decreased number of points because of a reception or payment via a tax card (a tax amount information communication means), which will be described later, is recorded as well.

In addition, when actual amount points are paid to the National Treasury as a consumption tax pre-payment, the points corresponding to the paid tax amount are recorded in appropriate received and paid tax fields a, b, c, d, e, and f in the direct tax section 100*b* of the actual amount account.

A consumption tax is transferred from the balance of the actual amount account of the ultimate consumer's account information 100 via a tax deposit account, directly to the National Treasury or to the National Treasury revenue agency's account (not illustrated) used as a tax collection account of a district bank.

When consumption tax points are paid using the paid tax field e in the actual amount account of a consumer or another, that paid points are recorded as a received tax in the field d of the direct tax section 100*b* of a product supplier, such as a retailer. In addition, the same points are also recorded in the field g of the direct tax section 100*b* of the product supplier, such as a retailer.

The account information B section 100*c* of FIG. 5 will now be described.

The account information B section 100*c* is a section for recording a deposit amount scheduled to be deposited to the National Treasury, which is not recorded in the account information A section (indirect tax section) 100*a*.

The following describes how a business entity records a consumption tax amount scheduled to be directly paid to the government by a consumer, in the business entity's account information.

Since the business entity does not receive the consumption tax amount, they are not able to record the amount in the account information A section. This is because the account information A section 100*a* is a section for recording amounts actually received or paid. To deal with this, the account information B section 100*c* is separately provided.

In addition, the consumer needs to record the tax due scheduled to be paid to the National Treasury, which is not paid to the business entity. To deal with this, the account information B section 100*c* is provided.

Figure 6A:
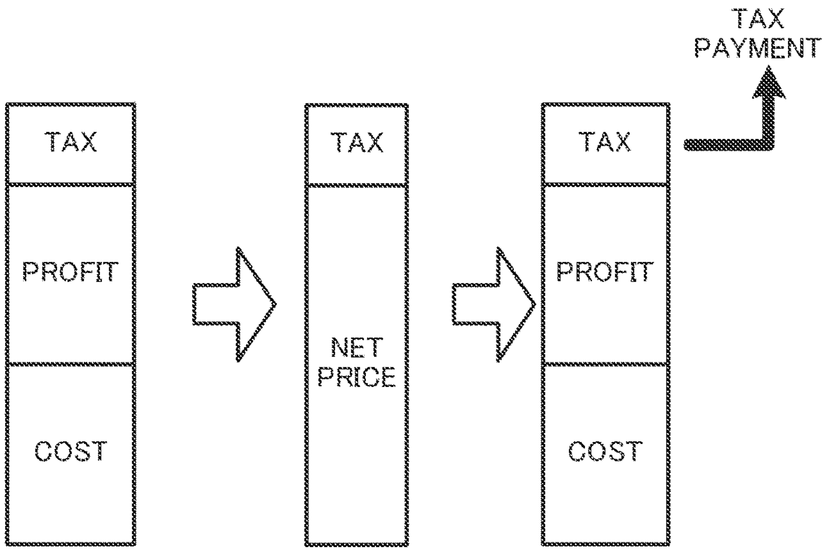
FIGS. 6A and 6B are views for explaining an account information B section.
Figure 6B:
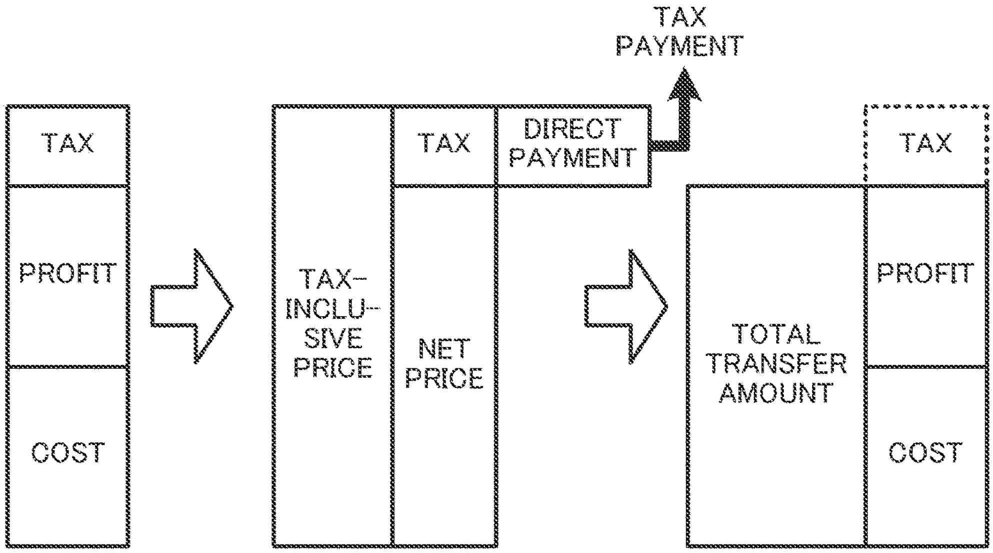

FIGS. 6A, 6B, and 7 are views for explaining an account information B section.

As illustrated in FIGS. 6A and 6B, a product price at a retailer or the like includes the following three items: a cost, a profit, and a consumption tax. As illustrated in FIG. 6A, in a general tax payment method, a consumer pays the amount including a consumption tax, as well as a net price (cost and profit) to the business entity. Then, the business entity pays the received consumption tax.

In this embodiment, by contrast, the consumer directly pays the consumption tax to the government, as described above. Therefore, as illustrated in FIG. 6B, the amount to be transferred to the business entity's account is the net price.

Account information 200 illustrated in FIG. 7 is business entity's account information.

FIG. 7 exemplifies account information for the case where a consumer directly pays a consumption tax of 10 yen out of a retailer's price of 110 yen, including a net price of 100 yen and the consumption tax of 10 yen (consumption tax 10%).

In both the direct tax section 100*b* of the account information 100 and the direct tax section 200*b* of the account information 200, values indicating that the consumption tax of 10 yen has directly been paid are recorded.

In both the account information B section 100*c* of the account information 100 and the account information B section 200*c* of the account information 200, a consumption tax amount scheduled to be transferred to a tax deposit account or points scheduled for clearing the tax payment after a taxable period ends, which is a tax balance for the taxable period, is recorded as a minus sign. In this connection, the same amount is recorded in a receipt field and a payment field. In addition, a balance field always as a value of zero.

The following describes a more concrete example. Like FIG. 5, the Alphabet is indicated in parentheses together with numerical values in fields for easy explanation of the fields.

In the account information B section 100*c* and the account information B section 200*c*, calculation information about the amount that each transaction party directly pays is recorded. The same amount "−10" is recorded in a paid tax field p and field q in the account information B section 100*c* (consumer). The same amount "−10" is entered in the received tax field r and field s in the account information B section 200*c* (business entity).

The method of calculating a direct tax amount for each party is as follows. In the case of the consumer, the amount of "10" is calculated by subtracting a value "−10" of the filed q from a value "0" of the field m. In the case of the business entity, the amount of "−10" is calculated by subtracting a value "0" of the field u from a value "−10" of the field r.

As a result of the above calculation, the consumer transfers 10 yen from the balance of the account information A section 100*a* of the actual amount account to the tax deposit account. The business entity resets (clears) "−10" points by declaring the consumption tax. By doing so, the payment of the consumption tax is complete.

If a minus value is in the field i of the account information 100, the account information 200, a minus value is recorded in the fields p, q, r and u of the account information B section 100*c* and account information B section 200*c*. If a plus value is in the field i of the account information 100, the account information 200, a minus value is recorded in the fields m, n, r and s.

Further, an integrated value obtained by adding received or paid tax amounts during the taxable period is entered in the fields m, n, r, s, p, q, t, and u.

In this connection, values that are not used are entered in the fields p, n, t, and s of the account information B section 100*c* and the account information B section 200*c*. This is because the tax payment is not actually made at the time of this transaction (for example, "(field p)−(field q)=0"). In addition, in the fields i of the account information 100 and account information 200, points paid are recorded as a minus value and points received are recorded as a plus value.

The following describes the case where the business entity purchases a product from a supplier or distributer.

In the case of purchasing a product, the business entity is able to pay the supplier or distributer a consumption tax incurred for the purchased product, using received points recorded in the balance field (v) of the direct tax section 200*b* of the actual amount account.

After such transactions are made during a taxable period, the amount finally recorded in the account information B section 200*c* of the account information 200 is taken as a tax due for resetting points. The business entity declares the tax due on the basis of official certificates at the end of the fiscal year, thereby completing the declaration of the consumption tax. In addition, by resetting the points transferred to a tax book from the amount recorded in the balance field (v) of the actual amount account of the account information 200, according to the declaration of the consumption tax, the business entity completes the payment of the consumption tax.

The account information C section 100*d* and account information C section 200*d* will now be described.

In the embodiment, an example in which the account management system 1 is applied to transactions made over a network is described.

However, in reality, a person withdraws cash from an information receiving unit, such as an ATM, and uses the cash to pay a transaction party. To record accurate information on such a purchase in the consumption tax account in the case where the purchase is made in cash, the account information C sections 100*d* and 200*d* are used.

In this connection, the account information C section may be considered as "a section for correcting a tax amount recorded at the time of a cash transaction". In the case of withdrawing cash from an information receiving unit, such as an ATM, in the account management system 1, a tax amount included in the amount recorded in the withdrawal field of the actual amount account needs to be recorded accordingly in the paid tax field of the account information A section 100*a* of the consumption tax account.

However, it is impossible to determine an accurate consumption tax amount that may be paid out of the cash he has just withdrawn, before he decides whether to purchase food, to pay for a medical expense, to purchase an expensive jewel, or another. To deal with this, in the account management system 1, a base tax rate is set in advance. If the Consumption Tax Law currently in force sets non-taxation for medical expenses, a tax rate of 10% for food and daily products, and a tax rate of 20% for luxury goods, a tax rate that is probably applied for cash consumption for most cases, i.e., the tax rate of 10% for food and daily products is set as the base tax rate. In the case where cash is withdrawn from an ATM or the like, a tax amount calculated using the base tax rate is recorded in the paid tax field of the account information A section 100*a* of the consumption tax account. However, when the cash is used for medical expenses, jewels or the like, the recorded tax amount needs to be corrected with a calculation process. This calculation process will be described in a second embodiment.

In this connection, in addition to the above information, the account information 100 may include other information, such as an invoice number, date, retailer number, used device, transaction details, receipt serial number, bank number, branch number, account number, accounting settlement interest, or accounting settlement tax.

Hereinafter, the account information management apparatus 10 that implements processing of FIGS. 2 to 7 will be described in more detail.

Figure 8:
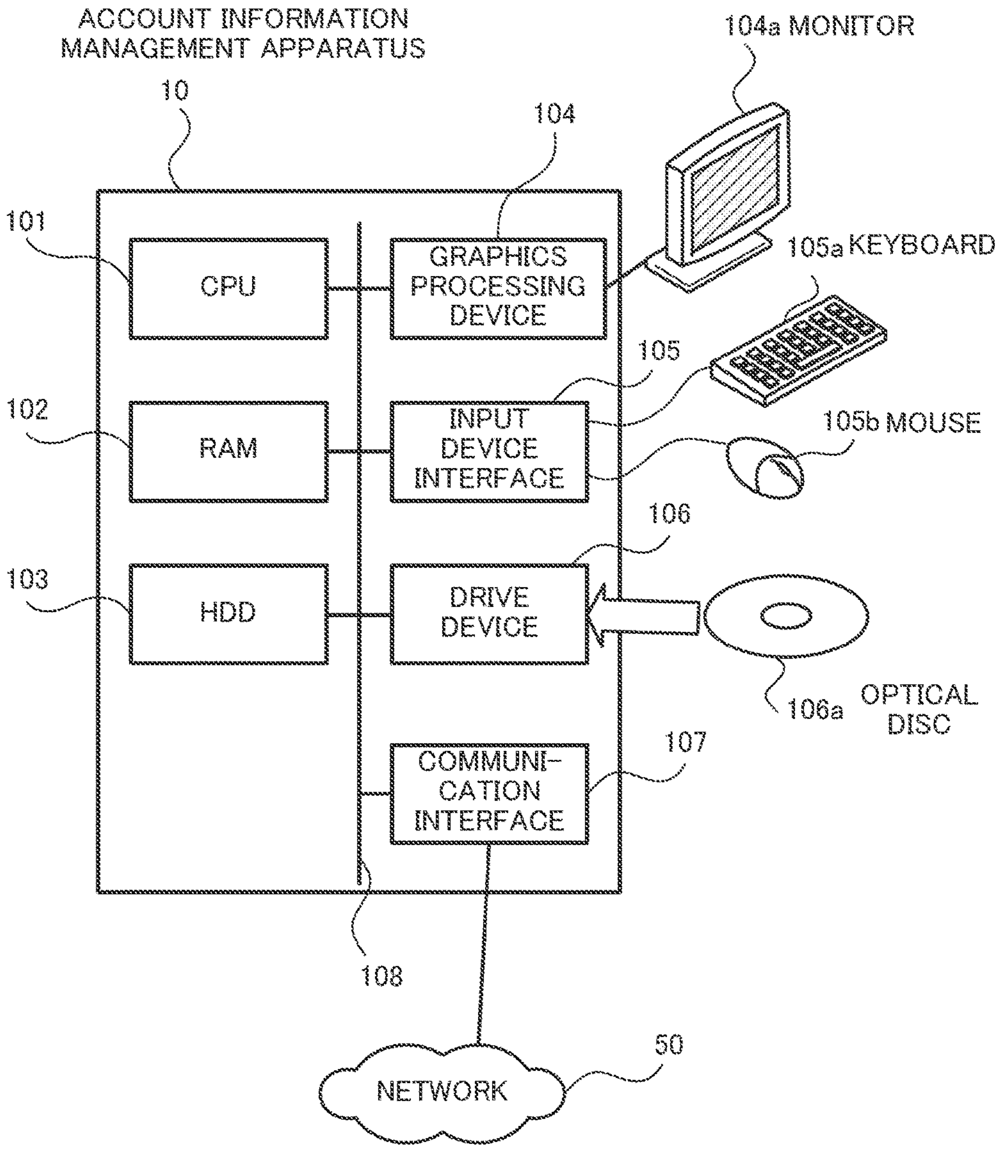
FIG. 8 illustrates a hardware configuration of the account information management apparatus according to the embodiment.

FIG. 8 illustrates a hardware configuration of the account information management apparatus according to the embodiment.

The account information management apparatus 10 is entirely controlled by a CPU (Central Processing Unit) 101. A RAM (Random Access Memory) 102 and a plurality of peripherals are connected to the CPU 101 via a bus 108.

The RAM 102 is used as a primary storage device of the account information management apparatus 10. The RAM 102 temporarily stores at least part of OS (Operating System) programs and application programs that are executed by the CPU 101. Also, the RAM 102 stores various data that is used by the CPU 101 in processing.

Connected to the bus 108 are an HDD (Hard Disk Drive) 103, a graphics processing device 104, an input device interface 105, a drive device 106, and a communication interface 107.

The HDD 103 magnetically writes and reads data on a built-in disk. The HDD 103 is used as a secondary storage device of the account information management apparatus 10. The HDD 103 stores the OS programs, application programs, and various data. As a secondary storage device, a flash memory or another semiconductor storage device may be used.

A monitor 104*a* is connected to the graphics processing device 104. The graphics processing device 104 displays images on the screen of the monitor 104*a* in accordance with instructions from the CPU 101. As the monitor 104*a*, a display device using CRT (Cathode Ray Tube), a liquid crystal display device, or another may be used.

A keyboard 105*a* and a mouse 105*b* are connected to the input device interface 105. The input device interface 105 transfers signals received from the keyboard 105*a* and mouse 105*b*, to the CPU 101. The mouse 105*b* is one example of pointing devices, and another pointing device may be used. Other pointing devices include, for example, touch panels, tablets, touchpads, track balls, and others.

The drive device 106 reads data from optical discs, on which data is recorded such as to be read with reflection of light, USB (Universal Serial Bus) memories, or other portable recording media. For example, in the case where the drive device 106 is an optical drive device, the drive device 106 reads data from an optical disc 106*a* with laser light or the like. Optical discs 106*a* include Blu-rays (registered trademark), DVDs (Digital Versatile Disc), DVD-RAMs, CD-ROMs (Compact Disc Read Only Memory), CD-Rs (Readable), and CD-RWs (ReWritable).

The communication interface 107 is connected to the network 50. The communication interface 107 communicates data with another computer or communication device over the network 50.

With the above hardware configuration, the processing functions of the embodiment may be implemented.

The account information management apparatus 10 having the hardware configuration of FIG. 8 has the following functions.

Figure 9:
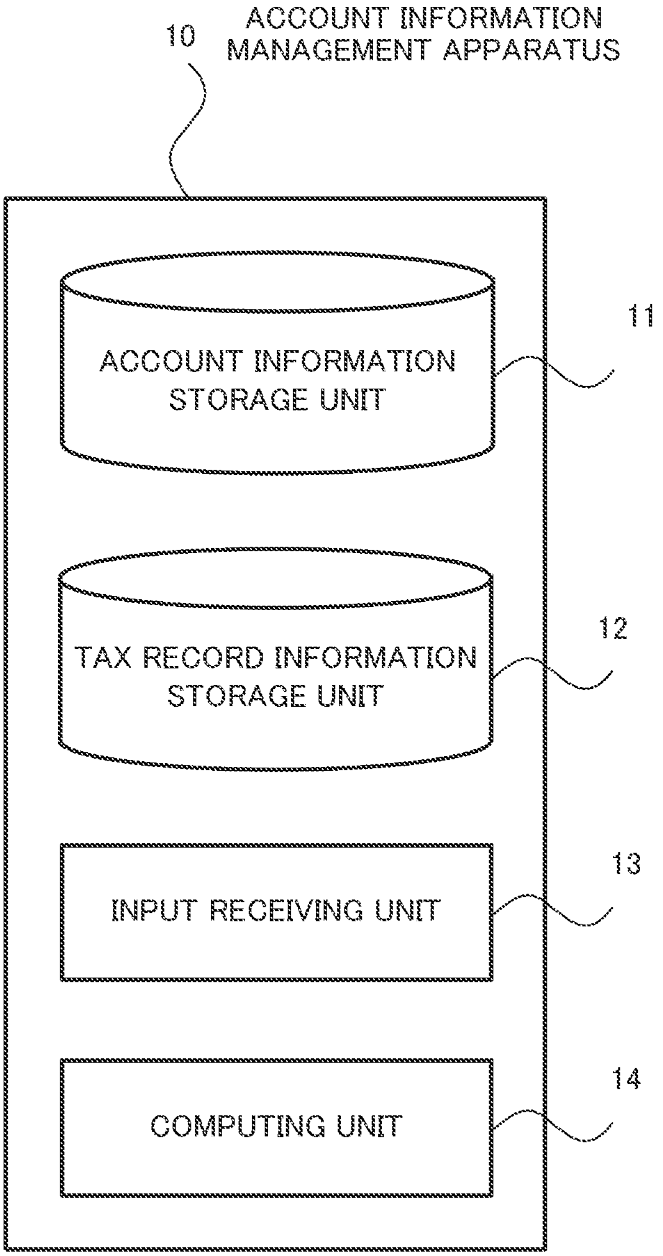
FIG. 9 is a block diagram illustrating functions of the account information management apparatus according to the embodiment.

FIG. 9 is a block diagram illustrating functions of the account information management apparatus according to the embodiment.

The account information management apparatus 10 includes an account information storage unit (tax record account) 11, tax record information storage unit (tax book account) 12, input receiving unit 13, and computing unit 14.

The account information storage unit 11 stores therein account information including account information 100, account information 200, and others.

The tax record information storage unit 12 stores therein information about tax payments through an optional or statutory taxable period.

The input receiving unit 13 receives tax amount information (net prices, tax-inclusive prices, and amounts to be actually transferred, out of transaction amounts, and tax amount correction information at the time of cash payments) entered by users using ATMs or others.

The computing unit 14 computes account information on the basis of the tax amount information received by the input receiving unit 13. More specifically, the computing unit 14 calculate a consumption tax amount included in a transaction amount and a consumption tax amount to be paid, using the fields of the consumption tax account.

FIGS. 10 and 11 are views for explaining a process performed by the computing unit (assuming a tax rate of 10%).

FIGS. 10 and 11 describe the case of a net price of 100 yen, a tax-inclusive price of 110 yen, and an actual transfer amount of 106 yen, by way of example. In this connection, an identifier is given next to each value, for easy explanation.

The computing unit 14 obtains the total consumption tax amount (z) by calculating a difference (110−100) between the tax-inclusive price (B) and the net price (A). In addition, the computing unit 14 obtains a money tax payment amount (x) by calculating a difference (106−100) between the transfer amount (C) and the net price (A).

In addition, the computing unit 14 obtains a point direct tax payment amount (y) by calculating a difference (106−110) between the transfer amount (C) and the tax-inclusive price (B).

First, the following describes the case of recording in the account information 100 of FIG. 11 using the values indicated in FIG. 10. In FIG. 11, position signs are provided for explanation. It is assumed that the consumer's account information 100 indicates that there is a balance of 200 yen deposited before the transaction.

The computing unit 14 records a transfer amount (c) (106) in the withdrawal field (pb4) of the A section input fields of the actual amount account. The computing unit 14 records the value (94) calculated by subtracting the amount (106) recorded in the withdrawal field (pb4) of the A section input fields of the actual amount account from the amount (200) recorded in the balance field (pc3) of the A section completion fields of the actual amount account, in the balance field (pc4) of the A section input fields.

In addition, the computing unit 14 records a money tax payment amount (x) (6) in the paid tax field (pe4) of the A section input fields of the consumption tax account. The computing unit 14 records the value (−6) calculated by subtracting the money tax payment amount (x) from the tax balance (0) recorded in the tax balance field (pf3) of the A section completion fields of the consumption tax account, in the tax balance field (pf4) of the A section input fields of the consumption tax account.

Speaking of the ultimate consumer, he usually does not directly receive taxes, so a value of 0 is recorded in the deposit and received tax fields (pa5, pa6, and pd6) in the direct tax section of the actual amount account and the consumption tax account. However, when he buys pre-paid points, the purchased points are recorded in the deposit and received tax fields (pa5 and pa6) in the direct tax section of the actual amount account. The computing unit 14 records the value (110−106=4) calculated by subtracting the transfer amount (C) from the tax-inclusive price (B), in each of the withdrawal field (pb6) of the direct tax input fields of the actual amount account and the paid tax field (pe6) of the direct tax input fields of the consumption tax account.

The computing unit 14 records the point direct tax payment amount (y) (−4) in each of the received tax and paid tax fields of the B section paid tax of the consumption tax account.

The following describes how to make a record in the retailer's account information 200.

The computing unit 14 records a consumer's transfer amount (C) (106) in the deposit field (pg4) of the A section input fields of the actual amount account. The computing unit 14 records the value (106) calculated by subtracting the amount (0) recorded in the withdrawal field (ph4) of the A section input fields of the actual amount account from the amount (106) recorded in the deposit field (pg4) of the A section input fields of the actual amount account, in the balance field (pi4) of the A section input fields.

Next, the computing unit 14 records the value (6) recorded in the paid tax field (pe4) of the A section input fields of the consumer's consumption tax account, in the received tax field (pj4) of the A section input fields of the retailer's consumption tax account. The computing unit 14 records the value (0) recorded in the received tax (pd4) of the A section input fields of the consumer's consumption tax account, in the paid tax field (pk4) of the A section input fields of the retailer's consumption tax account. The computing unit 14 records the value (6) calculated by subtracting the value (0) recorded in the paid tax field (pk4) from the value (6) recorded in the received tax field (pj4) of the A section input fields of the consumption tax account, in the tax balance field (pm4) of the A section input fields of the consumption tax account.

Next, the computing unit 14 records the value (110−106=4) calculated by subtracting the transfer amount (C) from the tax-inclusive price (B), in each of the deposit field (pg6) of the direct tax input fields of the actual amount account and the received tax field (pj6) of the direct tax input fields of the consumption tax account. Then, the computing unit 14 records the value (0) recorded in the received tax field (pd6) of the direct tax input fields of the consumption tax account of the account information 100, in each of the paid tax field (pk6) of the direct tax input fields of the consumption tax account and the deposit field (ph6) of the direct tax input fields of the actual amount account in the account information 200. Then, the computing unit 14 records the value (4) calculated by subtracting the value (0) recorded in the withdrawal field (ph6) from the value (4) recorded in the deposit field (pg6) of the direct tax input fields of the actual amount account, in the balance field (pi6) of the direct tax input fields.

Then, the computing unit 14 records the value (4) calculated by subtracting the value (0) recorded in the paid tax field (pk6) from the value (4) recorded in the received tax field (pj6) of the direct tax input fields of the consumption tax account, in the tax balance field (pm6) of the direct tax input fields.

Then, the computing unit 14 records, in the balance field (pi6) of the direct tax input fields of the actual amount account, the value (4) calculated by adding the value (4) registered in the deposit field (pg6) of the direct tax input fields of the actual amount account to the value (0) registered in the balance field (pi5) of the direct tax completion fields of the actual amount account of the account information 200 and then subtracting the value (0) registered in the deposit field (ph6) of the direct tax input fields of the actual amount account from the addition result.

Then, the computing unit 14 records the value (4) calculated by subtracting the value (0) registered in the paid tax field (pk6) from the value (4) registered in the received tax field (pj6) of the direct tax input fields of the consumption tax account of the account information 200, in the tax balance field (pm6) of the direct tax input fields.

Then, the computing nit 14 reads each value from the tax balance fields (pf6) and (pm6) of the direct tax input fields of the consumption tax accounts of the account information 100 and the account information 200, and if the value is a minus value, records the point direct payment amount (y) in the received tax and paid tax fields of the B section paid tax fields, and if the value is a plus value, records the point direct payment amount (y) in the received tax and paid tax fields of the B section received tax fields.

Then, the computing unit 14 generates data to be sent to a tax book.

FIG. 12 is a view for explaining a tax book.

In FIG. 12, a tax book 12*a* is a consumer's tax book, and a tax book 12*b* is a business entity's tax book.

The computing unit 14 calculates the total received tax and the total paid tax (denoted by α and β, respectively) with respect to received taxes and paid taxes of the direct tax and indirect tax of each consumption tax account during a taxable period ((pf11), (pf13), and (pf14), and ((pm11), (pm13), and (pm14) in FIG. 11). Then, the computing unit 14 records the value calculated by subtracting the calculated value β from the calculated value α, in a direct tax total field of information receipt.

More specifically, the computing unit 14 records the tax balance (−6) of the A section input fields of the consumption tax account, in an A section total field (pp2) of the information receipt of the tax book 12*a*.

With respect to the received tax of the consumption tax account, the computing unit 14 records the value calculated by subtracting the value of the B section payment from the value of the B section receipt, in a B amount differential value field (pp3) of the information receipt.

In addition, the computing unit 14 determines whether the value recorded in the A section total field (pp2) of the information receipt is less than zero. If the value recorded in the A section total field (pp2) of the information receipt is less than zero, the computing unit 14 records a value (0) in the actual amount tax due field of a calculation transfer instruction. If the value recorded in the A section total field (pp2) of the information receipt is greater than or equal to zero, the computing unit 14 records that value in the actual amount tax due field (pq5) of the calculation transfer instruction.

In addition, the computing unit 14 determines whether the value recorded in the B section differential value field (pp3) of the information receipt is less than zero. Then, if the value recorded in the B section differential value field of the information receipt is less than zero, the computing unit 14 records a value (0) in a point purchase amount field (pq7) of the calculation transfer instruction. If the value recorded in the B section differential value field (pp3) of the information receipt is greater than or equal to zero, the computing unit 14 records that value in the point purchase amount field (pq7) of the calculation transfer instruction.

Then, the computing unit 14 adds the value (0) recorded in the actual amount tax due field (pq5) of the calculation transfer instruction and the value (4) recorded in the point purchase amount field (pq7). Then, the computing unit 14 records the total value (4) in the received-amount-from-tax-record-book field (pq8). The account information management apparatus 10 transfers the recorded amount (4) from the actual amount account of the consumer's tax record book previously specified, to the tax book actual amount account field (pn8).

Then, if the value recorded in the B section differential value field (pp3) of the information receipt is less than zero, the computing unit 14 records the value obtained by multiplying (pp3) by (−1) in the point clearing amount field (pq6) of the calculation transfer instruction. If the value recorded in the B section differential value field (pp3) of the information receipt is greater than or equal to zero, a value (0) is recorded.

Next, the computing unit 14 subtracts the value (0) of the point clearing amount field (pq6) of the calculation transfer instruction from the value recorded in the balance field ((pc4) in FIG. 11) of the A section input fields of the actual amount account.

Then, the computing unit 14 makes a record in the amount-after-tax-payment field of the T·B (Tax Book). This is because the value calculated by "(received amount from tax record book)−(tax due)" is always zero.

Then, the computing unit 14 transfers the amount (4) determined as a calculation transfer instruction, from the received amount from tax record book (pn8) of the T·B actual amount of the tax book 12*a* to the National Treasury revenue agency's account with a statutory or optional automatic transfer.

After transferring the tax due for the taxable period to the National Treasury revenue agency's account, the computing unit 14 makes a record in the amount-after-tax-payment field of the T·B (Tax Book) actual amount.

The amount indicated in the received-amount-from-tax-record-book field of the T·B actual amount of the consumer's tax book 12*a* is a point purchase amount scheduled to be directly paid after the financial closing. In addition, the amount indicated in the received-amount-from-tax-record-book field of the T·B actual amount of the business entity's tax book 12*b* is the tax due scheduled to be directly paid after the financial closing. In addition, the points subtracted from the business entity's tax record book for the clearing reset is equal to the tax amount that the consumer directly pays.

Heretofore, the operations of the account information management apparatus 10 that do not involve cash have been described.

The following describes a cash withdrawal process using the tax card 300 and ATM 20.

Figure 13:
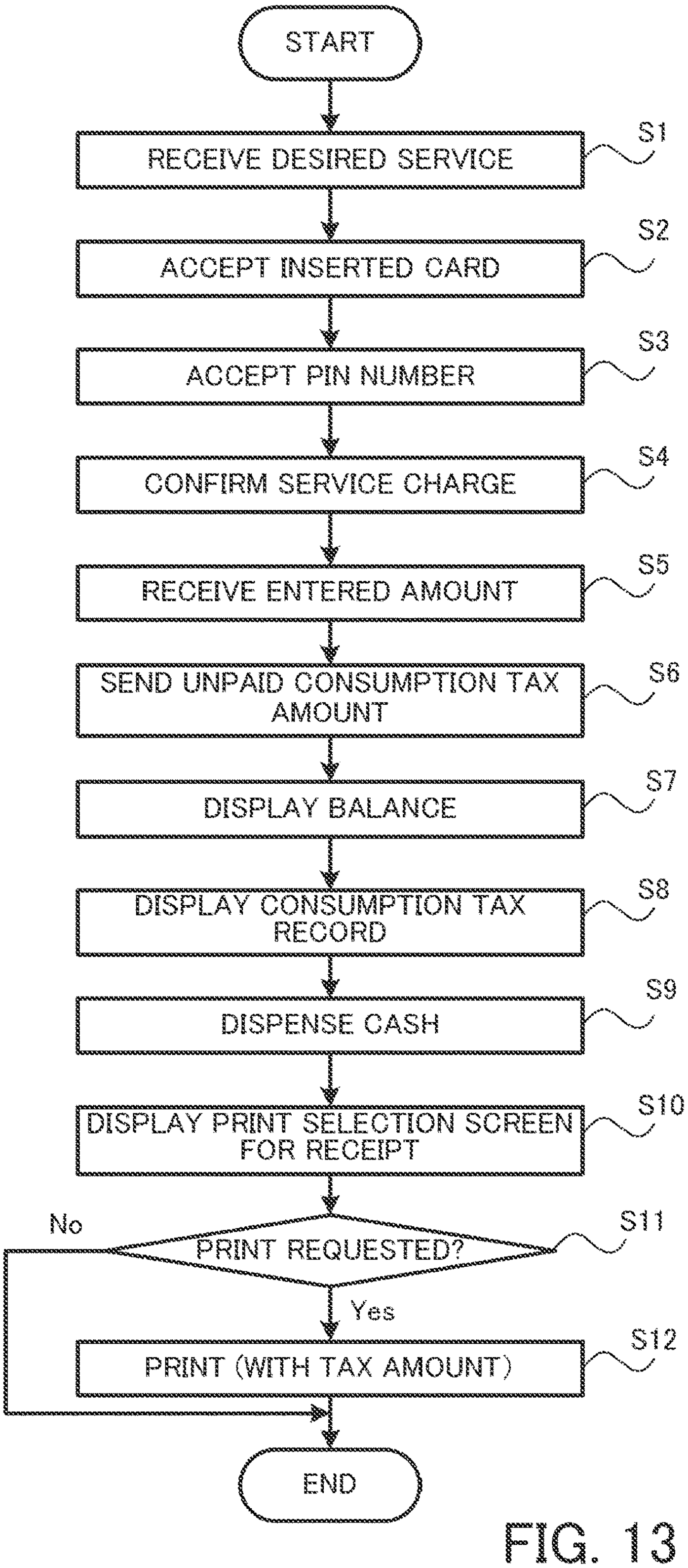
FIG. 13 is a flowchart for explaining a cash withdrawal process.

FIG. 13 is a flowchart for explaining a cash withdrawal process.

(Step S1) For example, by a user touching a screen or by another operation, the ATM 20 displays an initial screen. The initial screen displays text like "please select your desired service" or another. If a cash withdrawal is selected, the process proceeds to step S2.

(Step S2) The ATM 20 displays a screen leading the user to insert his cash card having a tax amount information communication means. When the ATM 20 confirms the inserted cash card, the process proceeds to step S3.

(Step S3) The ATM 20 receives a pin number. When receiving the pin number, the ATM 20 communicates with the account information management apparatus 10 to confirm if the pin number is correct. If the pin number is correct, the process proceeds to step S4.

(Step S4) The ATM 20 displays a confirmation screen for a service charge. Then, the process proceeds to step S5.

(Step S5) The ATM 20 displays an amount input screen. After an amount is entered, the process proceeds to step S6.

(Step S6) The ATM 20 notifies the account information management apparatus 10 of the unpaid consumption tax amount based on the entered amount, in association with account owner's account management information.

The account management information here is that the owner of the inserted cash card has confirmed that the account is his account, using a pin number or palm authentication, or the like, and also confirmed that the entered cash withdrawal amount includes the unpaid consumption tax amount or suspense-payment consumption tax amount (in the case of purchasing points at the same time as the cash withdrawal, to be described later), and further confirmed that the unpaid consumption tax amount or the suspense-payment consumption tax amount (in the case of purchasing points at the same time as the cash withdrawal) is based on the base tax rate.

The activity of this time indicates a fact that the account owner's intention to pay tax or his tax payment is recorded in his account information management apparatus 10.

The account information management apparatus 10 updates the user's account information 100 on the basis of the amount notified of from the ATM 20. Then, the account information management apparatus 10 notifies the ATM 20 of the updated amount.

(Step S7) The ATM 20 displays a balance on the screen. Then, the process proceeds to step S8.

(Step S8) The ATM 20 displays a consumption tax record amount on the screen. Then, the process proceeds to step S9.

Figure 14:
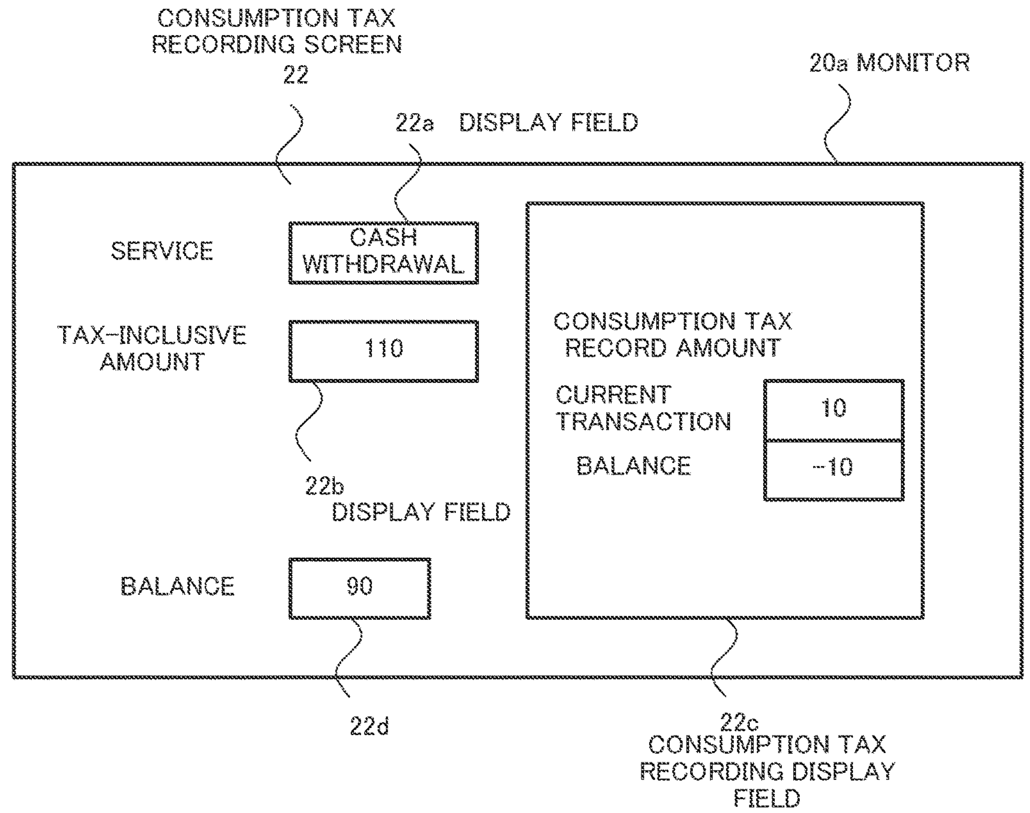
FIG. 14 is a view for explaining a consumption tax recording screen.

FIG. 14 exemplifies the case where a deposit balance is 200 yen, a withdrawn amount is 110 yen, and a base consumption tax rate is 10%.

A consumption tax recording screen 22 displayed on the monitor 20*a* of the ATM 20 includes a display field 22*a* indicating that a cash withdrawal is selected, a display field 22*b* for displaying an amount to be withdrawn from the ATM 20, and a consumption tax recording display field 22*c*. The consumption tax recording display field 22*c* displays a consumption tax amount ("10" in FIG. 14) incurred by the current transaction and the A section indirect tax balance ("−10" in FIG. 14).

Referring back to FIG. 13.

(Step S9) The ATM 20 dispenses the amount displayed on the display field 22*b*. Then, the process proceeds to step S10.

(Step S10) The ATM 20 displays a screen asking the user whether to print a receipt, on the monitor 20*a*. Then, the process proceeds to step S11.

(Step S11) If a print is requested (yes in step S11), the process proceeds to step S12. If a print is not requested (no in step S11), the ATM 20 displays an exit screen. Then, the process of FIG. 14 is completed.

(Step S12) The ATM 20 prints out a receipt on which the current transaction amount and balance, the received and paid consumption tax amounts within a designated period, and a point balance (to be described later) are indicated. Then, the ATM 20 displays an exit screen, and the process of FIG. 14 is completed.

FIG. 15 illustrates account information at the time of completing the transaction of FIG. 14.

In the A section indirect tax fields of the consumption tax account, only the values of the current transaction are recorded. No values are recorded in the direct tax section. This is because, in this transaction, a consumption tax amount to be indirectly paid is included in the withdrawn cash, and the user has operated the ATM 20 to record his intention to indirectly pay the consumption tax by paying cash at a register or the like in later shopping, in his passbook.

The current transaction amount (10) on the consumption tax recording display field 22*c* is recorded in the paid tax field of the A section indirect tax fields of the consumption tax account. The resulting balance amount (−10) is recorded in the balance field of the A section indirect tax fields, and then is displayed in the balance field of the consumption tax recording display field 22c.

Under this recording state, even if the user puts 110 yen, tax included, out of the cash withdrawn from the ATM, in a box of an unattended vegetable sales place in a field to buy a Japanese radish, the consumption tax amount is already recorded in his tax record book.

Note that this situation is applied only to purchase of products with the base tax rate of 10%. In the case of purchasing a product with a tax rate of 20%, like a jewel, he cannot put 1,200,000 yen, tax included, in such a box to buy the jewel. In this case, the tax amount recorded in his tax record book is 109,090.9 yen. Therefore, it is necessary to record an additional tax amount of 90.909.1 yen, which is a differential amount from the tax rate of 20%, electronically, at a register of the jewel shop.

This process is so-called "correction", and a tax card is used to communicate the tax amount correction information. This means may be provided in a cash card or may be a tax-dedicated card. If there is an ATM that is able to read characters via non-contact IC or optically, a barcode may be printed on a receipt.

Fields for recording a tax amount correction amount that may be needed at the time of purchasing a taxable product with a tax rate other than the base tax rate, in cash are "fields for correcting recorded tax amount at the time of cash transaction" in the account information C section.

As described above, with the account information management system 1, a business entity which is a consumption tax payer is able to automatically record the consumption tax due in their tax deposit account. As a result, it is possible to achieve tax calculation to calculate the consumption tax due, which is fixed per designated period, by subtracting the paid consumption tax amount from the received consumption tax amount.

Therefore, the taxable business entity, which has liability to pay tax, is able to automatically prepare the tax due in the tax deposit account.

In addition, a taxpayer who is a tax bearer is able to record a paid tax amount in his saving account and tax deposit account.

If the National Taxation Bureau investigates if a proper consumption tax payment is done, the consumption tax payer positively discloses the details of transactions with transaction parties to the National Taxation Bureau, using numerical values and information recorded in the financial institution, together with private invoices, to prove the proper tax payment.

In this way, in the case where the National Taxation Bureau investigates declaration of a consumption tax, they are able to confirm the basis of the tax amount calculation for transactions and the fact of tax payment, with respect to both the tax bearer and the taxpayer. That is to say, since the taxable business entity needs to indicate a net price and a tax-inclusive price on an invoice, it means that the basis of the tax amount calculation is provided to a consumer or transaction party. Further, by entering invoice information, such as an invoice number, the payer is able to specify the transaction amount.

The invoice here is data that is usable as a basis of tax amount calculation, and for example, is information including a combination of the following (1) to (4).

(1) A transaction party's account number of a financial institution (already exist).

(2) Location information of a shop, office, individual or the like that receives payment (already exist).

(3) Information such as an invoice number, shipment number, or others of a transaction product (this has been incorporated in the 6th system that was launched by Japanese Bankers Association in 2011).

(4) Information associated and recorded in the recording apparatus of a financial institution at the time of cash payment at a register.

The above-mentioned private invoice may be treated as an official invoice if it is certified by Law.

On the basis of such an association, the fact that a payer enters a net price and a tax-inclusive price at a financial institution is definitely recorded as a proof of his intention to pay the consumption tax for the transaction.

If a consumer pays a tax to a taxable business entity and the business entity that receives the tax declares a gross profit less than the actual profit, part of the consumption tax amount that the consumer has paid remains in taxable business entity's hand.

On the other hand, in the account information management system 1 of the embodiment, if a transaction is made via a financial institution, a consumer is able to record a paid tax amount in a business entity's deposit record by entering tax amount information to an ATM at the time of a transaction. This makes it possible to reduce a failure of taxation.

In addition, the business entity is able to automatically pool a consumption tax amount to be paid, in their tax record book.

In addition, a consumer, who is a tax bearer, is able to confirm the consumption tax amount he has paid, using his tax record book. Further, the National Taxation Bureau is able to stop the business entity from delinquency or delay in tax payment.

By the way, individuals and business entities who use tax record books are each able to receive or pay taxes in cash or using points, as described earlier.

The business entities are each able to receive tax amounts using points or in cash, according to consumer's desires. The consumers are each able to entrust business entities with the tax payment using points or in cash, according to business entity's desires. The ratio of point payment and cash payment may be desirably determined.

A functional feature of this system is to provide virtual tax amount record fields, in addition to the conventional account record fields.

This virtual tax amount record fields are usable to record tax amounts incurred in transactions, in a form corresponding to a tax payment method selected by a user.

This system provides two forms for taxpayer-desired tax amount recording. One of the forms is for an indirect tax payment method and the other is for a direct tax payment method. The indirect tax payment method has the same mechanism as the current consumption tax and legislative system of Japan. For this scheme, product buyers are able to record paid tax amounts in their own passbooks. Product suppliers record tax amounts received from buyers, and offset them with their own paid tax amounts, and separately record consumption tax dues in their tax books.

The direct consumption tax payment method is not for tax payments via business entities, which is applied for bath taxes, golf course taxes and others, but for directly transferring tax dues from people who buy taxable products to the National Treasury revenue agency's account.

At present, there are no countries in which consumption taxes are payable with this scheme. This scheme, however, becomes usable by the implementation of this system.

For this scheme, both tax payment and receipt for a purchase price are recorded in accounts.

In addition, if an environment for implementing the point tax payment is not ready at the time of the initial stage of the implementation of this system, only the indirect tax payment method is operable.

This system that provides such an advantage that taxpayers are able to desirably select an indirect consumption tax payment method as described above is sufficiently superior in the adaptability to social-economic environment. For example, this system is operable with both the conventional account passbooks and this system-based passbooks together.

To achieve the combined direct-indirect consumption tax payment makes it possible to resolve various issues that the existing consumption tax system has.

A: Issues to be solved in a scheme only employing the indirect tax payment method.

1. It is possible to introduce multiple tax rates even at the operational stage of only the indirect tax payment.

2. Deferred payment is prevented. Consumption tax dues are automatically kept in tax books.

3. Declaration with some of a sales amount excluded is impossible, except for cash settlement. This is the same as the existing account bookkeeping.

4. Payers' intention to pay taxes is not extinguished but is used as a basis of tax amount calculation at the stage of consumption tax declaration.

5. By compiling paid consumption tax amounts recorded in the indirect tax payment record fields for each financial institution branch, it is possible to identify the locations where the local consumption taxes are collected, for each location of financial institution branches of account users.

6. An intention to pay taxes at purchase, from net prices becomes a common sense, and therefore it is possible to shift tax amounts to prices.

7. By adjusting a taxable period for tax-exemption business entities, it is possible to eliminate tax-exemption measures. For example, a tax amount reaching 100,000 yen causes liability to declare the tax, which resolves unfairness in tax payment liability due to a large amount of sales.

8. It is possible to eliminate the deemed stocking rate of the simplified tax system and, as a general rule, apply the tax calculation to all declarations of consumption tax.

B: Various issues to be solved and various reforms to be implemented in a scheme employing the combined direct-indirect tax payment method.

9. In the case of the direct consumption tax payment method, a payment receiving party is able to collect taxes even if the party is not a consumption tax payer. It is possible to subject taxation to consumer-to-consumer transactions.

10. A burden of consumption tax on export business entities, tax exemption business sections, and low-income people is released by a direct supply of points from the government.

11. The direct consumption tax payment method enables the National Treasury to collect tax amounts without fail.

12. By measuring the ratio of consumption to income, it is possible to vary a consumption tax rate from person to person.

13. By providing different tax rates for the indirect consumption tax rate and the direct consumption tax rate, it is possible to desirably control the ratio between the direct tax and the indirect tax.

14. By politically dividing a period and lowering the point conversion rate depending on the divisions, it is possible to set a low tax rate week or the like during a long vacation or the like.

15. Since the tax record becomes clear on the same day, it is possible to obtain policy decision indexes immediately.

16. It is possible to collect consumption taxes for imported products from overseas, at financial institutions to which payments are made.

17. As the use of the direct consumption tax payment method increases, more tax amount is collected definitely, which may lead to a decrease in the consumption tax rate.

18. There may be small business entities and business that cannot make good use of the point system by any means. For example, there are an elderly person that sells vegetables he grows in front of his house, a person who polishes shoes in front of a station, a peddler, and a person that sells on a spot together with others, and so on. Since such business styles are the origin of the primitive market, it is desirable to apply tax exemption to these business styles. However, the consumption tax is already incurred in the cost for producing products. The countermeasures against this problem is to provide a mobile telephone with a card writer. Alternatively, a non-contact IC may be built in a mobile telephone. Alternatively, the use of the existing cash settlement does not cause any problems.

19. To divide points in the case where the sales amount of spot sales includes the points and joint tenants calculate the sales together, all of the sales amount need to be deposited to a financial institution once and then the points need to be divided according to the sales ratio. Even in the case of business transactions that are difficult to be grasped in the current system, it is possible to apply the taxation to them. The use of the existing cash settlement does not cause any problems.

APPLICATION EXAMPLE

The following describes an application example of the account information management system 1.

The National Taxation Bureau assigns an individual number to each tax book. The National Taxation Bureau grasps the taxable income, which is after deductions, for each individual number from the declaration of the income tax.

A third-party institution other than the National Taxation Bureau, Financial institutions, and account users obtains information about "individual number and taxable income amount" from the National Taxation Bureau.

The third-party institution obtains information about "individual number and paid consumption amount" indicated in tax books from financial institutions.

The third-party institution determines the consumption tax rate corresponding to a ratio of the consumption amount to the income amount, for each individual number by using equations to be described below by way of example.

As a result, it is possible to apply progressive consumption tax rates to individuals.

FIGS. 16A, 16B and 16C are views for explaining an application example.

A table T1 illustrated in FIG. 16A is used for setting progressive consumption tax rates for individuals. The table 1 includes the following fields: Income for Previous Year, Consumption Amount for Previous Year, Saving Rate, Progressive Consumption Tax Rate, Total Direct-Indirect Consumption Tax Amount, Already-Paid Consumption Tax Actual Amount, Progressive-Standard Ratio, Additional Progressive Consumption Tax Amount, Received Amount from Tax Record Book, and Final Tax Amount.

The Income for Previous Year field indicates the income amount for the previous year, provided by the National Taxation Bureau.

The Consumption Amount for Previous Year field indicates the consumption amount for the previous year, provided by a financial institution.

The Saving Rate field indicates a saving rate obtained based on the income amount and consumption amount for the previous year, detected by the third-party institution, and a saving rate obtained from a table T2 illustrated in FIG. 16B. The saving rate is calculated by "1−{(consumption amount for previous year)÷(income for previous year)}". For example, in the case of the example of FIGS. 16A, 16B, and 16C, where an income for previous year is "1000" and a consumption amount for previous year is "200", the saving rate is calculated as 1−(200÷1000)=0.8.

The progressive consumption tax rate is a value determined from the saving rate and the table T2 illustrated in FIG. 16C. In the example of FIGS. 16A, 16B, and 16C, the saving rate is 0.8, and therefore, the progressive consumption tax rate is 0.2.

In this connection, by setting a higher consumption tax rate (progressive consumption tax rate) for a higher saving rate, as illustrated in FIG. 16B, it is possible to resolve the issue of regressivity regarding the consumption tax rate.

The Total Direct-Indirect Consumption Tax Amount field indicates the sum (6)+(4) of values recorded in the A section total of the information receipt of the tax book and in the direct tax total of the information receipt.

The Already-Paid Consumption Tax Actual Amount field indicates a value obtained by inverting the plus or minus sign of the total consumption tax amount for the current year.

The Progressive-Standard Ratio field indicates a value (for direct and indirect taxes) obtained by subtracting the standard tax rate (0.1) from the progressive consumption tax rate.

The Additional Progressive Consumption Tax Amount field indicates a value obtained by multiplying the already-paid consumption tax actual amount by the progressive-standard rate.

In the Received Amount from Tax Record Book field, the same amount as the Additional Progressive Consumption Tax Amount field is entered. Then, a transfer instruction is issued to the tax record book, and the amount is transferred to the tax book.

The Final Tax Amount field indicates the sum of the already-paid consumption tax actual amount and additional progressive consumption tax amount.

A view FIG. 16C illustrates actual amount accounts before and after application of progressive taxation. A withdrawal field of the actual amount account after the application of progressive taxation indicates an additional progressive consumption tax amount of "10". As a result, the balance is "80".

In this connection, the "additional progressive taxation" may indicate an additional progressive taxation with regard to a saving rate for a year previous to a taxable period, as described above, or may indicate an additional progressive taxation with regard to a determined saving rate during the taxable period after the financial closing for the taxable period is complete.

Note that for those who have low saving rates, a method of depositing consumption tax points from the government to the actual amount accounts of their tax books in the beginning may be considered.

Second Embodiment

An account information management system of a second embodiment will now be described.

Hereinafter, differential features of the account information management system of the second embodiment from the account information management system of the above-described first embodiment will mainly be described, and identical features will not be described again.

In the first embodiment, deposits and withdrawals via the ATM 20 in the account information management system have been described. A differential feature of the account information management system of the second embodiment from the first embodiment is that it is possible to manage account information using registers.

A register of this embodiment has the following six functions.

(i) A conventional register function.

(ii) A calculation function for tax amount correction.

(iii) A tax amount information output device provided as a means for recording information in tax record books.

(iv) A function of integrating paid and received points for consumption taxes and recording the results in own and another's tax record books.

(v) A function of recording tax amount information of products with different tax rates.

(vi) A function of setting a base tax rate when the register is powered on.

FIG. 17 is a view for explaining functions of a register according to the second embodiment.

A register registers entered information in an input information management table T3, and registers information to be output, in an output information management table T4.

The input information management table T3 provided in the register includes the following fields: Base Tax Rate, Net price, Tax-inclusive Price, Received Amount at Register, Point Balance, and Received Points.

The Base Tax Rate field indicates a standard tax rate under the Consumption Tax Law, that is, a tax rate (10% in this embodiment) that is used for the most products, as a base tax rate.

The Net Price field indicates a taxable amount or a non-taxable amount for the consumption tax, which is an entity's profit plus a cost price of a sold product.

The Tax-inclusive Price field indicates a tax-inclusive price after application of a tax rate set for the product under the Consumption Tax Law.

The Received Cash Amount field indicates the amount of cash put at the register at the time of payment.

The Point Balance field indicates the number of points written in a recording device installed in a tax card.

The Received Points field indicates points received by the business entity.

The output information management table T4 includes the following fields: Base Tax Rate, Correction Index, Received Tax Amount in Cash, Correction Tax Amount, and Shift Points.

The Base Tax Rate field indicates a standard tax rate determined based on operational tax rates under the Consumption Tax Law.

The Correction Index field indicates a value calculated by "{(base tax rate)+1}÷(base tax rate)". In this embodiment, this value is calculated as (0.1+1)÷0.1=11. Setting a correction index in this way eliminates the necessity of a correction process using the register for the case where a consumer pays the tax-inclusive price of a product with the base tax rate, all in cash. Therefore, it is possible to relieve a processing burden on both the seller and the buyer.

The Received Tax Amount in Cash field indicates the amount paid by the consumer in cash, out of the consumption tax amount. More specifically, the amount calculated by subtracting the net price from the received cash amount is registered. In this embodiment, this amount is calculated as 1040−1000=40. The product buyer is able to set a desired amount as a value of the Received Amount at Register" field, between 1000 and 1100.

The Correction Tax Amount filed indicates the value calculated by "(received tax amount in cash)−{(received cash amount)÷(correction index)}". In this embodiment, the value is calculated as 40−(1040÷11)=−54.5.

The Shift Points field indicates the amount that the consumer does not pay in cash out of the consumption tax amount. More specifically, this amount is calculated by "(tax-inclusive price)−(received cash amount)". In this embodiment, the amount is calculated as 1100−1040=60.

Figure 18:
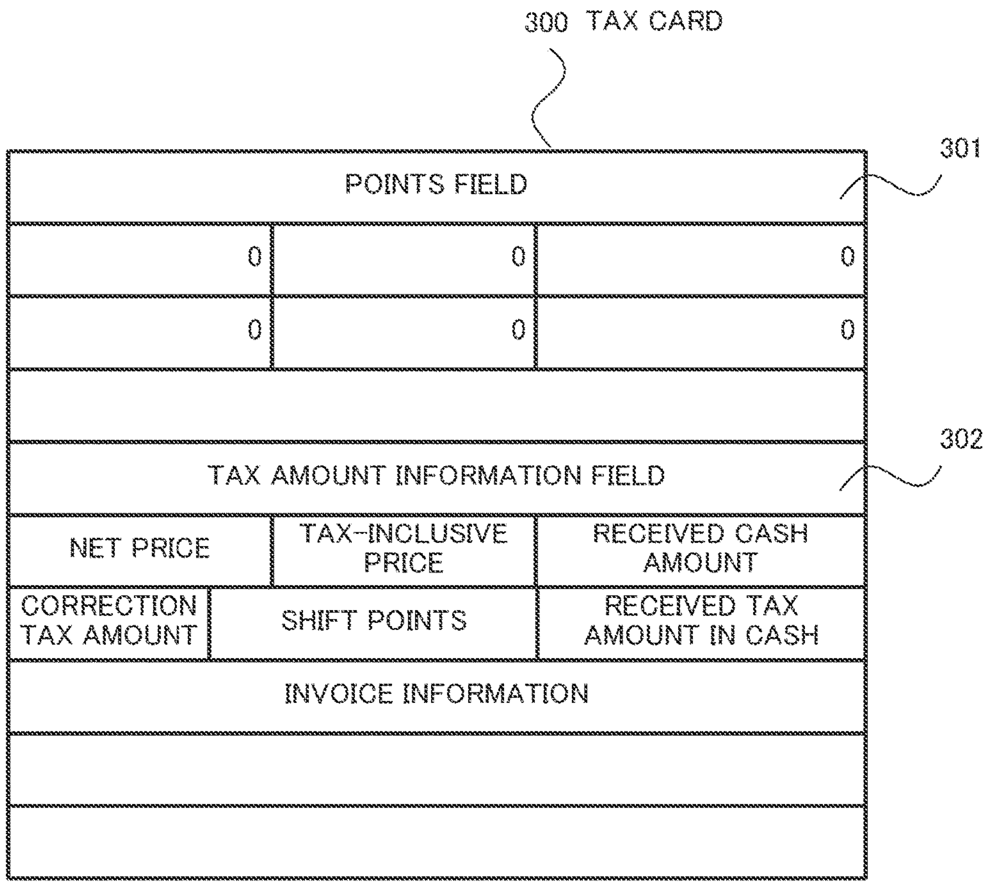
FIG. 18 is a view for explaining a tax card.

FIG. 18 is a view for explaining a tax card.

A tax card 300 used in this system has a structure that is common to all tax cards used by people, from ultimate consumers to business entities which produce and sell taxable products, and also has a record transmission function.

When making a cash transaction, a user of the tax card 300 uses this tax card 300 to pay or receive a consumption tax amount using points. In addition, the user is able to pay part or all of the consumption tax amount via a credit company or financial institution, not via a taxpayer business entity.

The tax card 300 includes a points field 301 corresponding to an amount recorded in the direct tax section 100*b* of the actual amount account.

The tax card 300 also includes a tax amount information field 302. In the tax mount information field 302, a net price, a tax-inclusive price, a received cash amount, a correction tax amount, shift points, and a received tax amount in cash are recorded.

A customer who is a user of this tax card 300 uses an ATM to shift his points recorded in the direct tax section 100*b* of the actual amount account to the received tax field of the points field 301. The register side records the points received at the register, in the paid tax field of the customer's points field 301. At the same time, the register side records the net price, tax-inclusive price, received cash amount, correction tax amount, shift points, and received tax amount in cash in the tax amount information field 302 of the customer's tax card 300.

The received points are recorded in the points field 301 of the shop's tax card 300 inserted in the register. In the tax amount information field 302 of the shop's tax card 300, the net price, tax-inclusive price, received cash amount, correction tax amount, shift points, and received tax amount in cash are recorded.

In this connection, although not illustrated in the tax card 300 of FIG. 18, shop information, such as a shop name or a register number, which is invoice information is further registered in the customer's tax card 300.

As the invoice information registered in the tax card 300, there is a portion to be recorded by the transaction party's register, and a consumption tax payment method in the own tax book is recordable as well. Using the values recorded in the A section total (pf11) of the consumption tax account and the B section differential value (pf13) of the consumption tax account, illustrated in FIG. 11, which are two items indicating whether an actual amount payment was made for an indirect tax or not and whether a point clearing tax payment was continuously made, when declaration and payment of consumption taxes for a previous taxable period was made, it is possible to determine whether the card owner is an ultimate consumer or a business entity which produces or sell products and then to record this information in the tax card 300.

In the case of a consumer, it is not needed to disclose the consumer's specific location information and tax card number (individual number-associated number or another) to the transaction party's register. In the case of a business entity, it may be possible to disclose its specific location information, tax card number, and others to the transaction party's register. The reason why the business entity's location information needs to be given to the transaction party is because the source who actually pays the tax amount at the register in cash or using points is an ultimate consumer, and a tax amount that the business entity pays at the production and distribution stages is recorded in the tax record book as an amount received as a deposit from the ultimate consumer.

In the case of using the register of the second embodiment, a correction amount is recorded in the account information C section 100*d*.

The account information C section 100*d* is for adjusting a differential tax amount from the amount recorded in the A section, caused due to multiple tax rates at the time of a cash transaction, a direct tax payment for a consumption tax made by the ultimate consumer at the time of a cash transaction, and a combined direct-indirect tax payment using cash.

A value recorded in the "fields for correcting recorded tax amount at the time of cash transaction" is calculated by the following equation, "(received tax amount in cash)−{(received cash amount)÷(correction index)}". This is usable for the following exemplary case.

In the case of an account-to-account transaction, a net price, a tax-inclusive price, and a transfer amount are entered separately, and therefore the account information C section 100*d* is not used. However, in the case of a cash transaction using a register, a net price, a tax-inclusive price, and a transfer amount are not paid separately. The sales amount as net prices and received tax amounts in cash, which are stored in the register, the integrated received points registered in the tax card 300, and the integrated correction amount recorded in the register or the like are fixed after the business hour ends.

It is assumed that an integrated received points are 60 points and an integrated correction amount registered in the register is −54.545454, a minus value. In the case where the cash sales amount in the register is 1040 yen, (Calculation method 1) the received tax amount in cash (40) is calculated by "{(cash amount in register)÷(correction index of 11)}+(Correction amount); (Calculation method 2) the received points (60) are calculated by "(integrated correction amount)×{(correction index)×−0.1}; and (Calculation method 3) the net price (1000) is calculated by "(cash amount in register)−(received tax amount in cash)". Therefore, it is easy to compare these values against sales materials, numerical value records, recorded in the shop.

The purposes of this system are to make it possible to easily record the payments and receipts of consumption tax amounts in account books and calculate the tax dues, and to store fair tax dues on the basis of the tax amount calculation records in the accounts. In addition, it is possible to allow ultimate consumers to directly pay consumption tax dues to the National Treasury, have points issued on security of the paid direct tax amounts, and use the points to pay the additional value tax caused at the market circulation stage. The preconditions for explaining the account information C section 100*d* include the following concepts.

(Concept 1) All payments in cash in the market include consumption taxes to be paid.

(Concept 2) Deposit amounts in a bank also include consumption taxes to be paid.

(Concept 3) In the case of account-to-account settlement, it is possible to record a tax amount separately, without fail, by specifying and transferring a tax-inclusive net price.

(Concept 4) All of cash that flows in the market are withdrawn at financial institutions.

(Concept 5) Provisional bookkeeping is made with a base tax rate that may be equivalent to a rate for consumption of cash, at the time of deposit and withdrawal in cash at a financial institution.

(Concept 6) In actual, there are multiple tax rates, including non-taxable, untaxable, tax exemption, and zero tax rate.

(Concept 7) Functions for adjusting the tax rates in the system are the tax card 300 and the account information C section 100*d*.

(Concept 8) The tax amount adjustment has the same functional structure as the tax amount adjustment for the direct tax payment made by consumers, and makes it possible to record correct tax amounts easily.

FIG. 19 is a view for explaining an account information C section.

In the case of a consumption tax rate of 10%, a withdrawn cash amount is subjected to the base tax rate of 10%. Irrespective of a cash deposit or withdrawal of a transaction amount, the amount calculated using the base tax rate is recorded in the account information A section 100*a* of the consumption tax account. This recorded amount is one eleventh the withdrawn cash amount.

With respect to the A section indirect tax fields, in the case of an account-to-account transfer, tax amounts for the direct and indirect tax payments are specified. However, at the time of cash withdrawals, the base tax rate is applied, as described above. The base tax rate is applied for cash deposits. However, if a paid net price, an indirect tax payment amount, and a direct tax payment amount are specified and recorded in the tax card by a register, it is possible to specify the tax amount, just as in the account-to-account transfer.

In the case of making a direct tax payment at the time of a cash withdrawal, a tax amount is recorded as points in the actual amount direct tax payment amount record field. That is to say, out of the amount withdrawn from the account information A section 100*a* of the actual amount account, the points equivalent to the 10% of the withdrawn amount are recorded in the actual amount direct tax section 100*b* at the same time.

In FIG. 19, a register is interposed between the account information 102 and the account information 202. As preconditions, a product with a net price of 100 yen and a tax rate of 10% is purchased, and the net price is paid in cash. The withdrawn amount is 100 yen, points charged in the tax card are 10 points, and a transfer tax payment to T·B is made after the taxable period ends. Note that one eleventh is recorded in the A section, and the points for the direct payment are one tenth the withdrawn amount.

In FIG. 19, a hatched white portion (pa5) is a proof of a point purchase. If the consumer inserts the tax card 300 into the ATM 20 at the time of a cash withdrawal, the points are charged in the card and the point balance becomes zero. If the consumer does not desire to charge points in the card, the points remain in the tax record book.

The account information C section 100*d* is for adjusting a difference in tax amount by a calculation using a correction index. This difference is caused when a direct tax payment, indirect tax payment, or combined direct-indirect tax payment, at multiple tax rates, is made in cash.

More specifically, the received tax and paid tax fields of the account information C section 100*d* of the consumption tax account are record fields used when a tax amount is corrected for a cash transaction. The tax balance field (pf9) of the account information C section 100*d* of the consumption tax account is to record a correction amount before the transaction, and the tax balance field (pf10) of the account information C section 100*d* of the consumption tax account is to record a differential amount from an actual amount for adjustment due to the multiple tax rates applied for the current transaction, direct tax payment, indirect tax payment, combined direct-indirect tax payment, and others. Further, a correction amount obtained by subtracting a value recorded in the paid tax field from a value recorded in the received tax field is recorded in the C section correction value field of the information receipt of the tax book in the lower table. After that, {(the value in A section)−(the value in C section)} is calculated, and the correct tax amount is recorded in the actual amount tax due field of the calculation transfer instruction.

The following describes a transfer process using the ATM 20.

Figure 20:
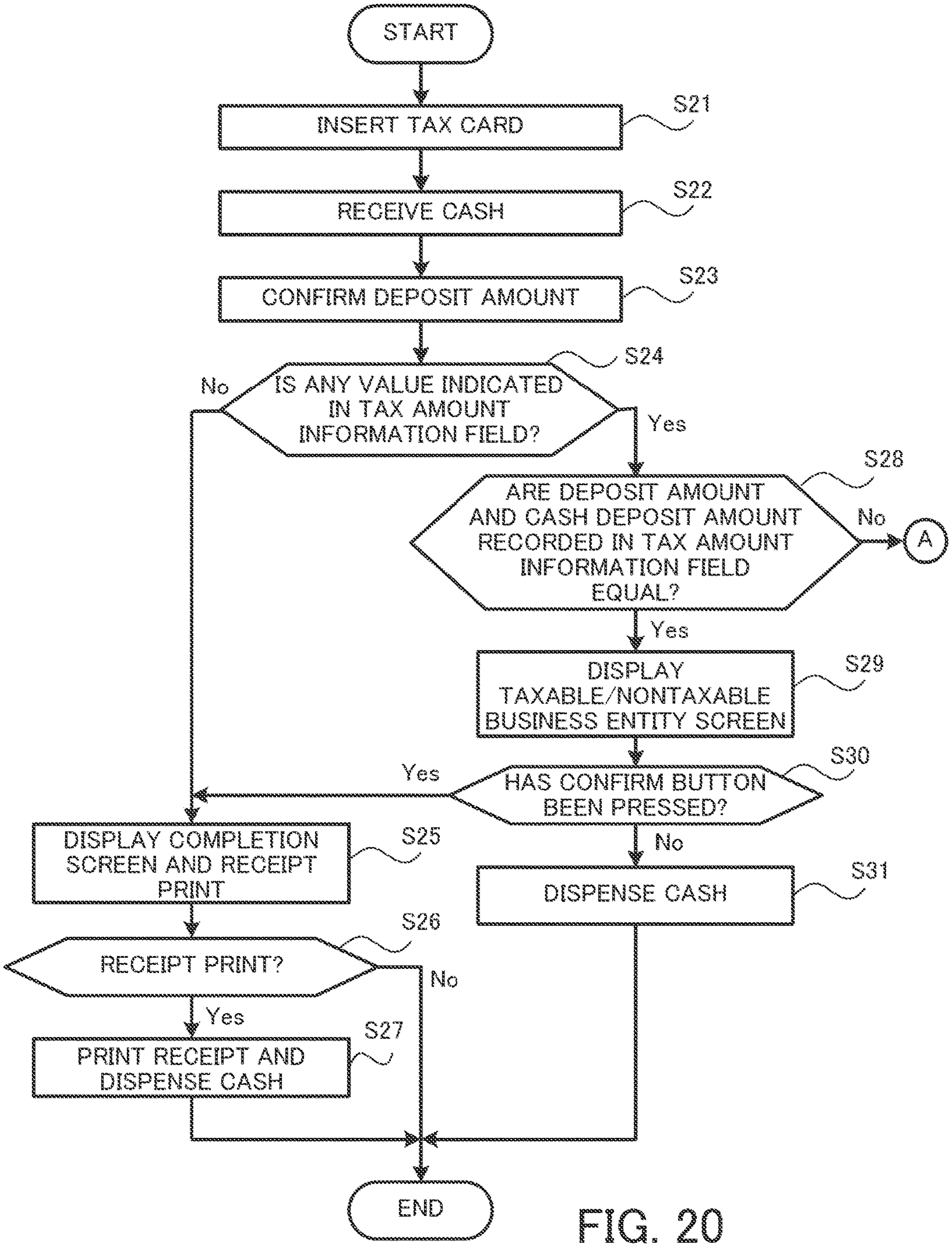
FIG. 20 is a flowchart for explaining a deposit process using an ATM.
Figure 21:
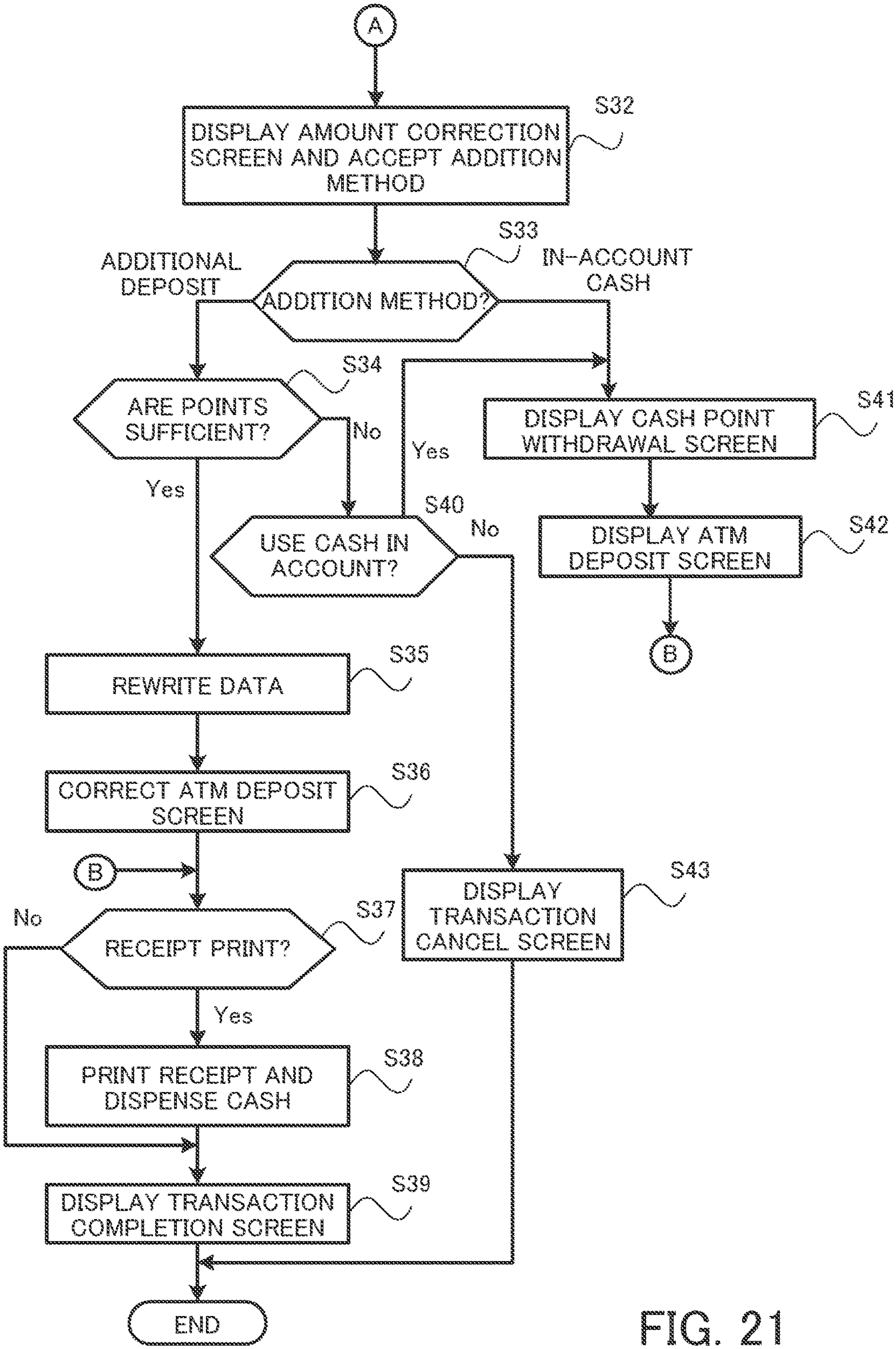
FIG. 21 is the flowchart for explaining the deposit process using the ATM.

FIGS. 20 and 21 are a flowchart for explaining a deposit process using an ATM.

In this connection, description for communication of information between the account information management apparatus 10 and the ATM 20 will be omitted in the following.

(Step S21) For example, when the screen of the ATM 20 is touched, for example, the ATM 20 displays an initial screen. The initial screen displays text "please insert a tax card", etc., to promote the insertion of a tax card 300. When the tax card 300 is inserted, the process proceeds to step S22.

(Step S22) The ATM 20 opens its cash slot and waits for the insertion of cash. When cash is inserted, the process proceeds to step S23.

(Step S23) The ATM 20 confirms the deposit amount. Then, the process proceeds to step S24.

(Step S24) The ATM 20 determines whether any numerical value is recorded in the tax amount information field 302 (FIG. 18) of the tax card 300. When any received indirect tax amount or received points are not recorded in the tax amount information field 302, the amount is not taken as a product sales amount made by the business entity, but is taken as cash whose transfer source is unknown. Then, the process proceeds to step S25. When a numerical value is recorded in the tax amount information field 302 (yes in step S24), the process proceeds to step S28.

(Step S25) The ATM 20 displays a completion screen and a receipt print screen. Then, the process proceeds to step S26.

(Step S26) The ATM 20 determines whether a receipt print button has been pressed or not. If the receipt print button has been pressed (yes in step S26), the process proceeds to step S27. If the receipt print cancel button has been pressed (no in step S26), the process of FIG. 19 is completed.

(Step S27) The ATM 20 prints a receipt. Then, the process of FIG. 19 is completed.

(Step S28) The computing unit 14 determines whether the deposit amount and the cash deposit amount recorded in the tax amount information field 302 are equal. If the deposit amount and the cash deposit amount recorded in the tax amount information field 302 are equal (yes in step S28), the process proceeds to step S29. If the deposit amount and the cash deposit amount recorded in the tax amount information field 302 are not equal (no in step S28), the process proceeds to step S32.

(S29) The ATM 20 displays a taxable/non-taxable business entity screen. Then, the process proceeds to step S30.

Figure 22:
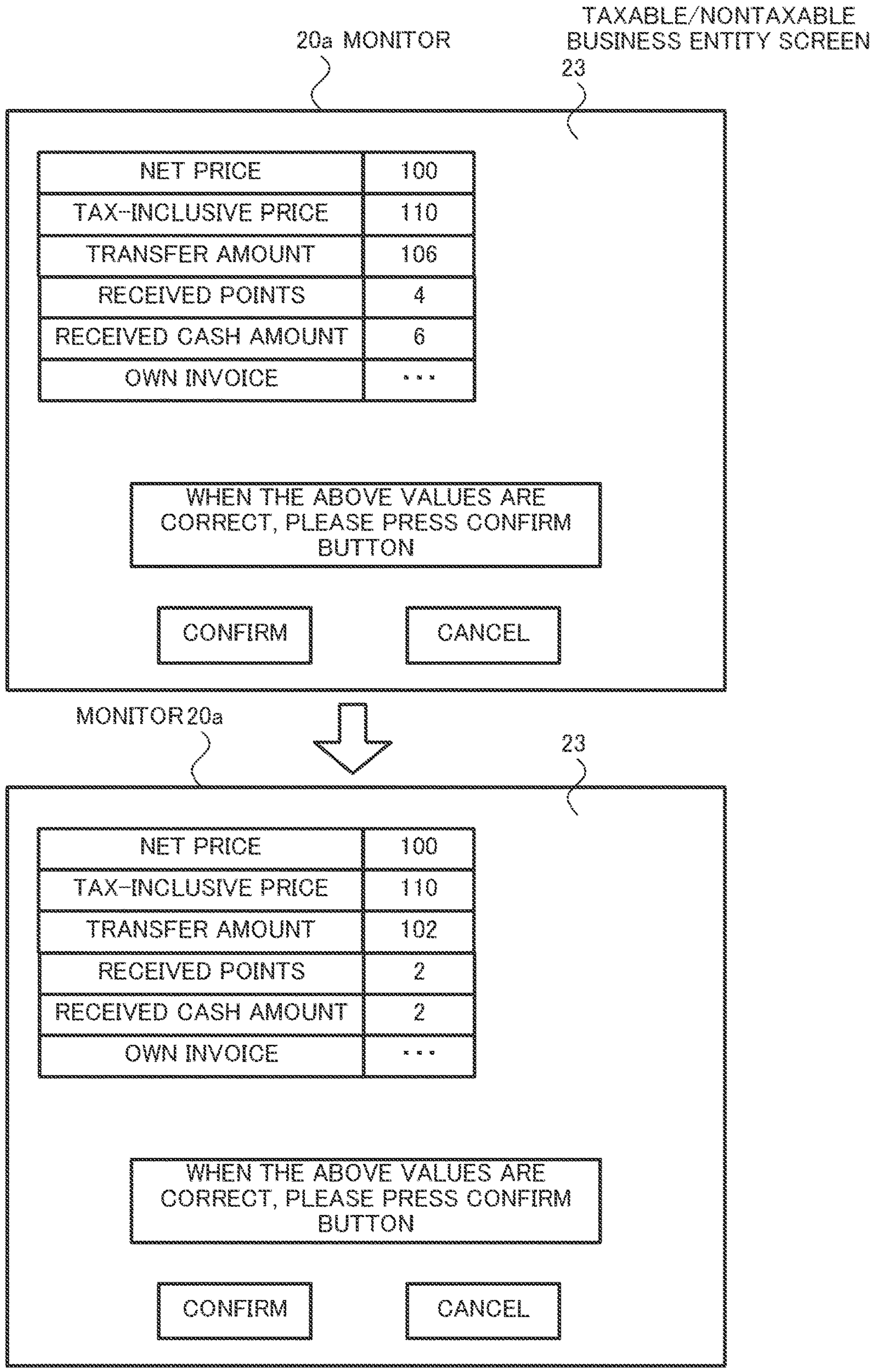
FIG. 22 is a view for explaining a taxable/non-taxable business entity screen.

FIG. 22 is a view for explaining a taxable/non-taxable business entity screen.

A taxable/non-taxable business entity screen 23 includes the following fields: Net price, Tax-inclusive Price, Transfer Amount, Correction Tax Amount for Customer, Received Points, Received Cash Amount, and Own Invoice.

The Received Points field displays points that a customer paid as a tax payment.

The Received Cash Amount field displays the cash amount that the customer paid as a tax payment.

The Own Invoice field displays information on the aforementioned invoice.

Referring to the taxable/non-taxable business entity screen 23 illustrated in the lower portion of FIG. 22. For example, in the case where the total received amount is 102 yen and there are two points after 4 yen in cash and 2 points are used for expenses, such as stock purchase, during the business hours of the shop, the total received amount is corrected to 102 yen, and the received points are corrected to 2 points. This operation results in recording the insufficient received tax amount. That is to say, the tax amount of 4 yen is recorded for the net price of 100 yen, and the insufficient received tax amount of 6 yen occurs. It may be possible to record such an insufficient amount. However, the received tax amount needs to be corrected using a voucher or account book, outside this system. This correction is achieved by performing a procedure starting at step S32 for an in-account deposit and an additional deposit of own points.

Referring back to FIG. 20.

(Step S30) The ATM 20 determines whether a confirmation button on the taxable/non-taxable business entity screen has been pressed or not. If the confirmation button has been pressed (yes at step S30), the process proceeds to step S25. If a cancel button has been pressed (no in step S30), the process proceeds to step S31.

(Step S31) The ATM 20 dispenses cash. Then, the process of FIG. 19 is completed.

(Step S32) The ATM 20 displays an amount correction screen, and accepts specification of an addition method. Then, the process proceeds to step S33.

(Step S33) When accepting the specification of an addition method, the computing unit 14 determines whether the addition method is an additional deposit or in-account cash. If the addition method is the additional deposit (additional deposit in step S33), the process proceeds to step S37. If the addition method is in-account cash (inter-account cash in step S33), the process proceeds to step S41.

(Step S34) The ATM 20 receives additional deposit. If a deposit is made, the computing unit 14 determines whether points are sufficient as a result of the deposit. If the points are sufficient (yes at step S34), the process proceeds to step S35. If the points are still insufficient (no at step S34), the process proceeds to step S40.

(Step S35) The computing unit 14 rewrites data. Then, the process proceeds to step S36.

(Step S36) The ATM 20 corrects and displays the ATM deposit screen. Then, the ATM 20 displays a receipt print/non-print screen. Then, the process proceeds to step S37.

(Step S37) If the receipt print button has been pressed (yes at step S37), the ATM 20 proceeds the process to step S38. If the receipt no-print button has been pressed (no at step S37), the process proceeds to step S39.

(Step S38) The ATM 20 prints and outputs a receipt. Then, the process proceeds to step S39.

(Step S39) The ATM 20 displays a transaction completion screen. Then, the process of FIG. 21 is completed.

(Step S40) The ATM 20 displays buttons indicating whether to use cash deposited in the account. If the button indicating the use of cash deposited in the account has been pressed (yes at step S40), the process proceeds to step S41. If the button indicating non-use of cash deposited in the account has been pressed (no at step S40), the process proceeds to step S43.

(Step S43) The ATM 20 displays a transaction cancel screen. Then, the process of FIG. 21 is completed.

(Step S41) The ATM 20 displays a cash point withdrawal screen. Then, the process proceeds to step S42.

(Step S42) The ATM 20 displays an ATM deposit screen. Then, the process proceeds to step S37.

FIGS. 23A, 23B, and 23C are views for explaining business entity's account information for the time of making an additional deposit.

Account information 200 of FIGS. 23A, 23B, and 23C represents an example where an insufficient total withdrawn amount and a consumption tax amount involved in a cash withdrawal are recorded in the consumption tax account.

In the process of FIGS. 20 and 21, if cash is extracted from a register in an analog fashion, an amount for an insufficient amount or insufficient points may be withdrawn from an own account for compensation according to the user's will, at the time of depositing the sales amount at the ATM 20.

As a result, all of the sales amount in the register are deposited. In addition, the amount withdrawn for the compensation is recorded as a withdrawal subjected to the base tax rate of 10%, and then recorded in the own passbook again. The cash extracted from the register is recorded, just like withdrawing the cash from the ATM.

It is assumed that a balance of the actual amount account is 4 yen, and a point balance in the account is 2 points before a withdrawal for compensation. (a)

Through the process of recording in the account at three steps illustrated in FIGS. 23A, 23B, and 23C, 106 yen and 4 points are finally deposited, and 4 yen and 2 points are recorded as a totally different withdrawal using the ATM. (c)

As a result, in the A section of the consumption tax account, a paid tax of 0.364 yen for a tax amount in the A section, for a received indirect tax amount of 6 yen and a withdrawn amount of 4 yen, is recorded, which is the same as a record in the tax card.

Further, with regard to a differential value between the B section received and paid taxes, there are 2+2=4 points as a received tax, and there are 2 points used for a payment for a different matter as a paid tax. As a balance, a differential amount is that the received tax is higher by 2 points.

An important point at this stage is that 4 yen is deposited in cash but the received tax amount of 4 yen remains in the A section of the consumption tax account, as illustrated in FIG. 23C. This is because the tax amount is specified in the tax card 300, and the same amount is recognized as a tax amount in the tax record book.

It may be possible to collectively explain the withdrawal and deposit for compensation, as illustrated in FIG. 23B, without dividing the explanation into three stages. However, 4 yen and 2 points disappear in the course of the process, and therefore the explanation is divided into three stages for easy understanding.

At this explanation stage, a C section correction value is unneeded. If a consumption tax amount of 0.4 points for a 4 yen expense is used for a different matter, a correction amount is recorded in the tax card 300, and the correction amount of 0.364 is to be registered as a minus value (−0.364) in the paid tax field of the C section input fields. Therefore, if the point tax payment continues, the value in the C section will become zero.

Application Example 1

In an application example 1, this system is used, and the following process is performed for the case of imposing taxes on transfer of funds for customer-to-customer sales transactions, such as transactions over Internet.

Primarily, the consumption tax is to impose tax on exchange between money and products or services for final consumption activities. Taxable/non-taxable business entities under the law are set for achieving convenient tax collection. To esteem this purpose, there is no disadvantage in imposing taxes on consumer-to-consumer transactions.

More specifically, a consumption tax amount is directly paid using points at the time of a transfer of funds that does not involve cash. However, in a method of indirectly paying a consumption tax using an ATM transfer, it is not possible to make a direct tax payment using points.

However, in the case when an individual sells a product, it is not necessary to stick to the reception of an indirect tax amount. In this case, by a product buyer directly paying a tax, the individual product seller receives the tax amount in the form of points. The individual product seller is able to use the points for daily consumption, and therefore this method provides the same economical profits as the indirect tax method of receiving a price in cash.

Above all, for a product buyer, it is effective in view of social contributions that he has his intention to pay a tax amount out of his payment for a product, to the National Treasury at the time of the payment, rather than paying the tax amount to the seller who may keep it as his assets instead of paying to the National Treasury. That is, this may function as a restraint factor for individual product sellers. In addition, an appeal of customer-to-customer transactions is that industrial products that are somewhat imperfect for the production distribution stage producing normal added value, such as products which have already been depreciated, may be distributed as second hand products. This proposed method is only one that is an effective tax collection method for this kind of distributions, like transactions over the Internet, which are prevailing.

The following describes an example of using a special screen dedicated for non-taxable consumers so as to apply non-taxation to customer-to-customer transactions, as in the current tax system.

As preconditions, it is assumed that a tax book confirms whether a user is a taxable business entity or an ultimate consumer, on the basis of the two kinds of records as to a past transaction method, a transfer tax payment for an indirect tax amount or a tax payment by point clearing reset.

An ATM transfer screen for transfer to an individual seller is a dedicated special screen.

Figure 24:
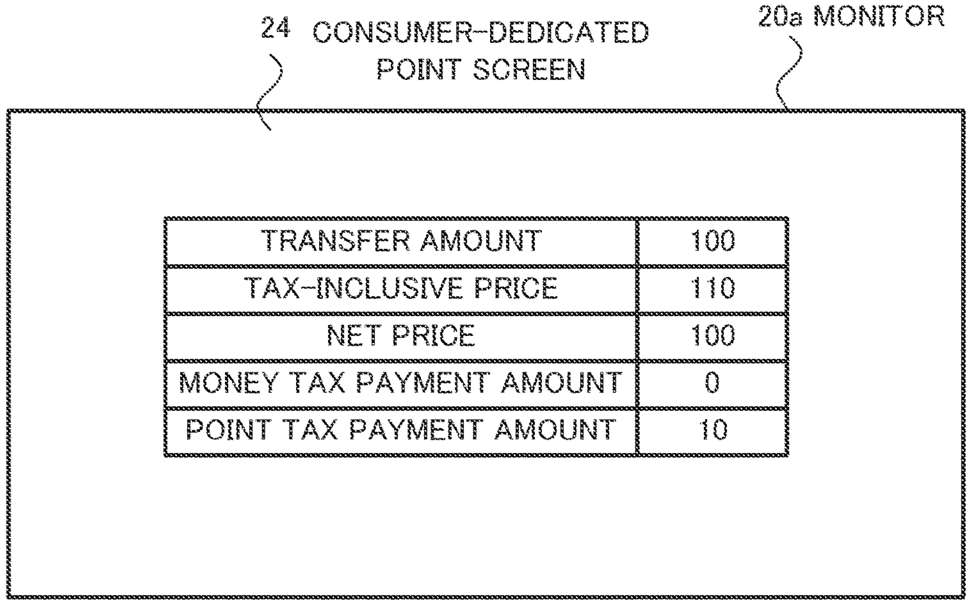
FIG. 24 is a view for explaining a consumer-dedicated point screen.

FIG. 24 is a view for explaining a consumer-dedicated point screen.

When a net price and a tax-inclusive price are entered by a consumer on a consumer-dedicated point screen 24, the computing unit 14 automatically calculates the transfer amount, money tax payment amount, and point tax payment amount, and displays them on the consumer-dedicated point screen 24.

The computing unit 14 determines whether the remittee is a consumer or a taxable/non-taxable business entity, when the consumer enters the remittee.

FIG. 25 is a view for explaining recording in a tax record book for a consumer-to-consumer transaction.

Account information 100 is a buyer's account information, and account information 200 is an individual seller's account information.

The normal recording scheme is applied to taxable/non-taxable business entities.

An amount after tax deduction is recorded in the A section of the actual amount account of the individual seller's account information 200. Nothing is recorded as a received tax amount in the A section. In addition, points are not recorded in the direct tax fields of the individual seller's actual amount account or consumption tax account.

In FIG. 25, points paid by the buyer are recorded in hatched portions.

To allow an individual seller to be non-taxable, it is possible to provide a fixed deduction window in the calculation transfer instruction field in a tax book, other than the above method. In addition, without customer-to-customer transactions that actually produce more than a predetermined consumption amount, the individual seller cannot be a taxable business entity. Therefore, the individual seller is able to use an account information management apparatus that is totally the same as that for business entities, without any problems. However, the individual buyer always needs to select a direct tax payment. To deal with this, the consumer-dedicated point screen (for transfer) of FIG. 24 is effective. In this connection, in the case of making a private transfer of money or pocket money to a family member, in addition to the customer-to-customer transactions, the same amount is entered as a transfer amount, a tax-inclusive price, and a net price (or no-taxable button is provided), to thereby enable non-taxable transfer.

Third Embodiment

The following describes an account information management system of a third embodiment.

Hereinafter, differential features of the account information management system of the third embodiment from the account information management system of the above-described first embodiment will mainly be described, and identical features will not be described again.

The account information management system of the third embodiment is a system that allows consumers to use pre-paid cards to pay consumption taxes to the National Treasury.

In the case of a bank account transfer, it is possible to specify a tax amount, which eliminates the necessity of correcting a recorded tax amount. This has been described in the above first and second embodiments. In addition, the following has been described: in the case of purchasing a taxable or non-taxable product in cash, it is necessary to correct a difference in tax amount from an amount based on a base tax rate.

The following description uses the term "pre-paid card". This term represents a device with a function of charging points and recording an insufficient tax amount.

The points refer to both deposited tax points and points to be used for calculation to shift points to a tax book after a taxable period ends.

Figure 26:
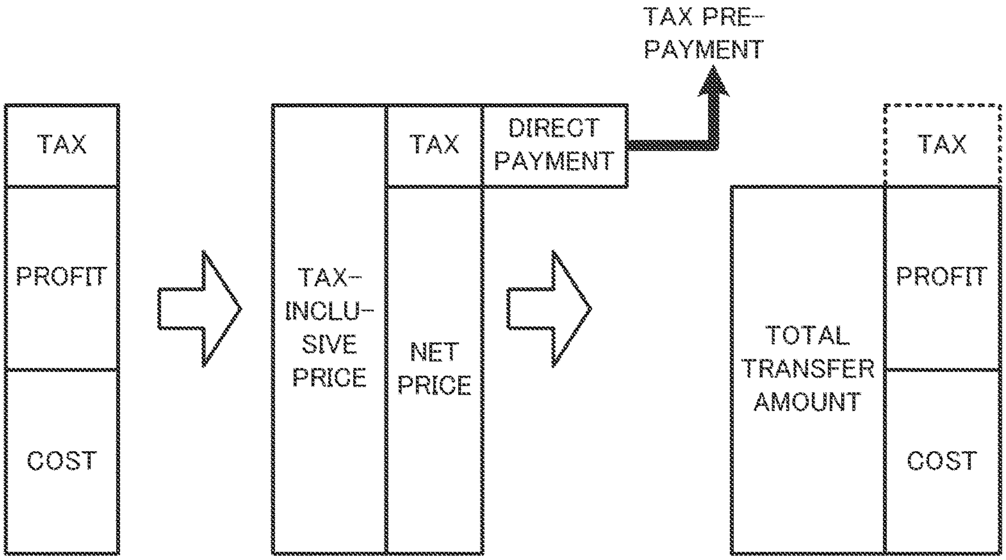
FIG. 26 is a view for explaining tax pre-payment.

FIG. 26 is a view for explaining a direct tax pre-payment. As illustrated in FIG. 26, a price of a product at a retailer includes three items: a cost, a profit, and a consumption tax. As illustrated in FIG. 26, the existing general tax payment method is that a consumer pays an amount that is the sum of the net price (cost and profit) and the consumption tax, to a business entity. The business entity pays the consumption tax received from the consumer.

By contrast, in this embodiment, a consumer is able to directly deposit a consumption tax to the government in the form of direct tax pre-payment, as described earlier. A total amount to be transferred to the business entity's account, which is determined at the time of a transaction, is a net price and an optionally determined indirect tax amount. In addition, in the case of a transaction using a pre-paid card, the computing unit 14 is able to subtract a tax amount for the transaction from the deposited tax amount of the pre-paid card, and records information indicating that the tax-inclusive price was paid at the time of the transaction, in the account information 100.

Figure 27:
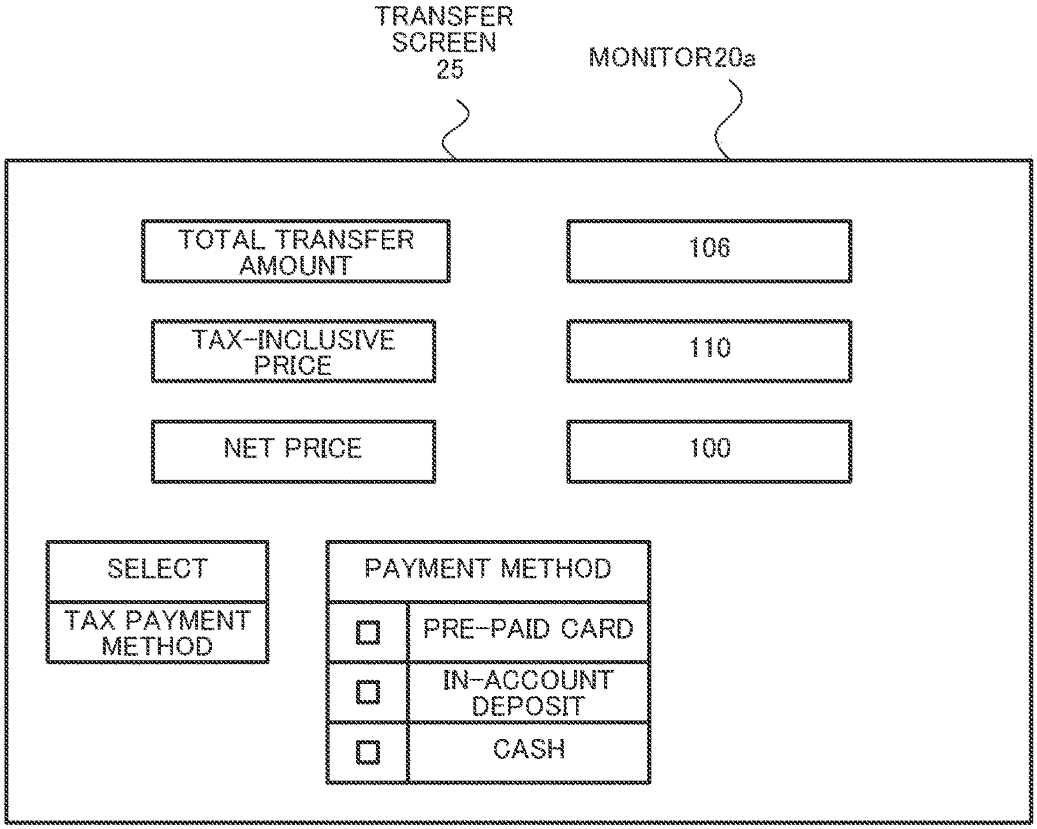
FIG. 27 is a view for explaining a transfer screen according to a third embodiment.

FIG. 27 is a view for explaining a transfer screen according to the third embodiment.

The preconditions to explain FIGS. 27 and 28 are that a product with a net price of 100 yen and a tax rate of 10% is purchased. It is assumed that as the payment, the net price and an indirect tax amount of 6 yen are paid in cash via a bank account transfer, and the remaining direct tax amount of 4 yen is paid using an already purchased pre-paid card. It is also assumed that 10 points that are equivalent to 10 yen are previously charged in the pre-paid card, and the actual amount account has a balance of 10 yen.

It is possible to select whether to use a pre-paid card, an in-account deposit, or cash as a payment method, on the transfer screen 25. In this case, it is assumed that the use of a pre-paid card is selected.

FIG. 28 is a view for explaining account information in the case of paying a consumption tax using a pre-paid card.

A table for the account information 1000 of FIG. 28 represents a process of charging only points in a card from the balance of the actual account, not purchasing pre-paid points at the time of cash withdrawal (will be described later). 10 points are equivalent to 10 yen. In this operation, cash is not withdrawn, and therefore a withdrawn amount is not recorded in the A section of the consumption tax account.

A point recording portion provided in the pre-paid card is indicated within double lines in the table.

The account information 1000 illustrated in (a) of FIG. 28 indicates that cash is withdrawn from the actual amount account at the time of purchasing pre-paid points, and is deposited into the actual amount account of the tax book.

In addition, 10 points are charged in the pre-paid card inserted in the ATM 20 at the same time.

By doing the above two operations, (10) is registered in both the received tax and paid tax fields of the direct tax input fields of the consumption tax account.

Then, (−10) is registered in all the four B section received tax and paid tax fields.

As a result, after a taxable period ends, a transfer instruction from a tax record book to a tax book is not made, irrespective of whether there is a balance of some points in the pre-paid card.

With reference to account information 1100 in a compressed recording representation, the following describes recording in the account information 100 for the case where a transfer is made to a retailer selling a taxable product, on the basis of the values entered in the transfer screen of FIG. 27.

In the case of the current bank transfer, cash of 100,000 yen or less may be transferred, without the need of depositing the cash in the own account once. In (b) of FIG. 28, however, it is assumed for easy explanation that the transfer amount is deposited into the own account once and then is transferred.

In this account information management apparatus, a cash amount is recorded with a base tax rate in the paid tax field of the consumption tax account at the time of withdrawing the cash from the account. That is, when the cash amount to be transferred is deposited, the cash amount is compulsory recorded with the base tax rate in the deposit field.

This principle of the recording with the base tax rate is followed for each deposit and each withdrawal of cash, except for the following two cases. One of the cases is that a tax amount is specified in an account-to-account transfer. The other is that tax amount information and invoice information have been recorded in the tax card via the register of a shop or the like.

The case of recording after a taxable product of FIG. 27 is purchased using pre-paid points is illustrated in (b) of FIG. 28.

In the case of (b) of FIG. 28, if cash deposited in the ATM was originally deposited in this passbook account, the balance of zero is recorded in the A section even when 106 yen is deposited and withdrawn, this means that an indirect tax amount of 6 yen specified this time is recorded properly as a paid tax amount.

Referring to (b) of FIG. 28, an indivisible number, 3.636363, is recorded in the tax balance field of the A section total of the consumption tax account. If 106 yen which is deposited in the actual amount account was originally withdrawn from the actual amount account of this account information 1100, 9.636363 yen has been recorded in the paid tax field of the A section of the consumption tax account at the time of the withdrawal. Therefore, a consumption tax the account owner has paid as an indirect tax is calculated as 3.6363−9.6363=6, and this result is finally recorded.

If 106 yen is illegal money (to be described in a fourth embodiment), a consumption tax amount of 9.636363 yen is subtracted from the actually paid tax amount and the resultant is recorded.

The B section differential value in (b) of FIG. 28 has a value of zero, and this means that no further points have been purchased, other than previously purchased points.

An external pre-paid card has a balance of 6 points, which is included in the table of (b) of FIG. 28 for explanation, and these points are usable for further shopping.

The account information management system of the third embodiment produces the same effects as that of the first embodiment.

With the account information management system of the third embodiment, the method for direct tax payment settlement using points has been described. At the time a statutory or optional taxable period ends, the values recorded in the tax record book integrated during the period are collected in corresponding calculation fields in a tax book. The following describes how to make recording and perform calculations, using examples illustrated in FIGS. 29 to 38.

To pay a consumption tax using points or via pre-payment for direct tax payment settlement, there are two methods. One of the methods is an in-account point management method, and the other is an external server management method. In the following description, it is assumed that a consumption tax standard tax rate is 10% and a base tax rate is 10%.

In the in-account point management method, the direct tax payment settlement has a pre-payment method and a later payment method, depending on whether points are charged in a tax card or not.

In the pre-payment method, according to the points purchased irrespective of whether points were actually used or points still remain, the purchased points are transferred to the tax book before a taxable period ends. The point charge method is that the points that are one tenth a withdrawn cash are charged in the tax card inserted in the ATM at the same time of the cash withdrawal.

FIGS. 29 to 37, FIG. 39, and FIG. 40 are views for explaining a record state in the pre-payment method. FIG. 38 is a view for explaining a record state in the later payment method.

It is assumed that a customer has a balance of 2200 yen in the A section of the actual amount account. A net price of a purchased taxable product is 1000 yen, a tax rate is 10%, 1000 yen is withdrawn in cash at the ATM 20 and at the same time, 100 points are charged in the tax card, and the tax card is inserted to an ATM after shopping. The final record state of the tax record book, the tax book, and in-card tax amount information are illustrated. Differential features from the account information management systems of the above-described embodiments and a point shift will mainly be described, and identical features will not be described again.

Note that for clear understanding of calculations of values, each field is illustrated in duplicate compressed representation. In addition, "tax card" is used here as a tax amount information communication means for giving and receiving points. This means is not limited thereto as long as the means is able to electronically communicate information.

FIG. 29 illustrates account information at the time of purchasing points at an ATM. In this connection, referring to FIG. 29, two operations for a cash withdrawal are represented in a compressed manner in a table.

An amount of 1100 yen including 1000 yen in cash and 100 yen for a purchase of points using the withdrawal field of the A section of the actual amount account is withdrawn. At the same time, 90.91 which is one eleventh the withdrawn cash amount of 1000 yen is recorded in the paid tax field of the A section of the consumption tax account. The 100 points purchased at the same time are recorded in the direct tax input field of the actual amount account. At the same time, (100) is recorded in the received tax field of the consumption tax account. At the same time, (−100), which is a minus value, is recorded in both the received tax and paid tax fields in the B section received tax fields. In addition, the purchased points (100) are recorded in the pre-paid point purchase field provided in the actual amount account. In addition, out of 1100 yen withdrawn using the withdrawal field of the A section of the actual amount account, 100 yen that remains after the withdrawal of 1000 yen in cash is immediately deposited into the actual amount account of the tax book 12*a*.

At this time point, the record state of the direct tax section and B section is identical to that of the case where a business entity receives a consumption tax.

Then, as illustrated in FIG. 30, together with the dispensing of 1000 yen in cash, a point balance of 100 points is entered in the points field of the tax card inserted into the ATM 20. At the same time, (100) is recorded in both the withdrawal field of the actual amount account and the paid tax field of the consumption tax account, as illustrated in FIG. 29. At the same time, (−100) is recorded in both the receipt and payment fields of the B section paid tax fields, as illustrated in FIG. 29.

FIG. 31 is a view illustrating calculation elements used by a register, in tabular form. Values provided by a shop side are a net price (ta) and a tax-inclusive price (tb) calculated with a statutory tax rate. The remaining six elements are not entered without a customer's intension to determine a direct-indirect tax payment ratio. At this stage, the customer's intention to pay tax is surely recorded as a numerical value in this system.

Then, a customer's tax card is inserted into a register having a shop's tax card inserted therein, and 1000 yen is paid. In addition, points the shop receives out of the point balance (px) charged in the customer's tax card of FIG. 32 are the points specified as a direct tax payment amount by the customer, and the points (py) are subtracted from the tax card (px), and if the balance is insufficient, the insufficient value is recorded as a minus value in the shift points field of (te) illustrated in FIG. 32. If there are still remaining points, zero is recorded. FIG. 32 illustrates three examples.

FIG. 33 is a view for explaining a value that is recorded in a shop-side shift points field at a register.

As illustrated in FIG. 33, a value calculated by adding the points received from the customer's tax card and the value calculated by multiplying a minus value recorded in the shift points field (X) of the customer's tax card by (−1) if the point balance is insufficient is recorded in the shop's tax card. The points are equivalent to the direct tax payment amount calculated by subtracting the net price (ta) from the tax-inclusive price (tb) and further subtracting the received tax amount in cash (tf) from the resultant.

FIGS. 34 and 35 are views for explaining points and invoice. Received points (Y) of FIG. 35 are points received from the customer's points field. If the customer's points are insufficient, the received points are a value calculated by multiplying a minus value recorded in the customer's shift points field by (−1).

At the time of the receipt and payment of tax amount points via the register, invoice records are also exchanged. In general, in the case of purchasing products in cash, it is not necessary to disclose a buyer's personal identity. However, the customer clearly knows the location information of the shop. Therefore, in the invoice exchange, a limit is imposed on customer's invoice information to be disclosed at the receipt and payment stage of points. A limit on invoice information to be exchanged is controlled, as illustrated in FIGS. 34 and 35.

FIG. 36 is a view illustrating customer's account information.

Then, the customer who has made a payment at a register and whose tax card has tax amount information registered therein inserts his tax card into the ATM 20 when an occasion arises. The ATM 20 which receives the tax amount information from the tax card makes recording in the customer's account information 100*e*. In the case illustrated in FIG. 36, a lack of the point balance does not occur. Therefore, any value is not registered in the direct tax input fields. In the C section paid tax fields, a correction tax amount recorded in the tax card is recorded. At this time, a paid tax amount of the A section which is one eleventh the withdrawn cash amount compulsorily recorded at the time of cash withdrawal is cancelled out, and thereby the balance becomes zero as the indirect tax payment amount in the A section. The amount of 100 yen already paid as a direct tax payment at the time of the cash withdrawal is deposited in the tax book, and the direct tax payment amount for the consumption tax is pooled so as to be paid after a designated taxable period ends.

FIG. 37 is a view illustrating shop's account information.

A payment is received at a register of a shop, a shop's tax card is inserted into the ATM 20, and the received payment and points are recorded in shop's account information 100*f*. In the case of FIG. 37, 100 points are recorded in the direct tax input fields of the actual amount account. At the same time, (100) is recorded in the received tax field of the direct tax input fields of the consumption tax account, and (100) that is the received points is recorded as a plus value in the tax balance field. At the same time, (−100), a minus value, is recorded in both the received tax and paid tax fields in the B section received tax fields. At this stage, with respect to a consumption tax amount that the business entity pays, the cash tax balance becomes zero since the tax balance of the A section is zero. In the declaration of the consumption tax after the taxable period ends, an equation for the B section differential value is (−100)−0=−100 points, and (−100) points are set as the point tax balance. As a result, the shop clears the tax payment using the received 100 points remaining in the direct tax fields of the account amount account, and thereby the point balance in hand becomes zero.

The pre-payment method for the in-account point management method has been described.

The following describes the later payment method for the in-account point management method.

FIG. 38 is a view for explaining a later payment method for the in-account point management method.

The preconditions for the following example are that 20 points in a customer's tax card are used for another shopping, and a balance shows 80 points and is insufficient by 20 yen.

When the customer's possessed points are insufficient at the stage illustrated in FIG. 32, a minus value is recorded as shift points. The minus value is recorded as a plus value in the paid tax field of the direct tax input fields of the customer's actual amount account. As a result, the balance of the direct tax input fields of the consumption tax account indicates a minus value. In the case of a value of −20 in the example 2 of FIG. 32, (−20) is recorded in both the received tax and paid tax fields of the B section paid tax fields, and the value (20) is calculated by an equation, 0−(−20), and therefore the point purchase amount transferred to the tax book after the taxable period ends becomes 20. As a result, a transfer instruction from the A section of the actual amount account to the tax book is made, 20 yen is subtracted from the balance of the account, and the final deposit balance in the account becomes 1080 yen.

As described above, even in the case where the tax card has no points charged, inserting the tax card into the register makes it possible to sell products and receive points, assuming a security of recording the insufficient amount for the direct tax amount in the direct tax section and B section of the account information 100*e*.

FIG. 39 is a view for explaining a customer's tax book.

A C section correction value (E) indicates a value of zero calculated by subtracting C (−90.91) from the A section total value (−90.91). If the C section correction value (E) is less than zero, an actual amount tax due (F) is zero. If the C section correction value (E) is greater than or equal to zero, the actual amount tax due (F) is that value. Referring to FIG. 39, the amount is zero.

With respect to a point clearing amount (G), if a value (B) is a minus value, that value is entered. If the value (B) is a plus vale, zero is entered.

With respect to a point purchase amount (H), if the value (B) is a minus value, zero is entered. If the value (B) is a plus value, that value is entered.

With regard to a pre-paid point purchase amount (I), an amount already transferred from the actual amount account of the tax record book is entered.

A received amount from tax record book (J) is calculated as the sum of the actual amount tax due (F) and the point purchase amount (H). In FIG. 39, zero is calculated.

A tax due is calculated as the sum of the pre-paid point purchase amount (I) and the received amount from tax record book (J). In FIG. 39, (100) is calculated.

FIG. 40 is a view for explaining a shop's tax book.

A value in each field is calculated as in the tax book 12*a* illustrated in FIG. 39.

FIGS. 41 and 42 are views for explaining a record state in the external server management method.

The external server management method, which is the second method for the direct tax payment settlement method, is a method in which tax amounts are paid to a private point management company or a public point management company, other than banks, the amounts are managed in the same way as other commercial pre-paid points, and only consumption tax amounts are collectively paid to the National Treasury. In addition, the tax amounts may be paid at the same time as the payment to a credit company. Various tax payment management methods are considered, as in the case of the existing commercial point management, and values in fields of a tax record book or fields used to record the values vary depending on a computation method. Therefore, no concrete examples may not be described now. However, one example is illustrated in FIGS. 41 and 42. FIG. 41 illustrates a stage where points are purchased from a point management company with a bank transfer. FIG. 42 illustrates a stage where cash is withdrawn and a product is purchased at a register.

A general recording method considered for the external server management method is as follows.

Preconditions: A balance prior to a transaction is 1100 yen, a base tax rate is 10%, points are purchased with a bank transfer, and at the same time the purchased 100 points are recorded in the deposit field of the direct tax input fields of the actual amount account.

A differential feature from the point management method carried out by a bank, which has been described with reference to FIGS. 28 to 40, is that a possessed point balance in a card in the server management method is used until the possessed point balance becomes zero. In the bank account point management method, points are used even if the balance becomes minus. However, since a different reader is used for cards used in the server management method, it is not possible to record a minus value after all of the purchased 100 points are used.

However, as a role of a tax card, it is possible to enable minus record information for the points used as a correction amount, via the tax card. To deal with this, a register records the correction amount and shift points which are a minus value, in the tax card, setting the points charged in the card used in the server management method as an upper limit.

An example using actual values of FIG. 42 will be described. A net price of 1000 yen for a taxable product is withdrawn in cash, 1000 yen is paid together with 100 points at a register, resulting in a point balance of zero in the point card. The paid points (−100) are recorded at the register, and (−100) is recorded via the tax amount information communication from the card to the tax record book. As a result, the B section differential value becomes±0.

Already paid points are not transferred to the tax book. However, it is possible to calculate a cumulated direct tax balance as an integrated value of pre-paid point purchase amounts of the tax book. The above operations are performed for recording the cumulated direct tax balance in the case where an external management pre-payment is made. By purchasing externally-managed points, the consumer receives points, that is, in view of registered values, receives a consumption tax, as in a business entity. By purchasing points using own money and paying the received points at a business entity's register, a point payment is made. The information is cancelled out, and a value of zero, which does not issue a transfer instruction, is recorded in the tax book.

Fourth Embodiment

The following describes an account information management system according to the fourth embodiment.

Hereinafter, differential features of an account information management system of the fourth embodiment from the account information management systems of the above-described first, second, and third embodiments will mainly be described, and identical features will not be described again.

With reference to the account information management system of the second embodiment, a deposit process using an ATM 20 has been described.

A differential feature of the account information management system of the fourth embodiment from the first and second embodiments is that a tax amount is changeable at the time of a cash deposit at an ATM 20.

Before the following description starts, the preconditions for the deposit operation will be provided.

Condition I: In the case of an account-to-account transfer, it is possible to specify a tax amount. Therefore, a remitter-desired tax amount is recordable in his and another passbooks.

Condition II: In the case of depositing cash in an own passbook account, a tax amount recorded in an own tax card by an own register is recorded in the passbook.

Condition III: In the case of the above conditions I and II, the tax amount included in the deposit amount is recorded as an invoice.

Condition IV: With respect to cash previously withdrawn from the own account, a tax amount that is calculated based on a base tax rate has been recorded in the A section of the consumption tax account.

Condition V: In the case of depositing cash previously withdrawn from the own account, in the account again, a received tax amount that is calculated based on the base tax rate is recorded in the A section of the consumption tax account.

Condition VI: In the case of depositing cash received from another person or picked-up money in the own tax record book, a received tax amount that is calculated based on the base tax rate is recorded in the A section of the consumption tax account.

Condition VII: Even if money given from a person or picked-up money is withdrawn from the account and then is spent, received and paid tax amounts are cancelled out in the A section of the consumption tax account, and thereby a tax balance becomes zero.

As described above, in this account information management system, even if an amount deposited under the above condition VI is withdrawn in cash from the ATM 20 and then is spent, a consumption tax amount for this is not recognized. However, in the tax record book of a person who has lost that money, which was deposited normally, a paid consumption tax amount is recorded.

This principle is a necessary calculation method for applying the progressive consumption tax rates. A deposit amount, which is not recorded as an invoice in conditions other than the above conditions I and II, is not considered as a consumption amount even if that amount is consumed. This decreases a consumption rate. As a result, the progressive consumption tax rate increases. If money regularly recorded as an invoice is lost, the consumption rate increases. However, if money deposited into the ATM 20 and withdrawn under the condition VI is lost, the deposit and withdrawal are cancelled out, and thus the consumption rate does not increase.

As a practical problem, a special example of depositing cash in hand at the ATM 20 will be described with reference to FIG. 43.

In this special example, a user deposits cash from an unknown source and in his hand, in his tax record book. The deposit amount is 100 yen, a net price is 100 yen, and a tax-inclusive price is 100 yen. If this deposit is successful, a consumption tax of 9.0909 yen is integrated even for this cash from an unknown source. However, this is not recorded as an invoice.

Figure 43:
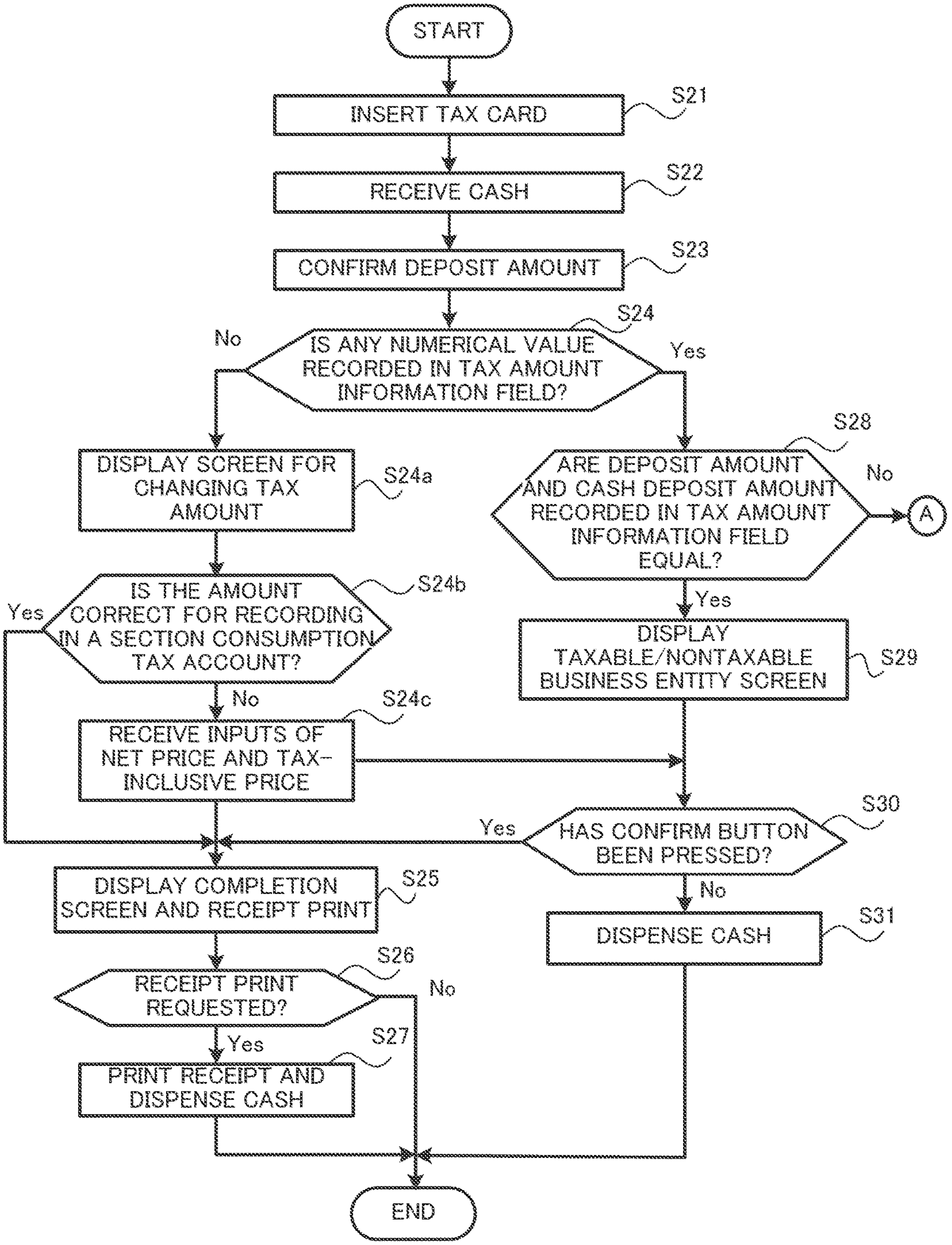
FIG. 43 is a flowchart for explaining a deposit process using an ATM according to a fourth embodiment.

FIG. 43 is a flowchart for explaining a deposit process using an ATM according to the fourth embodiment.

Differential steps from the first embodiment will be described.

(Step S24) The ATM 20 determines whether a value is in the tax amount information field 302 of the tax card 300. If a received indirect tax amount or received points are not recorded in the tax amount information field 302 (no at step S24), the amount is not taken as a received amount of the business entity's sales, but is taken as cash whose source is unknown. Then, the process proceeds to step S24*a*. If a value is recorded in the tax amount information field 302 (yes at step S24), the process proceeds to step S28.

(Step S24*a*) The ATM 20 determines that the cash amount inserted in the ATM 20 includes a tax amount for the base tax rate, and displays a tax amount to be recorded in the received tax field of the A section of the consumption account, in the deposit amount display field of the ATM 20. Then, the process proceeds to step S24*b*.

(Step S24*b*) The user confirms the tax amount included in his deposited cash amount, and presses a confirm button YES. If the tax amount in the cash is different from displayed, the user presses a confirm button NO. When the user of the ATM 20 has pressed the confirm button YES, the process proceeds to step S25. If the user has pressed the confirm button NO, the process proceeds to step S24*c*.

(Step S24*c*) An image for entering a net price and a tax-inclusive price is displayed, and when the deposit amount is identical to the tax-inclusive price, a confirmation button is displayed. Then, the process proceeds to step S30.

(Step S30) When the user of the ATM 20 has pressed the confirm button YES, the process proceeds to step S25. If the user has pressed the confirm button NO, the process proceeds to step S31.

Figure 44:
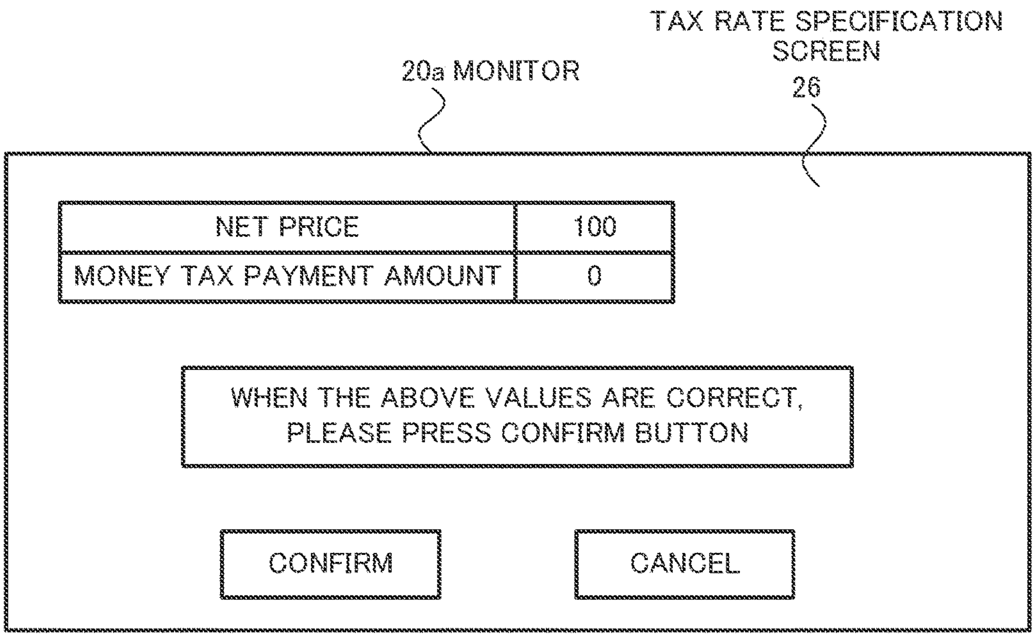
FIG. 44 is a view for explaining a tax rate specification screen.

FIG. 44 is a view for explaining a tax rate specification screen.

A tax rate specification screen 26 has fields for entering a net price and a money tax payment amount. Entering of a tax rate amount higher than the base tax rate is inhibited.

In the illustrated example, the user has an intention to deposit 100 yen as non-taxable money. In the input image of step S24*c*, the user enters a net price of 100 and a money tax amount of 0.

When receiving the money tax payment amount, the process proceeds to step S25 where the ATM 20 displays a completion screen indicating that (This transaction is recorded in an income management record field. 100 yen deposited this time can be consumed as your assets.)

The text in the above parentheses will be described. This display results from specification of a non-taxable deposit. The income management record field is a field to record a deposit amount, such as a sales amount of non-taxable sales, some earning, income, deposit amount, loan, donated money, charity money, gift money, or miscellaneous income, which is deposited in cash at the ATM 20, has not been recorded as an invoice, does not include a consumption tax amount, and is requested for a deposit record, as a deposit amount included in the balance of the actual amount account, in a deposit field separate from the deposit field of the actual amount account. That is, it may be said that the user confirms the deposit money as some earing or sales amount, and records the income that might be subjected to income taxation, in his bank account.

In the case where the base tax rate of 10% and the standard tax rate of 20% are determined by law, for example, if 20 yen which is equivalent to the highest tax rate of 20% is entered as a money tax payment amount, the following text is displayed at step S25.

"A sales amount which has not been recorded as an invoice is deposited. Thank you for your understanding of smart tax." In this case, it is considered that the user has sold a taxable product in cash with an indirect tax payment.

However, as a practical problem, salary may be received in cash. Wages are not subjected to consumption taxation. Only by recording untaxable information in the own tax card at his office's register, the receiver completes the invoice recording. Then, Yes is selected at step S24*b*.

Then, the completion screen of step S25 displays the following text: "Untaxation information has been recorded. A received tax amount according to the deposit amount is recorded in A section".

The "untaxation information" is as follows. It is assumed that a received salary amount is 11000 yen. After a tax card is inserted to the ATM, 1000 yen is automatically recorded in the paid tax field of the A section of the consumption tax account before that money is deposited. It is assumed that 5500 yen is deposited after that. As a result, 500 yen is recorded in the received tax field of the A section. As a result, a record in which 500 yen corresponding to the cash of 5500 yen in hand is recorded as a paid tax amount in the A section is made. It is then assumed that 1000 yen is already consumed as a point direct tax payment out of the received salary amount of 11000 yen. A value of 100 is recorded in the shift points field of the tax card, and a correction amount of 90.9090 is recorded. As a result, cash in hand is 4500 yen, an account deposit amount is 5500 yen, a paid tax field of the B section has a value of 100, and a corrected paid tax amount in the A section is 409.0909. The cash in hand is 4500 yen. Therefore, 409.0909 yen is calculated by dividing 4500 yen by a correction index of 11. Further, the current balance of the actual amount account is 5500 yen. Since 100 yen is transferred as a transfer direct tax payment after a taxable period ends. The balance in the actual amount account becomes 5400 yen. As a result, for the user of the ATM, the sum of cash and the balance in the actual amount account is 9900 yen, the consumed net price is 1000 yen, and the direct consumption tax payment amount is 100 yen. These are results of a consumption activity and a tax payment.

The account information management system of the fourth embodiment produces the same effects as that of the first embodiment.

In this account information management system, calculations are performed in order to properly record a consumption tax amount balance of an account owner in his bank account. In addition, as in the effects of the account information management system of the fourth embodiment, there is provided a scheme of eliminating, if money whose invoice does not exist, unlike money normally deposited as an income, is withdrawn and is then consumed, the consumption tax amount for that money from the calculations.

(Multi-Stage Tax Table)

The following describes a multi-stage tax table.

FIGS. 45A, 45B, 45C, and 45D are views for explaining a multi-stage tax table.

A mechanism and exemplary record table of the multi-stage tax will be described. At present, only the actual amount account record 501 illustrated in FIGS. 45B and 45D is performed in the financial institution settlement. Values are tax-inclusive prices, as illustrated in portions 501*a*, 501*b*, and 501*c* of FIGS. 45B and 45D.

Figure 45C:
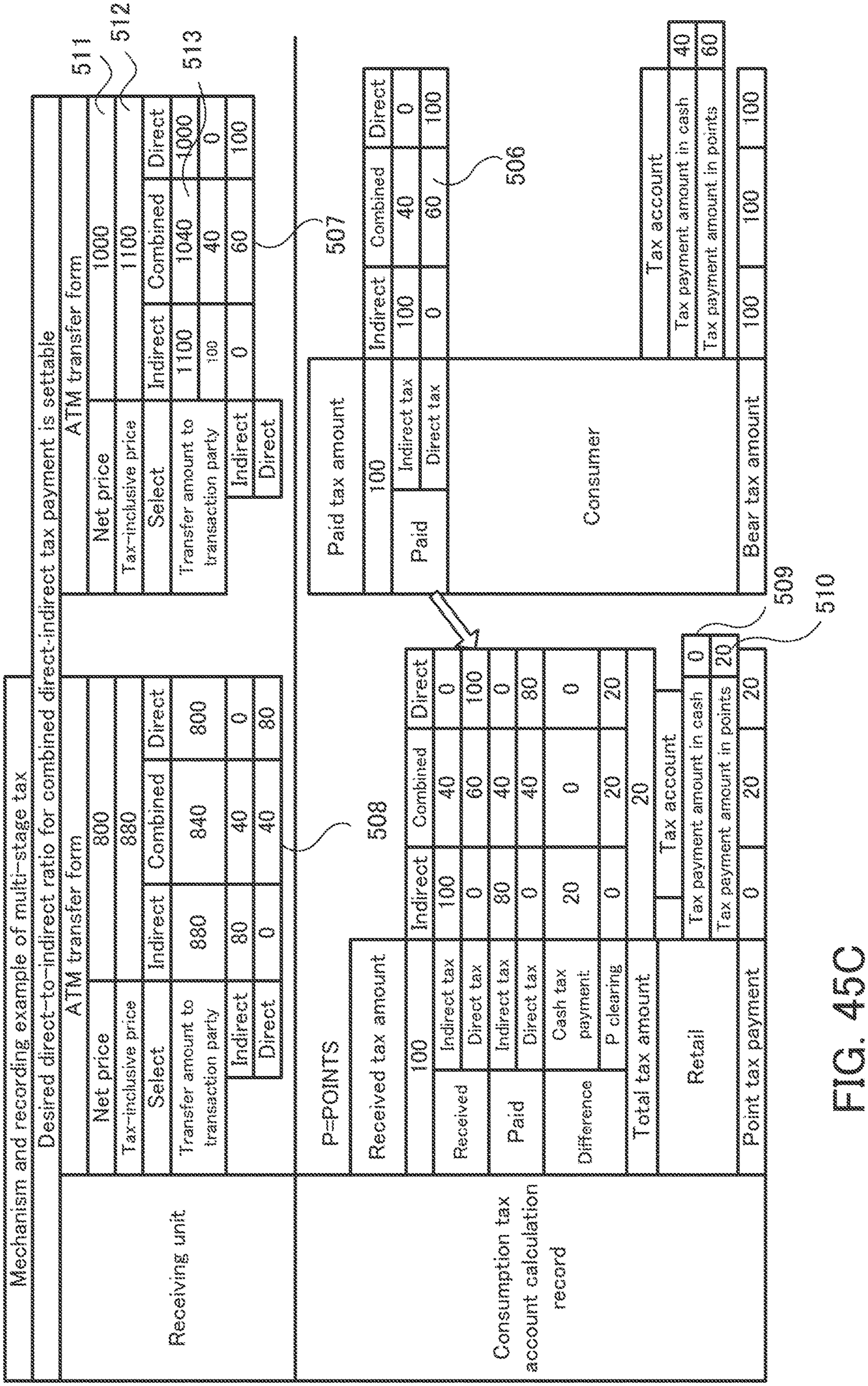
Figure 45D:
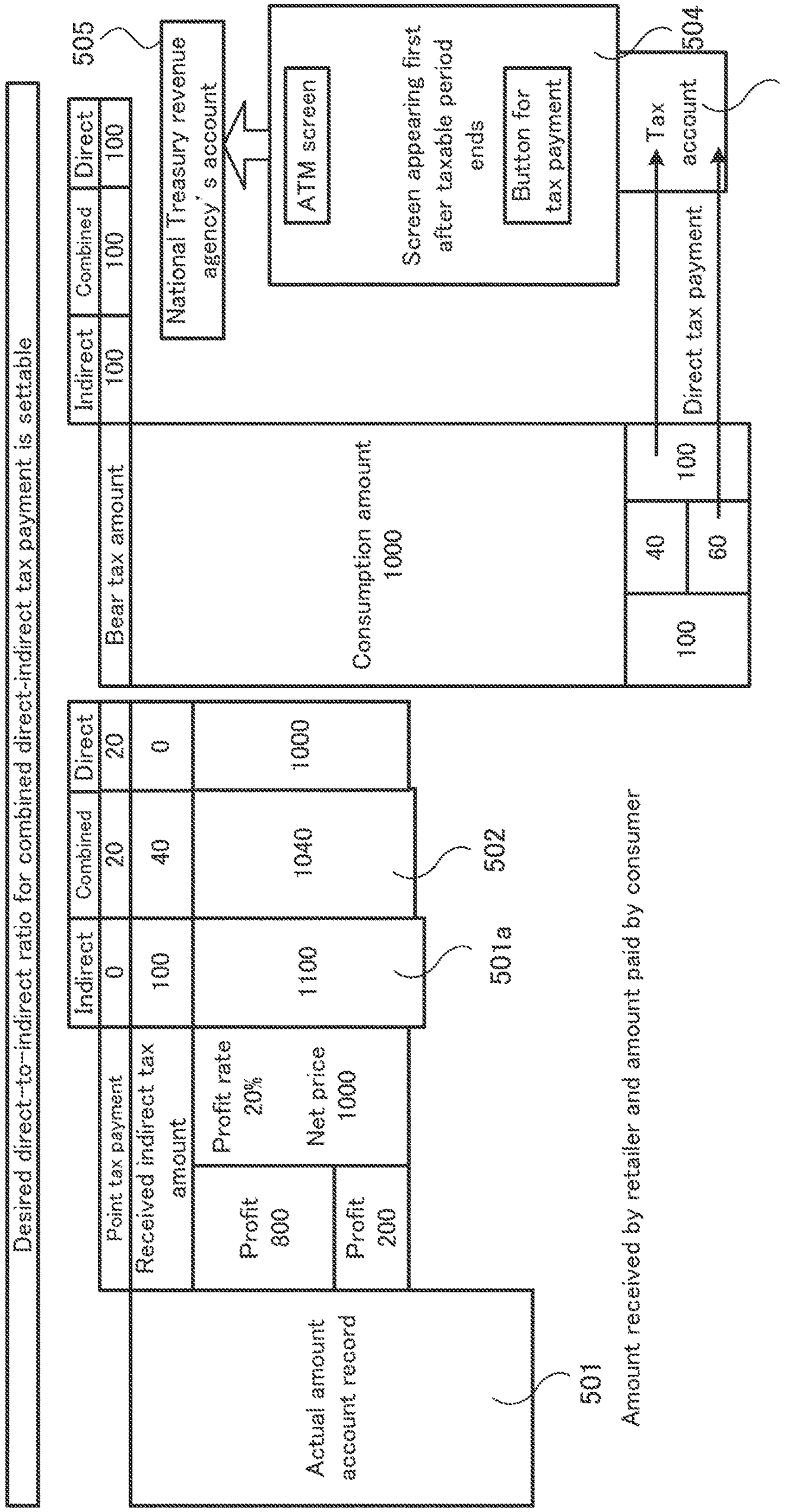

In this account information management apparatus, in the portions 511, 512, and 513 of the receiving unit illustrated in FIG. 45C, the following tax amount information is received and subjected to calculations, and then bookkeeping is performed in the consumption tax account illustrated in FIGS. 45A and 45C.

A value entered in the portion 511 is a net price. In the present case and other cases including the case where multiple tax rates are put into effect, this value needs to be input to settle the payment of non-taxable products and taxable products together. In this table, the value is "1000".

A value entered in the portion 512 is a tax-inclusive price. This is used in portions 501*a*, 501*b*, and 501*c* illustrated in FIGS. 45B and 45D in the existing bookkeeping system. When this value is accepted by the receiving unit, a value as the tax amount is determined. In this table, the value is "1100".

A value entered in the portion 513 is an amount actually transferred to a transaction party. By entering this value, it is possible to inform the account information management apparatus of two tax payment methods selected by a remitter (consumer or business entity) and a tax amount ratio. This selection is desirably made by the remitter. In this table, the value is "1040".

The following describes an actual flow of tax, starting with the portion 502 illustrated in FIG. 45D.

The value "1040" of the portion 502 is an amount determined by a consumer as an amount actually transferred to a retail. The tax amount included is 40 yen. The tax amount that is not paid to the transaction party is 60 yen, and the 60 yen is transferred to the tax account 503.

The tax account 503 is a tax account in which a tax book is recorded. Values in the A section, direct tax section, B section, and C section during a taxable period, which are calculated by the computing unit 14, are integrated into the tax book, and transferred and recorded. In addition, with calculations within the tax account 503, an amount to be transferred from the balance of the actual amount account to the tax account 503 is determined, and is transferred and deposited to the actual amount account of the tax account 503.

The screen 504 represents an exemplary case of actually paying a determined tax due to the National Treasury. In this figure, when a transaction is first treated by the receiving unit after a taxable period ends, the tax payment operation is performed. The remittee is a National Treasury revenue agency's account of a financial institution.

In the case of the combined direct-indirect input of the portion 506 illustrated in FIG. 45C, an amount to be directly paid to the National Treasury revenue agency's account 505 is only 60 yen, which is for the direct tax payment. Even if the National Taxation Bureau records this value importantly, this does not work together with the total consumption amount. The total consumption amount is recorded in the tax account 503 illustrated in FIG. 45D. Therefore, the National Taxation Bureau only recognizes the total tax payment amount collected in the Japan Bank, and does not need to manage individual direct taxpayers. In addition, operations such as a refund for correcting a scheduled tax due are carried out while the tax due is in the tax account 503. However, a declaration of consumption tax at the stage of additional value production, the same procedure as the current procedure, including an invoice record disclosure, is needed.

In the case where a consumer who makes a payment selects the portion 506 illustrated in FIG. 45C, an indirect tax is 40 yen and a direct tax is 60 yen. That is, the total 1040 yen, including a net price of 1000 yen and the indirect tax of 40 yen, is paid to the retailer.

In the tax payment intention record input method, in the portion 507, 1040 yen is entered as an amount actually transferred to the transaction party at the ATM, in the ATM input field of the portion 513.

The value entered in the portion 507 is a direct-indirect ratio determined by entering 1040 yen in the portion 513 in the receiving unit. The intention to pay the indirect tax of 40 yen and the direct tax of 60 yen is recorded in the own passbook and the retailer's passbook.

A value entered in the portion 508 is a direct-indirect tax payment ratio determined by the retailer. In the deposit and received tax fields of the retailer, 1040 yen and 60 points as the total are entered, and out of them, 40 yen is recorded as a received indirect tax amount. In addition, 60 points for the direct tax is recorded in the received tax field of the direct tax section. Out of the payment amount to the retailer, 800 yen is a net price, and 880 yen is a tax-inclusive price. In the portion 508, the retailer selects to pay an indirect tax of 40 yen to the manufacture company which is a supplier, and a direct tax of 40 points.

A value entered in the portion 509 is a cash tax payment amount recorded in the tax book of the retailer's tax account 503 illustrated in FIG. 45D. Out of the stock purchase amount which the retailer paid to the manufacture company, 800 yen is a net price and an indirect tax amount is 40 yen. Out of the total consumption tax amount of 20 yen (one tenth the profit of 200 yen) of the retailer, 20 yen (points) is all paid (in portion 510), and therefore the cash tax payment amount becomes zero.

A value entered in the portion 510 indicates points paid by the retailer at the time of a declaration of consumption tax. In this case, the retailer received 60 points and therefore the remaining points are 20 points. All of the received cash tax payment amount, 40 yen, is paid to the manufacture company. After the ruled declaration of consumption tax, the retailer pays (cancels out) the 20 points in hand as instructed from the tax book.

The above is a process of transferring a tax amount at multi stages. Out of the consumption tax amount of 100 yen the consumer finally paid, 60 points are cancelled out (paid) by the retailer and manufacture company, and the cash tax amount of 40 yen is paid by the material company.

In this connection, the table shows the case of paying all 100 points with a direct tax payment and the case of paying all 100 yen with an indirect tax payment on both sides of the values of the combined direct-indirect payment.

Heretofore, an account information management apparatus and information processing method of the present invention have been described with reference to the illustrated embodiments. The present invention is not limited thereto and the components may be replaced with other components having equivalent functions. In addition, other components or processing operations may be added to the present invention.

Further, desired two or more configurations (features) in the above-described embodiments may be combined.

In this connection, a plurality of apparatuses may be used to perform the processes performed by the account information management apparatus 10 in a distributed manner.

In this connection, the above processing functions may be implemented by a computer. In this case, a program describing the processing content of the functions of the account information management apparatus 10 is provided. The processing functions are implemented on the computer by the computer running the program. The program describing the processing content is recorded on a computer-readable recording medium. Computer-readable recording media include magnetic storage devices, optical discs, magneto-optical recording media, semiconductor memories, and others. Magnetic storage devices include hard disk drives, Flexible Disks (FD), magnetic tapes, and others. Optical discs include DVD, DVD-RAM, CD-ROM, CD-RW, and others. Magneto-optical recording media include MO (Magneto-Optical disk) and others.

To distribute the program, for example, portable recording media, such as DVD or CD-ROM, on which the program is recorded may be put on sale. Alternatively, the program may be stored in the storage device of a server computer and may be transferred from the server computer to another computer through a network.

A computer that executes the program may store, for example, the program recorded on a portable recording medium or the program received from the server computer to its local storage device, read the program from the local storage device, and then run the program. In this connection, the computer may run the program while reading the program directly from the portable recording medium. In addition, the computer may run the program while receiving the program from the server computer connected over a network.

Further, at least part of the above processing functions may be implemented by using DSP (Digital Signal Processor), ASIC (Application Specific Integrated Circuit), PLD (Programmable Logic Device), or other electronic circuits.

According to one aspect, it is possible to easily calculate the consumption tax due.

While this present disclosure has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An information management system using a computer for a user to pay tax from an account held at a financial institution, the information management system comprising:

an Automated Teller Machine (ATM) that is connected to a dedicated network;

an account information management apparatus that is connected to the dedicated network with a receiving device which receives a net price, a tax-inclusive price, and an amount to be actually transferred to a transaction party, out of a tax-inclusive transaction amount from the ATM;

a financial institution terminal that is connected to the dedicated network;

a personal terminal that is connected to the dedicated network via a public network; and a tax amount information communication device that is inserted to the ATM in which a correction information of a deposited tax amount is recorded, wherein the account information management apparatus includes:

a computing unit that separates a tax amount included in the tax-inclusive transaction amount from an amount to be actually transferred to the transaction party by filtering based on the information received by the receiving device, and separately generates actual amount account information in which a transaction record of the amount to be actually transferred to the transaction party is recorded and tax account information in which a transaction record of only the tax amount is recorded; and a storage unit that stores as data therein the actual amount account information and the tax account information in association with each other for each transaction, wherein the tax account information includes direct tax section where a direct tax amount directly paid to a taxing authority as a direct tax payment amount is recorded, the computing unit, based on the amount to be actually transferred to the transaction party entered by the user, calculates a money tax payment amount which will be deposited to the transaction party as an indirect tax amount and a direct tax payment amount which will be directly deposited to the taxing authority instead of indirectly deposited through the transaction party and records the money tax payment amount as a deposit to the transaction party and the direct tax payment amount as a deposit to be directly paid to the taxing authority, when the transaction is made using a cash, the computing unit records a corrected tax amount in the tax account information, separately from the transaction record of only the tax amount, and when the transaction is made using the tax amount information communication device, the computing unit subtracts a tax amount incurred for the transaction from the deposited tax amount recorded in the tax amount information communication device, and generates the tax account information, recognizing that the tax-inclusive price has been paid in the transaction.

2. The information management system according to claim 1, wherein the computing unit divides the tax amount into the money tax payment amount and the direct tax payment amount.

3. The information management system according to claim 1, wherein the computing unit obtains the money tax payment amount by calculating a difference between the amount to be actually transferred to the transaction party and the net price.

4. The information management system according to claim 1, wherein the computing unit obtains the direct tax payment amount by calculating a difference between the amount to be actually transferred to the transaction party and the tax-inclusive price.

5. The information management system according to claim 1, wherein the computing unit withdraw the direct tax payment amount from a point tax payment amount.

6. The information management system according to claim 1, wherein when actual amount points are paid to the taxing authority as a pre-payment, the computing unit records the paid amount points into the points tax payment amount.

7. The information management system according to claim 6, wherein when the computing unit records the point tax payment amount, points paid are recorded as a minus value and points received are recorded as a plus value.

8. The information management system according to claim 6, wherein when a business entity purchases a product, the computing unit records the direct tax payment amount to be paid withdrawing from received point tax payment amount.

* * * * *